(12) United States Patent
Mykland

(10) Patent No.: US 10,983,947 B2
(45) Date of Patent: Apr. 20, 2021

(54) METHOD AND DYNAMICALLY RECONFIGURABLE PROCESSOR ADAPTED FOR MANAGEMENT OF PERSISTENCE OF INFORMATION ACROSS MULTIPLE INSTRUCTION CYCLES

(71) Applicant: Robert Keith Mykland, Capitola, CA (US)

(72) Inventor: Robert Keith Mykland, Capitola, CA (US)

(*) Notice: Subject to any disclaimer, the term of this patent is extended or adjusted under 35 U.S.C. 154(b) by 0 days.

(21) Appl. No.: 14/024,495

(22) Filed: Sep. 11, 2013

(65) Prior Publication Data
US 2015/0227375 A1 Aug. 13, 2015

Related U.S. Application Data

(63) Continuation-in-part of application No. 13/832,005, filed on Mar. 15, 2013, now Pat. No. 9,633,160, and a continuation-in-part of application No. 13/722,831, filed on Dec. 20, 2012, now Pat. No. 9,304,770, and a continuation-in-part of application No. 13/493,962, filed on Jun. 11, 2012, now Pat. No. 9,158,544, and a continuation-in-part of application No. 13/429,198, filed on Mar. 23, 2012, now Pat. No. 8,869,123, and a continuation-in-part of application No. 13/360,805,
(Continued)

(51) Int. Cl.
*G06F 9/44* (2018.01)
*G06F 15/78* (2006.01)
*G06F 8/41* (2018.01)
*G06F 9/38* (2018.01)

(52) U.S. Cl.
CPC ............ *G06F 15/7867* (2013.01); *G06F 8/41* (2013.01); *G06F 9/3869* (2013.01); *G06F 9/3873* (2013.01); *G06F 9/3897* (2013.01)

(58) Field of Classification Search
CPC ...... G06F 15/7867; G06F 8/41; G06F 9/3897; G06F 9/3873; G06F 9/3869
See application file for complete search history.

(56) References Cited

U.S. PATENT DOCUMENTS 6,182,206 B1 * 1/2001 Baxter .................... G06F 8/447
712/227
6,701,515 B1 * 3/2004 Wilson ................ G06F 17/5045
716/102
(Continued)

*Primary Examiner* — Lewis A Bullock, Jr.
*Assistant Examiner* — Tina Huynh
(74) *Attorney, Agent, or Firm* — Patrick Reilly

(57) ABSTRACT

A method and system for enabling persistence of a value by a dynamically reconfigurable processor ("DRP") from the time of execution of an earlier executed instruction to a time of later executed instruction. The value may represent a constant a variable value of a software program. The value may be read from or written into a memory circuit, a DRP logic element, an iterator of a DRP logic element, or other value storing element or aspect of the DRP. The value may be maintained in a single logic element through the duration of one or more instruction execution cycles, or alternatively or additionally, the value may be transferred between or among one or more value storage hardware elements. The persistence of the value and transfer of the value within, into and/or out of the DRP enables later access of the value by, and/or positioning the value within, the DRP.

6 Claims, 45 Drawing Sheets

Related U.S. Application Data filed on Jan. 30, 2012, now Pat. No. 8,856,768, and a continuation-in-part of application No. 13/301,763, filed on Nov. 21, 2011, now Pat. No. 10,089,277.

(56) References Cited

U.S. PATENT DOCUMENTS

| | | | | |
|---|---|---|---|---|
| 2003/0208723 | A1* | 11/2003 | Killian | G06F 17/5045 716/102 |
| 2004/0068329 | A1* | 4/2004 | Mykland | G06F 9/3001 700/18 |
| 2006/0004997 | A1* | 1/2006 | Mykland | G06F 9/3001 712/244 |
| 2006/0259878 | A1* | 11/2006 | Killian | G06F 17/5045 716/102 |
| 2007/0198971 | A1* | 8/2007 | Dasu | G06F 8/433 717/140 |
| 2009/0327653 | A1* | 12/2009 | Maeda | G06F 15/7867 712/15 |
| 2010/0122105 | A1* | 5/2010 | Arslan | G06F 15/7867 713/500 |
| 2010/0174884 | A1* | 7/2010 | Morishita | G06F 9/30014 712/15 |
| 2010/0198799 | A1* | 8/2010 | Krishnan | G06F 11/3696 707/702 |
| 2011/0246170 | A1* | 10/2011 | Oh | G06F 17/5022 703/22 |
| 2011/0314343 | A1* | 12/2011 | Hoke | G06F 11/3696 714/45 |

* cited by examiner

METHOD AND DYNAMICALLY RECONFIGURABLE PROCESSOR ADAPTED FOR MANAGEMENT OF PERSISTENCE OF INFORMATION ACROSS MULTIPLE INSTRUCTION CYCLES

CO-PENDING PATENT APPLICATIONS

This Nonprovisional patent application is a Continuation-in-Part application to Nonprovisional patent application Ser. No. 13/832,005 filed on Mar. 15, 2013 by inventor Robert Mykland and titled "METHOD OF PLACEMENT AND ROUTING IN A RECONFIGURATION OF A DYNAMICALLY RECONFIGURABLE PROCESSOR". Nonprovisional patent application Ser. No. 13/832,005 is hereby incorporated by reference in its entirety and for all purposes, to include claiming benefit of the priority date of filing of Nonprovisional patent application Ser. No. 13/832,005.

This Nonprovisional patent application is also a Continuation-in-Part application to Nonprovisional patent application Ser. No. 13/722,831 filed on Dec. 20, 2012 by inventor Robert Mykland and titled "METHOD AND SYSTEM ADAPTED FOR CONVERTING SOFTWARE CONSTRUCTS INTO RESOURCES FOR IMPLEMENTATION BY A DYNAMICALLY RECONFIGURABLE PROCESSOR". Nonprovisional patent application Ser. No. 13/722,831 is hereby incorporated by reference in its entirety and for all purposes, to include claiming benefit of the priority date of filing of Nonprovisional patent application Ser. No. 13/722,831.

This Nonprovisional patent application is additionally a Continuation-in-Part application to Nonprovisional patent application Ser. No. 13/493,962, filed on Jun. 11, 2012 by inventor Robert Mykland and titled "SYSTEM AND METHOD FOR PERFORMING A BRANCH OBJECT CONVERSION TO PROGRAM CONFIGURABLE LOGIC CIRCUITRY". Nonprovisional patent application Ser. No. 13/493,962 is hereby incorporated by reference in its entirety and for all purposes, to include claiming benefit of the priority date of filing of Nonprovisional patent application Ser. No. 13/493,962.

This Nonprovisional patent application is yet additionally a Continuation-in-Part application to Nonprovisional patent application Ser. No. 13/301,763, filed on Nov. 21, 2011 by inventor Robert Mykland and titled "CONFIGURABLE CIRCUIT ARRAY". Nonprovisional patent application Ser. No. 13/301,763 is hereby incorporated by reference in its entirety and for all purposes, to include claiming benefit of the priority date of filing of Nonprovisional patent application Ser. No. 13/301,763.

In addition, this Nonprovisional patent application is also a Continuation-in-Part application to Nonprovisional patent application Ser. No. 13/360,805, filed on Jan. 30, 2012 by inventor Robert Mykland and titled "SYSTEM AND METHOD FOR COMPILING MACHINE-EXECUTABLE CODE GENERATED FROM A SEQUENTIALLY ORDERED PLURALITY OF PROCESSOR INSTRUCTIONS". Nonprovisional patent application Ser. No. 13/360,805 is hereby incorporated by reference in its entirety and for all purposes, to include claiming benefit of the priority date of filing of Nonprovisional patent application Ser. No. 13/360,805.

Furthermore, this Nonprovisional patent application is a Continuation-in-Part application to Nonprovisional patent application Ser. No. 13/429,198, filed on Mar. 23, 2012 by inventor Robert Mykland and titled "SYSTEM AND METHOD FOR APPLYING A SEQUENCE OF OPERATIONS CODE TO PROGRAM CONFIGURABLE LOGIC CIRCUITRY". Nonprovisional patent application Ser. No. 13/429,198 is hereby incorporated by reference in its entirety and for all purposes, to include claiming benefit of the priority date of filing of Nonprovisional patent application Ser. No. 13/429,198.

FIELD OF THE INVENTION

The present invention relates to software, data processing and information technology. More particularly, the present invention relates to methods of, and systems for, operating a dynamically reconfigurable processor.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Prior art computers based on the design innovations of Turing and von Neumann currently dominate the field of general purpose computing. Yet this brilliant and fundamental design work was originally done with several now anachronistic constraints. The Turing and von Neumann computer architectures were also driven by the criterion of defining a simplest computer design that could therefore be reliable given the manufacturing technology available in the early 1940's. While electronics technology has dramatically evolved in the ensuing decades to empower the commercially feasible manufacture of increasingly more powerful logic circuits and more complex data processing systems, the prior art of computational system design has remained fixated upon complying with the design concepts and constraints selected by Turing and von Neumann that were established under the technological limitations and military necessities existent during the Second World War.

The Applicant has disclosed a radically new approach to the design of computational systems in U.S. patent application Ser. No. 13/301,763 that embodies an inventive concept of computational design that is a novel and non-obvious departure from prior art computer design. In one singularly novel quality of the method of the present invention, the configurable circuit array of U.S. patent application Ser. No. 13/301,763 enables the automatic application of the entire command set of certain high level languages to automatically configure logic circuitry to computationally efficiently instantiate the logic of the originating high level source code without human operator intervention. More specifically, the method of the present invention enables the automated application of the higher level programming languages of FORTRAN, C, the Gnu C Complier ("GCC"), C++, JAVA and other suitable software languages known in the art by means of configurable logic and thereby instantiate logic of source code software programs written in each of these languages into a logic circuit configuration.

In prior art computers, the input to the prior art computer is a sequential series of instructions that is selected from a limited instruction set. In contrast, the method of the present invention (hereinafter, "the invented method") discloses that a dynamically reconfigurable processor, to include the apparatus of the present invention (hereinafter, "invented processor") need not have such an instruction set, but rather may execute a series of complex instructions that are applied to dynamically reconfigure a target circuit on the fly. The method of the present invention provides a compiler (hereinafter, "invented compiler") that extracts the logic, values, parameters, information and interrelationships of a sequence of instructions to efficiently configure a series of reconfigurable circuits coupled with input/output ("I/O") operations and memory operations. The invented compiler thereby accepts and automatically converts the logical flow of an arbitrarily long series of high level language instructions into an arbitrarily long sequence of reconfigurations of an array of reconfigurable circuits coupled with I/O and memory operations in order to functionally and practically perform a wide range of general purpose computing processes.

In a dynamically reconfigurable processor, most hardware components and circuits are adapted for at least partial reconfiguration with other hardware components and circuits in the transitions from one reconfiguration instruction to another. In distinction from prior art processor architectures is that most paths of many operations of a dynamically reconfigurable processor are generated and applied within a single instruction execution cycle and present no need for persistence beyond the instruction execution cycle in which they are generated, and are therefore not stored beyond the completion of a single instruction execution.

Occasionally, access to a value received, created or determined by a reconfigurable hardware component in an earlier executed instruction is required for the full execution of, or reconfiguration in accordance with, a later executed instruction. It is understood that the instant term "value" includes both constant values and variable values that may be altered in the computational processing of the comprising dynamically reconfigurable processor, wherein the value of interest may be a software program variable value or a software program constant value.

Such values are preferably maintained in logic elements, registers, memories and other value storing elements or components of the instant dynamically reconfigurable processor. Yet these hardware components may be required to hold an alternate value or values in intervening instruction executions rather than be available to devotedly store a same value during the execution cycles of one or more instructions.

The invented compiler preferably manages the storage and positioning of values within a dynamically reconfigurable processor as required for successful executions of one or more instructions of the dynamically reconfigurable processor by determining a pathway of value storage elements across a duration of time to provide these values as required in the execution of one or more instructions by the dynamically reconfigurable processor without creating a conflict of assignment of hardware elements or components in storing values. It is a clear benefit to a dynamically reconfigurable processor to be adapted to persist certain values beyond one or more reconfigurations of its reconfigurable logic elements and other hardware elements. Yet the prior art fails to provide compilers optimally adapted to prevent conflicts of assignments of value storing elements across the execution cycles of two or more reconfiguration instructions in the operation of a dynamically reconfigurable processor.

There is therefore a relatively long-felt need in the application and design of dynamically reconfigurable processors to provide methods and systems that enable a more efficient and effective temporal persistence of values in order to provide one or more persistent values as required in the computational activities of dynamically reconfigurable processor as required by one or more instances of reconfiguration and instruction executions.

SUMMARY AND OBJECTS OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The method of the present invention (hereinafter, "the invented method") provides a method for a dynamically reconfigurable processor to persist values within an instruction execution cycle or between or within two or more instruction execution cycles. In a first optional aspect of the invented method, a value made available within a dynamically reconfigurable processor in a first exemplary instruction execution is persisted within the dynamically reconfigurable processor and accessed (a.) in a later stage of the same instruction execution, and/or (b.) in the execution of a following instruction.

There may be more than one execution cycle performed within the assertion of an individual instruction. In a first preferred embodiment of the invented method, an instruction loaded into the plurality of back buffers may be repeatedly asserted until a next executed instruction replaces it in the plurality of the back buffers, whereupon the newly loaded instruction is next asserted from the plurality of back buffers.

It is understood that the disclosure of the exemplary embodiments of dynamically reconfigurable processors disclosed on the present disclosure are offered as illustrative and that these descriptions are not meant to be limiting the scope of either the invented method or of dynamically reconfigurable processor design.

In various optional or additional aspects of the invented method, the value may be persisted between the first exemplary instruction and the following exemplary instruction in a same value storage hardware element, such as a logic element, an iterator of a logic element, a register, a memory circuit, or a value storage hardware circuit external to the dynamically reconfigurable processor. In other alternate, additional or optional aspects of the invented method, a value may be transferred for storage between and among two or more value storage elements and delivered to and/or positioned within the dynamically reconfigurable processor for access during the following exemplary instruction execution. An iterator is an electronic circuit It is understood that the iterator is an electronic circuit that is disclosed in both U.S. Pat. No. 7,840,777, at least as presented in FIGS. 11, 22, and 31 therein and in accompanying descriptions of various alternate embodiments.

It is an additional object of the invented method to provide a method that includes or provides a software compiler (hereinafter, "the invented compiler") that generates machine-readable code that directs a dynamically reconfigurable processor in persisting a value as instantiated in a first exemplary instruction for later use in and access during a second exemplary instruction, wherein the second exemplary instruction is executed after an execution of the first exemplary instruction. It is understood that in certain alternate embodiments of the invented method, the invented compiler may be adapted to be run and applied by a prior art general purpose computer and/or by a computational system comprising a dynamically reconfigurable processor in whole or in part.

It is understood that the word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

The invented method optionally or additionally provides or applies a software model of hardware aspects of a dynamically reconfigurable processor and uses the software model to preferably automatically compile software code, wherein the resulting compiled software code is improved in structure to more efficiently implement a generation of software instructions that may be executed by a dynamically reconfigurable processor.

It is an optional and preferred object of the invented method to derive compiled software code from software encoded information as required for the compiled software to more closely instantiate or provide, or be further processed into, one or more instructions or instruction parts that are executable by a dynamically reconfigurable processor.

Certain still alternate preferred embodiments of the invented method alternately or additionally provide a computer-implemented selection of a software operation and the association of one or more software models corresponding to one or more digital hardware elements of a dynamically reconfigurable processor with the selected software operation, wherein the digital hardware elements that correspond to the associated software models are capable of instantiating or embodying the logic and functionality of the selected software operation.

It is understood that the scope of definition of the term "software construct" of the present disclosure includes a software coded logical statement or instruction that may include (a.) an instruction such as an opcode, a command, machine-executable instruction; (b.) a null instruction, i.e., an instruction to not perform an operation, e.g. a no-op opcode; (c.) a datum or data; (d.) a variable; (e.) references to additional commands, data and variables; and/or other or additional opcode, mathematical expression or logic algorithm that may be expressed or represented in software in a form that is executable by a computer or from which a machine-executable instruction can be derived, determined or compiled.

The invented processor disclosed in the present disclosure includes a plurality of electronic elements at least some of which may be assignable and reassignable in accordance with a software construct or software coded information. Alternatively, one or more elements or components of the processor may be distinguishable by functionality, capability and/or structure. The processor further comprises an input circuitry that accepts and/or stores a plurality of software coded constructs, instructions, data and/or information.

Additionally or alternately, alternate preferred embodiments of the invented processor may include, and/or alternate preferred embodiments of the invented method may provide and may be employable by, a reconfigurable logic unit in whole or in part as disclosed in U.S. Pat. No. 7,840,777 issued on Nov. 23, 2010 to inventor Robert Mykland and titled "Method and apparatus for directing a computational array to execute a plurality of successive computational array instructions at runtime" and a method of programming thereof. It is understood r Still additionally or alternatively, the invented method optionally provides a reconfigurable logic unit as disclosed in U.S. Nonprovisional patent application Ser. No. 13/301,763 filed on Nov. 21, 2011 to inventor Robert Mykland and titled "CONFIGURABLE CIRCUIT ARRAY" and a method of programming thereof.

DEFINITION OF CERTAIN TERMS

Certain new and special terms are used in the present disclosure and claims in describing various aspects of the invented method and invented processor, wherein these terms include the following:

An instruction is an encoded data that contains configuration information and optionally includes data to be processed by the same dynamically reconfigurable processor to which the configuration information is applied, wherein the configuration information may be applied by a dynamically reconfigurable processor to configure and/or reconfigure itself and accordingly process other data, and wherein the other data is (a.) currently existent in the processor and/or (b.) provided in a same instruction that contains the configuration information.

A dynamically reconfigurable processor is a digital computing system, such as the dynamically reconfigurable processor disclosed in U.S. Pat. No. 7,840,777, that applies an indefinitely long sequence of instructions to configure and/or reconfigure and thereupon to process information.

The term component is defined herein to include any separately assignable digital circuit of a dynamically reconfigurable processor. Components of dynamically reconfigurable processors include suitable digital circuits and elements known in the art, to include cones, muxes, iterators, look up tables and logic gates as disclosed in U.S. Pat. No. 7,840,777.

A logic element is a digital circuit of a dynamically reconfigurable processor that comprises one or more components. Dynamically reconfigurable processors, such as the dynamically reconfigurable processor disclosed in U.S. Pat. No. 7,840,777, preferably contain a plurality of logic elements that are each formed with a same combination of components. The inclusion of a plurality of homogeneous logic elements in the invented processor is a preferred optional aspect of the invented method that generally increases the efficiency of the invented method. A logic element may include one or more cones, muxes, iterators, and logic gates as disclosed in U.S. Pat. No. 7,840,777 and/or one or more suitable digital circuits and elements known in the art. It is understood that not all components of a dynamically reconfigurable processor are part of a logic element.

A software resource, or "resource", is a software construct that mathematically models and represents a component or an aspect of a component of a dynamically reconfigurable processor. A resource may include configuration information and/or other information pertinent to the function, assignment, configuration and/or reconfiguration of the component. More specifically, a resource may be a generic resource identified by digital type, structure and/or function be associated with a specific component or aspect of a component, for example a specific input to an uniquely identified iterator of an individually identified logic element of a dynamically reconfigurable processor. Various resources may be or include mathematical models of the structure and functionality of, but not limited to, an iterator, cone, mux as disclosed in U.S. Pat. No. 7,840,777.

A software cell (hereinafter, "cell") is a software construct that mathematically models and represents a logic element of a dynamically reconfigurable processor. A cell can contain pertinent resources associated with components of a relevant logic element or type of logic element. The cell may also contain configuration or other data pertinent to a particular logic element or logic element structure or type. As with resources, a cell can be either (a.) generic and identify a type of logic element or logic element structure; or (b.) specify a single and uniquely identified logic element of a dynamically reconfigurable processor.

A bubble is a software coded model that comprises a software coded collection of configuration information, data to be processed, resources, cells and optionally additional software models of aspects of a dynamically reconfigurable processor. Bubbles are applied to generate potential instructions that may be developed into applied instructions. More particularly, a bubble is a mathematical model that preferably includes (a.) a plurality of software constructs that contain configuration information and optionally data to be processed and/or locations of data to be processed; and (b.) resources and cells that mathematically model aspects, components and logic elements of the dynamically reconfigurable processor that would be required for, and enable, the dynamically reconfigurable processor to apply the configuration information and process the data in accordance with the configuration instruction. A bubble may thus be used to form a potential instruction and to determine if a potential instruction (a.) can be implemented by the dynamically reconfigurable processor; and/or (b.) shall be limited in size or content in order to be applicable by the dynamically reconfigurable processor. A bubble may also be applied to determine, estimate or forecast the efficiency of the dynamically reconfigurable processor in implementing an instruction or a potential instruction.

A place is a reference to a specific position of a specific logic element within a reconfigurable logic array, wherein a statement that "a value is stored in a place" specifies the position of the logic element storing the instant value relative to other positions of components comprised within the reconfigurable logic array. It is understood that a logic element preferably comprises at least three iterators, and each iterator is preferably adapted to store a value magnitude of at least the word width of the array, e.g., 8 bits, 16 bits, 32 bits, 64 bits or more.

A path is a software representation of the storage and transport of a specific word of data in an iterator of one or more dynamically reconfigurable processor instructions. A path may be as short as the specification of a word of data in an iterator resource for the duration of a single instruction cycle. Alternately, a path may specify the persistence of a value in an iterator between or among two or more instructions of a dynamically reconfigurable processor. The action of the invented method is to assign places to all paths. It is understood that a value may be a word of data.

The term start is defined within the present disclosure as a first part of a path within a dynamically reconfigurable processor wherein an initial place of a value is specified.

The term end is defined within the present disclosure as a sink element of a path that is being placed and routed.

The term loader circuit is defined within the present disclosure as a hardware circuit element of a memory controller that writes data from a memory circuit, to include a register, an on-chip memory, an off-chip memory, an on-chip peripheral, or an off-chip peripheral and into a logic element of a reconfigurable logic array.

The term storer circuit is defined within the present disclosure as a hardware circuit element of a memory controller that writes data from a logic element of a reconfigurable logic array and into a memory circuit, to include a register, an on-chip memory, an off-chip memory, an on-chip peripheral, or an off-chip peripheral.

A function is a logical grouping of one or r more bubbles.

A data flow model is a software construct that models logical and mathematical operations, comprising but not limited to software opcodes and hardware circuits. Each input to each referenced or included operation may be linked back to a source of the related, included or referenced operation and input sources of each operation, and each output of each referenced or included operation may be or is linked to where the output is used in subsequent or dependent operations or calculations.

The scope of meaning of the term "to rip up" as intended in the present includes the general understanding of this term in the art as applied in modified notional assignments of aspects and connections of a representation of electronic hardware circuitry. More particularly, the meaning of the wording "rip up" is used, as in the art, to describe a process of unassigning a virtual software structure in order to derive an alternate representation of placement and routing with a reconfigurable or reprogrammable circuit.

An array link is the connection of two places affected via the array connectivity among logic elements of the reconfigurable logic array from a first logic element located at a first place to a second logic element located at a second place. The function of an array link is to transfer a value from one place to another place in order to position the value at a second place within the reconfigurable logic array.

A register link is the connection of a place and a register of a dynamically reconfigurable processor affected via the internal connectivity of the reconfigurable logic array. The function of a register link is to transfer a value from a place to a value storage circuit of a register in order to position the value at a second position with the reconfigurable logic array.

The term spill/fill denotes a temporary transfer of a value from an iterator to a location in memory, followed by a transfer of the value back from the referenced memory location to another iterator or back to the same iterator during a subsequent instruction execution.

The terms prefix and suffix denote aspects of an execution pipeline of a dynamically reconfigurable processor. A prefix is a portion of a bubble that models a data load cycle of an instruction. A suffix is a portion of a bubble that models a data store cycle of an instruction.

A prefix conflict is a detected iterator overflow conflict in the prefix of a bubble, as determined by the invented compiler. In the case of a prefix, the invented compiler determines that a value can't be placed at an indicated place because each of the value storage circuits, e.g., iterators, of the indicated place are already committed within a comprising instruction to storing other values.

A suffix conflict is a compiler determination of an iterator overflow conflict in a suffix of a bubble, wherein the invented compiler determines that a value can't be placed at a selected place because all of the value storage elements, e.g., iterators, of the selected place are already committed to holding other values.

A source refers to any portion of the software model that places a value into an iterator.

A sink refers to any portion of the software model that receives a value from an iterator resource.

A loader resource (hereinafter, "loader") is a software representation of a memory controller circuit that delivers a value from memory or the register file to the reconfigurable logic array via an iterator. A loader may be referred to as a "hard source" because a loader, if activated, always acts to place a value from memory or the register file into an iterator.

An itout resource is a software representation of an itout circuit, wherein an itout resource (hereinafter, an "itout") models an array output latch of an iterator. An itout may be referred to as a "hard sink" because, if activated, it always acts to "use" a value by expressing that value into the array. Thus an itout ultimately requires a specific value to be in a specific iterator in order to serve the functional needs of a software program correctly.

An itin resource is a software representation of an itin circuit, wherein an itin resource (hereinafter, an "itin") models an array input latch of an iterator. An itin may be referred to as a "hard source" because an itin, if activated, always acts to place a value from the array into an iterator.

A soft source is a software representation of a determination by the invented compiler of a situation where data stored in an iterator as part of the initial conditions of an instruction's execution and may arrive there from the action of two or more previous instructions, such as either a loop feedback value or a feed forward value in the case of a conditional branch.

A soft sink is a software representation of a determination by the invented compiler of a situation where data stored in an iterator may be used by two or more subsequent instructions, such as either a loop feedback value or a feed forward value in the case of a conditional branch.

A pi value is a software representation of a loop variable. It links an initial value of a loop variable with the new value generated and applied during each next iteration of the loop. These two values must be linked and stored at the same place because the first instruction in a loop must find a given value at a given place each time that instruction executes, so preferably the initial value and the new value are eventually constrained to occupy the same iterator at the top of the loop. The pi resource is there because otherwise there would be no particular connection between the initial value of a loop variable and the next version of that variable created in the loop.

A storer resource (hereinafter, a "storer") is a software representation of a memory controller circuit that delivers data from an iterator of the reconfigurable logic unit to a memory or a register file. A storer may be referred to as a "hard sink" because, if activated, it always acts to "use" a value by storing that value in memory or the register file. Thus a storer ultimately requires a specific value to be in a specific iterator in order to serve the functional needs of a software program correctly.

The address register bus resource (hereinafter, an "addreg") is a software representation of a configurable bus circuit that conveys a value from the reconfigurable logic array to the register file via an iterator. An addreg may be referred to as a "hard sink" because, if activated, it always acts to "use" a value by storing that value in the register file. Thus an addreg ultimately requires a specific value to be in a specific iterator in order to serve the functional needs of a software program correctly.

It is understood that the three terms of "array", "reconfigurable logic array" and reconfigurable logic unit" are defined as synonyms as used within the present disclosure.

BRIEF DESCRIPTION OF THE FIGURES

These, and further features of the invention, may be better understood with reference to the accompanying specification and drawings depicting the preferred embodiment, in which.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
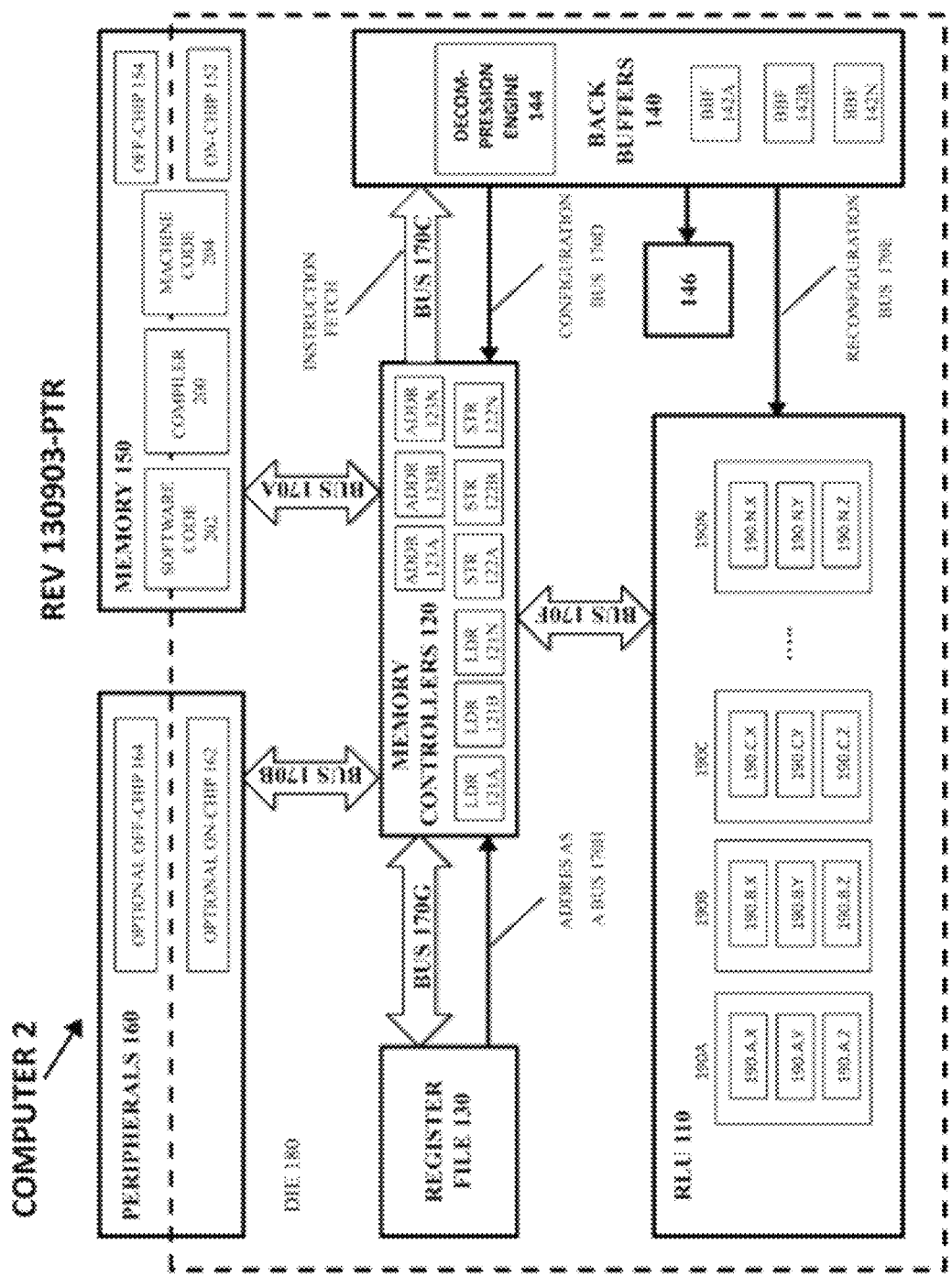
FIG. 1 is a block diagram of software and electronic software elements of an exemplary dynamically reconfigurable computer comprising a dynamically reconfigurable processor, peripherals and optional off-chip memory that comprise a computer.

Referring now generally to the Figures and particularly to FIG. 1, FIG. 1 is a block diagram of elements of an exemplary dynamically reconfigurable processor 100 that includes a reconfigurable logic array 110 (hereinafter, "reconfigurable logic unit" 110 or "RLU" 110), a plurality of memory controllers 120 comprising a plurality of loader circuits 121A-121N, a plurality of storer circuits 122A-122N and a plurality of address register circuits 123A-123N. The dynamically reconfigurable processor 100 (hereinafter, "DRP 100") further comprises a register file 130, a back buffer block 140 comprising both a plurality of back buffer circuits 142A-142N and optionally a decompression engine 144, a processor control circuit 146, a memory 150 optionally comprising on-chip memory 152 and/or off-chip memory 154, optionally one or more peripherals 160 that may include an on-chip peripheral 162 and/or an off-chip peripheral 164 and a plurality of buses 170A-170H.

In the first preferred alternate embodiment of the dynamically reconfigurable processor 100 (hereinafter, "the DRP" 100) the RLU 110, the plurality of memory controllers 120, the register file 130, the back buffer 140, the on-chip memory 152 and one or more on-chip peripherals 160 are positioned and optimally formed on a same unified semiconductor die 180.

A memory bus 170A bidirectionally communicatively couples the plurality of memory controllers 120 (hereinafter, "the memory controller" 206) and the memory 150. It is understood that the plurality of memory controllers 120 comprises a plurality of memory controller circuits, to include storer circuits 122A-122N, loader circuits 121A-121N, and address register circuits 123A-123N. A peripheral bus 170B bidirectionally communicatively couples the memory controllers 120 and one or more peripherals 160.

An instruction fetch bus 170C unidirectionally communicatively couples the memory controllers 120 with the back buffer 140 and enables the transfers of information from the memory controllers 120 to the back buffer 140.

A configuration bus 170D unidirectionally communicatively couples the back buffer with the memory controllers 120 and enables the transfer of configuration data from the back buffer 140 to the memory controllers 120. A reconfiguration bus 170E unidirectionally communicatively couples the back buffer with the RLU 110 and enables the transfer of reconfiguration data from the back buffer 140 to the RLU 110.

An RLU bus 170F bidirectionally communicatively couples the memory controllers 120 and the RLU 110. A register file bus 170G bidirectionally communicatively couples the memory controllers 120 and the register file 130. An address bus 170H unidirectionally communicatively couples the register file 130 and the memory controllers 120 and enables transfer of addresses of the memory 150 from the register file 130 and to the memory controllers 120.

The RLU 110 includes a plurality of communicatively coupled logic elements 190A-190N, wherein the invented processor DRP 100 comprises the RLU 110 having 128 individual logic elements 190A-190N, and each logic element 190A-190N further comprises three iterators 190.A.X-190.A.Z-190.N.X-190.N.Z. It is understood that the DRP 100 is a preferred embodiment of invented processor.

The logic elements 190A-190N are arranged and communicatively coupled together within the RLU 110 as an uninterrupted, continuous unidirectional communicatively coupled toroidal loop composed of the array of logic elements 190A-190N. The logic elements 190A-190N of the RLU 110 are also spatially organized into separate pluralities of logic elements 190A-190N that are each arranged into rows and columns. Busses of or connected with the RLU 110 that communicate with the memory controllers 120 run along the logic element columns and are usable by the logic elements 190A-190N in that column.

Referring now generally to the Figures and particularly to FIG. 1 and FIG. 13, each loader circuit 121A-121N is coupled with and controls a particular dedicated loader communications bus 124A-124N (hereinafter, "loader bus" 124A-124N). Each loader bus 124A-124N accepts data from the memory 150 and delivers data read from the memory 150 to one or more of a subset of iterators 190.A.X-190.N.Z of the RLU 110. Each loader circuit 121A-121N is further unidirectionally communicatively coupled with the register file address bus 170H and is enabled to receive memory addresses of the memory 150 from the register file 130 via the address bus 170H. The memory addresses received by the loader circuits 121A-121N from the register file 130 via the address bus 170H may be applied by the recipient loader circuit 121A-121B to direct its dedicated loader bus 124A-124N to access data from within the memory 150 at the indicated memory address as received for the register file, whereupon the data accessed from the memory may be selectively latched into one or more iterators 190.A.X-190.N.Z to which the instant loader bus 124A-124N is uni-directionally communicatively coupled.

Each loader circuit 121A-121N is additionally uni-directionally coupled with the register file bus 170G and may receive data from the register file 130 via the register file bus 170G. Data received from the register file 130 by each loader circuit 121A-121N via the register file bus 170G may be selectively latched into one or more of a preconfigured subset of iterators 190.A.X-190.N.Z of the RLU 110 via the recipient loader's dedicated loader bus 124A-124N, and as directed by the loader circuit 121A-121N to which the instant loader bus 124A-124N is dedicated.

Referring now generally to the Figures and particularly to FIG. 1 and FIG. 14, each storer circuit 122A-122N is coupled with and controls a particular dedicated storer communications bus 125A-125N (hereinafter, "storer bus" 125A-125N). Each storer bus 125A-125N accepts iterator data from each of a subset of iterators 190.A.X-190.N.Z of the RLU 110 and asserts the accepted iterator data into the memory 150. Each storer circuit 122A-122N is further unidirectionally communicatively coupled with the register file address bus 170H and is enabled to receive memory addresses of the memory 150 from the register file 130 via the address bus 170H. The memory addresses received by the storers 121A-121N from the register file 130 via the address bus 170H may be applied by the recipient storer 121A-121B to direct its dedicated storer bus 125A-125N to write data into the memory 150 at the indicated memory address as received for the register file 130. Each storer circuit 122A-122N is additionally uni-directionally coupled with the register file bus 170G and may write data into the register file 130 via the register file bus 170G.

Referring now generally to the Figures and particularly to FIG. 1 and FIG. 15, each address register bus controller 123A-123N is coupled with and controls a particular and dedicated address register communications bus 125A-125N (hereinafter, "addreg bus" 126A-126N). Each address register bus controller 123A-123N is uni-directionally coupled with the register file bus 170G and may write data into the register file 130 via the register file bus 170G. Each addreg bus 126A-126N, as directed by its dedicated address register bus controller 123A-123N, thereby accepts iterator data from each of a subset of iterators 190.A.X-190.N.Z of the RLU 110 and asserts the accepted iterator data into the register file 130.

The DRP 100 includes some or all of the aspects and elements of the dynamically reconfigurable processor disclosed in U.S. Nonprovisional patent application Ser. No. 13/301,763 as filed on Nov. 21, 2013, and the RLU 110 includes some or all of the aspects and elements of the dynamically reconfigurable logic unit disclosed in this same US Nonprovisional patent application Ser. No. 13/301,763.

Figure 2:
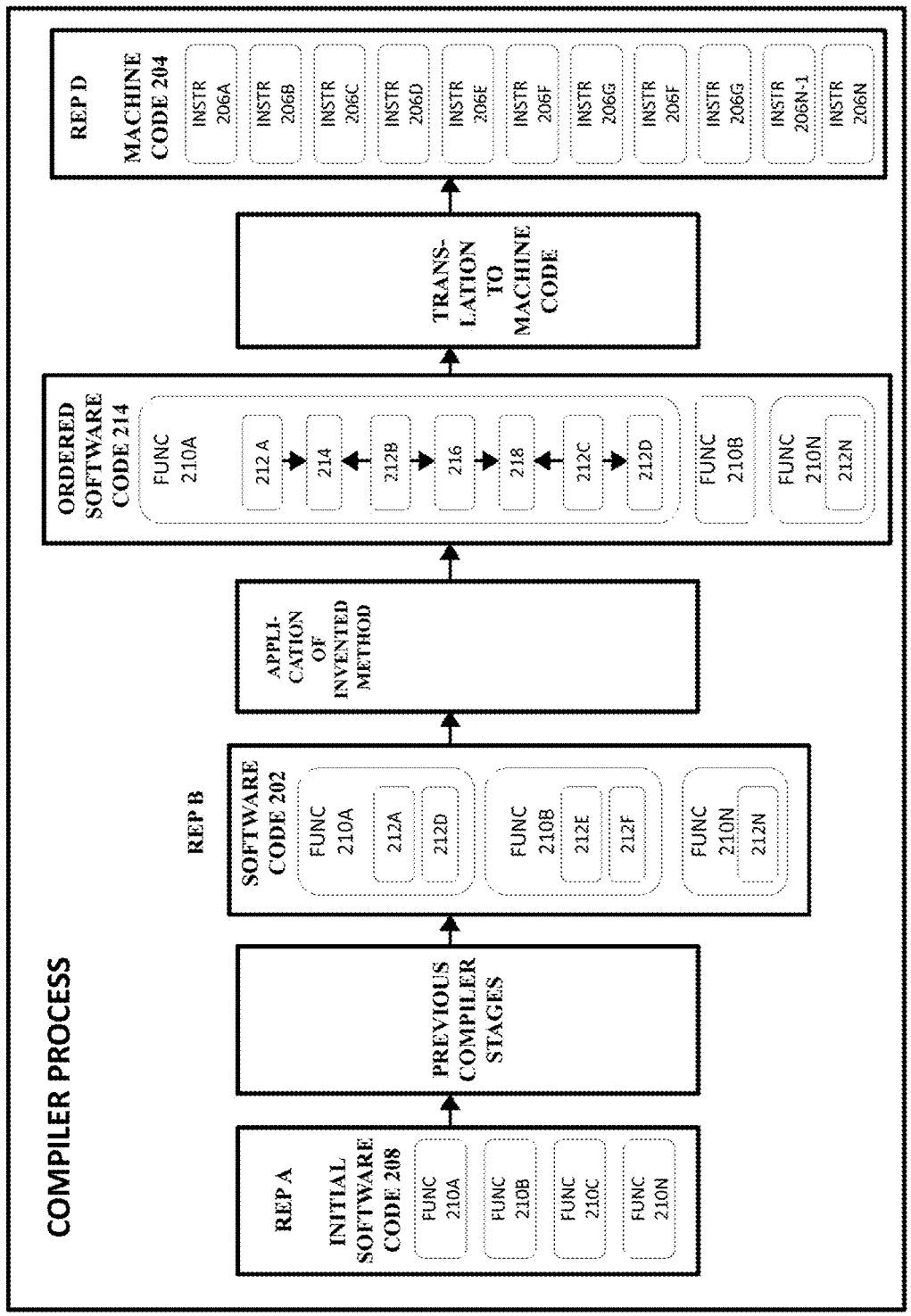
FIG. 2 is a representation of an application of a first alternate preferred embodiment of the invented method wherein an invented compiler is applied to a software code to generate a machine-executable code.

Referring now generally to the Figures and particularly to FIG. 1 and FIG. 2, FIG. 2 is an illustration of an application of the first preferred embodiment of the invented method (hereinafter, "the first method") wherein a preferred embodiment of the invented compiler 200 is applied to a software code 202 to generate a machine-executable code 204 (hereinafter, "machine code" 204), wherein the machine code 204 may be applied to program the DRP 100 with a plurality of machine-executable instructions 206A-206N.

Each instruction 206A-206N includes an execution word (not shown) that is latched into the processor control circuit 146 from the back buffers 140 during or as part of the process of executing the instruction 206A-206N. As each instruction 206A-206N is asserted from the back buffers 140, the execution word of the currently asserted instruction 206A-206N is contemporaneously asserted to the processor control circuit 146 and within the computer 2.

The functions of the processor control circuit 146 of the DRP 100 include but are not limited to (a.) controlling instruction execution interleaving; (b.) determining when stages of instructions 206A-206N shall be skipped; (c.) stalling the processing of the DRP 100 if data sourced from beyond the die 180 is required and not yet available to the DRP 100; responding to interrupt signals or interrupt commands; setting an array timer of the processor control circuit 146; and automatically directing the memory controllers 120 to fetch instructions 206A-206N into the back buffers 140.

FIG. 2 illustrates a process wherein an initial software code 208 comprising a plurality of functions 210A-210N is processed by earlier stages of the invented compiler 200 as disclosed in the co-pending US Nonprovisional patent applications as referenced above to generate the software code 202. The software code 202 comprises sequentially ordered functions 210A-210N that each includes one or more bubbles 212A-212N that are further sequentially ordered. A resultant ordered software code 214 is generated by application of the invented method to the software code 202 that comprises the modified bubbles 212A-212N that are modified to enable provision of values across instructions 206A-206N of bubbles 212A-212N. Exemplary additional bubbles 214-218 are presented in reference to the methods of FIGS. 10, 11 and 12.

The invented compiler 200 is adapted to discover and resolve resource conflicts in a compilation of the machine code 204. For an example, consider an itin at place 29 in bubble A is connected to an itout at place 65 in bubble B. This is a place conflict.

First the invented compiler 200 might try moving the start to resolve the place conflict. This would mean moving the itin to place 65. Let's say in this case the itin can't be moved to place 65 because no itin resources are available at place 65, so this conflict can't be resolved in this fashion.

Next the invented compiler 200 tries moving the end to resolve the conflict. This would mean moving the itout to place 29. Let's say in this case the itout can't be moved to place 29 because there is no route in bubble B from place 29 to the value's ultimate destinations in bubble B, so this conflict can't be resolved in this fashion.

Next the invented compiler 200 tries moving both the start and the end to a third mutually agreeable place. Let's say in this case there are no places where there are both itins available in bubble A that can be routed in bubble B to the value's ultimate destinations in that bubble, so this conflict can't be resolved in this fashion.

For many place conflicts, the invented compiler 200 tries an array link, but in this case, there is no intervening array, so this method is skipped.

Next the invented compiler 200 tries a register link, which would entail splitting the path by moving the value into an addreg in bubble A and loading it back into the array at a different place in B through the use of a loader. Let's say all the loaders are in use in bubble B, so this link can't be accomplished.

Next the invented compiler 200 creates a new bubble between bubbles A and B. Such a created bubble would resolve the above conflict regardless of the many circumstances outlined. The invented compiler 200 could always create an array link in the created bubble that would resolve the conflict.

Figure 3:
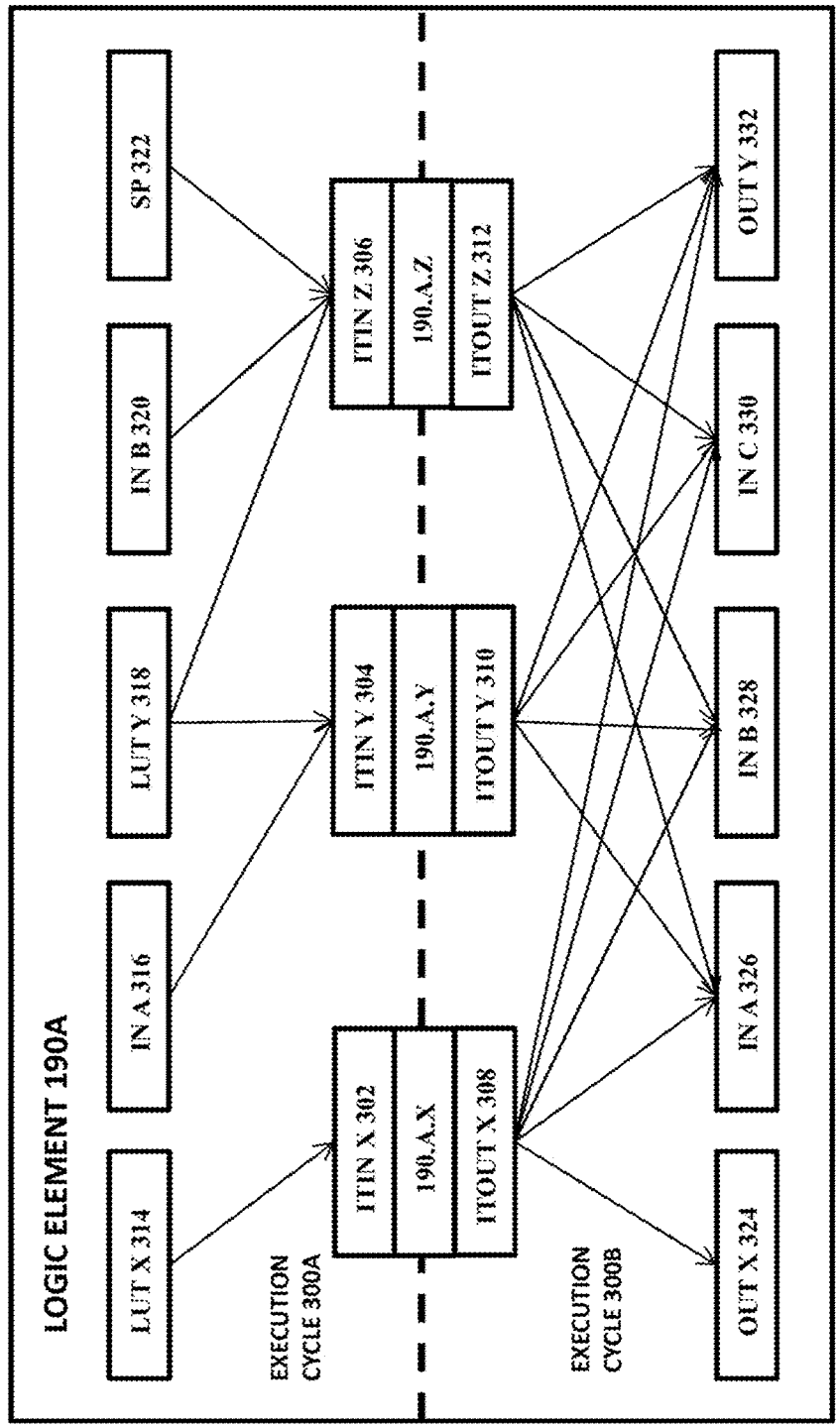
FIG. 3 is a schematic of a connection diagram of an exemplary first iterator of the first logic element of the exemplary dynamically reconfigurable processor of FIG. 1.

Referring now generally to the Figures and particularly to FIG. 3, FIG. 3 is a block diagram of a first preferred embodiment of connectivity available to an exemplary first iterator 190.A.X of an exemplary first logic element 190A. It is understood that the explanation of Figure C applies to each logic element 190A-190N and is not offered as a limitation of the scope of the invented method. It is further understood that alternate schemes and means for providing connectivity and functionality of the logic elements 190A-190N the iterators 190.A.X-190.N.Z, and other elements of the logic elements 190A-190N are made obvious to one of ordinary skill in the art in light of the present disclosure.

The first logic element 190A contains the input connectivity to each of its iterators 190.A.X. 190.A.Y & 190.A.Z that can be used at the end of an exemplary first array execution cycle A 300A and contains the output connectivity from the iterators 190.A.X. 190.A.Y & 190.A.Z that can be used at the beginning of an exemplary second array execution cycle B 300B. It is understood the exemplary first array execution cycle A 300A is executed prior to an execution of the exemplary second array execution cycle A 300B and as directed by an execution of the machine code 204 by the DRP 100. It is further understood that iterators 190.A.X-190.N.Z are electronic circuits.

It is noted that while array execution cycle A 300A must precede array execution cycle B 300B, that no other relationship between array execution cycle A 300A and array execution cycle B 300B is implied by this diagram. Array execution cycle A 300A and array execution cycle B 300B can be the result of the reconfiguration data of two different instructions 206A-206N or a same instruction 206A-206N executed multiple times, such as in a loop. Array execution cycle B 300B may immediately follow array execution cycle A 300A or be separated in time from array execution cycle A 300A by an arbitrary number of instruction load, data load, array execution, or data store cycles of executed instructions 206A-206N.

Generally data can be latched into an itin circuit X 302, itin circuit Y 304, and itin circuit Z 306 at the end of the first array execution cycle A 300A and subsequently can be asserted at the beginning of instruction cycle B 300B via itout circuit X 308, itout circuit Y 310, and itout circuit Z 312. When data is latched into itin circuit X 302 it is stored in iterator X 190.A.X. When data is latched into itin circuit Y 304 it is stored in iterator Y 190.A.Y. When data is latched into itin circuit Z 306 the latched data is stored in iterator Z 190.A.Z. Data can be held in iterators X 190.A.X, Y 190.A.Y, and Z 190.A.Z for an arbitrary period of operating time provided that the data is not overwritten by an intervening reconfiguration of the itin circuit X 302, the itin circuit Y 304, or the itin circuit Z 306 respectively that latches in new data or by data written into iterators X 190.A.X, Y 190.A.Y, and Z 190.A.Z respectively by memory controllers 120 configured to provide data to these iterators X 190.A.X, Y 190.A.Y, and Z 190.A.Z during an intervening data load cycle.

Specifically data produced by a logic or math operation that a look up table circuit LUT X 314 is reconfigured to perform during the first execution cycle A 300A can be latched into the itin circuit X 302 at the end of the same first execution cycle A 300A. Data selected by reconfiguration for input into an input circuit A 316, including any static or dynamic bit or word shifts input is reconfigured to perform during execution cycle A 300A can be latched into the itin circuit Y 304 at the end of the first executed execution cycle A 300A. Data produced by a logic operation that a look up table circuit LUT Y 318 is reconfigured to perform during the first execution cycle A 300A can be latched into the itin circuit Y 304, the itin circuit Z 306, or both itin circuit Y 304 or the itin circuit Z 306 at the end of the first execution cycle A 300.A. Data selected by reconfiguration for input into input circuit B 320 including any static or dynamic bit or word shifts input B is reconfigured to perform during the first execution cycle A 300A can be latched into the itin circuit Z 306 at the end of the first execution cycle A 300A. Data produced by a logic or math operation that an SP circuit 322 is reconfigured to perform during the first execution cycle A 300A can be latched into the itin circuit Z 306 at the end of the first execution cycle A 300A.

Specifically data asserted by an itout circuit X 324 at the beginning of the second, later executed, execution cycle B 300B can be selected by an output circuit X 324, an input circuit A 326, an input circuit B 328, an input circuit C 330, or an output circuit Y 332. Note that input circuit A 316 and the input circuit A 326 respectively represent the same physical hardware on two successive execution cycle A 300A and execution cycle B 300B.

Similarly input circuit B 320 and input circuit B 328 respectively represent the same physical hardware on two successive execution cycles A 300A and B 300B.

Data asserted by the itout circuit Y 332 at the beginning of the second execution cycle B 300B can be selected by the input circuit A 316, the input circuit B 320, the input circuit C 330, or the output circuit Y 332.

Similarly data asserted by the itout circuit Z 312 at the beginning of the second execution cycle B 300B can be selected by the input circuit A 326, the input circuit B 328, the input circuit C330, or the output circuit Y 332.

Figure 4:
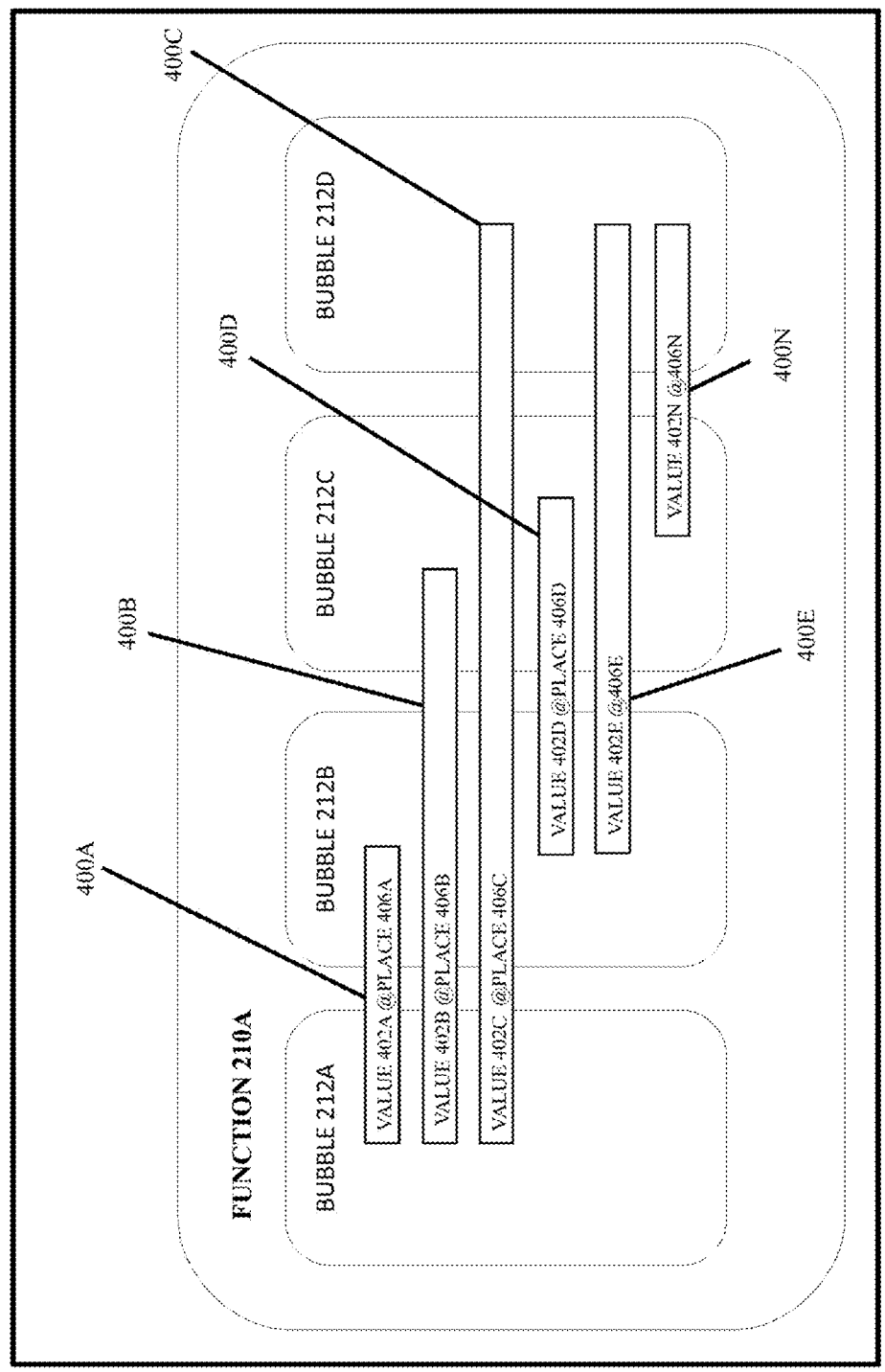
FIG. 4 is illustration of paths extending from one bubble to at least one higher ordered bubble of FIG. 1, wherein each path specifies a place of a bubble and a value.

Referring now generally to the Figures and particularly to FIG. 4, FIG. 4 is a representation of an alternate version of an exemplary first function 210A that comprises four sequentially ordered bubbles 212A-212D. The first bubble 212A comprises a plurality of paths 400A-400C and/or portions thereof. Each path 400A-400C is defined by holding and persisting a specific value 402A-402C at a single particular place 406A-406C for a duration that extends from at least a lower sequential bubble 212A to a higher sequential bubble 212B. It is understood that the bubbles 212A-212N are ordered in a single dimensional sequence from lowest ordered bubble 212A to highest ordered bubble 212N, wherein the element number designator N in the case of bubbles 212A-212N indicates an arbitrarily high whole number. In distinction, the element number designator N for paths 212A-212N is preferably limited to the quantity of iterators 190.A.X-190.N.Z of N logic elements 190A-190N of the RLU 110. It is understood that a value 402A-402N of any bubble 212A-212N may be either a constant value or a variable that may change in numerical magnitude or symbolic expression in the execution of the instructions 206A-206N by the DRP 100.

It is understood that one or more values 402A-402N are not each necessarily numerical constants or fixed symbolic representations, but rather one or more values 402A-402N be may be variables that change or are changed in designation or numerical representation in the process of instruction execution.

Figure 5:
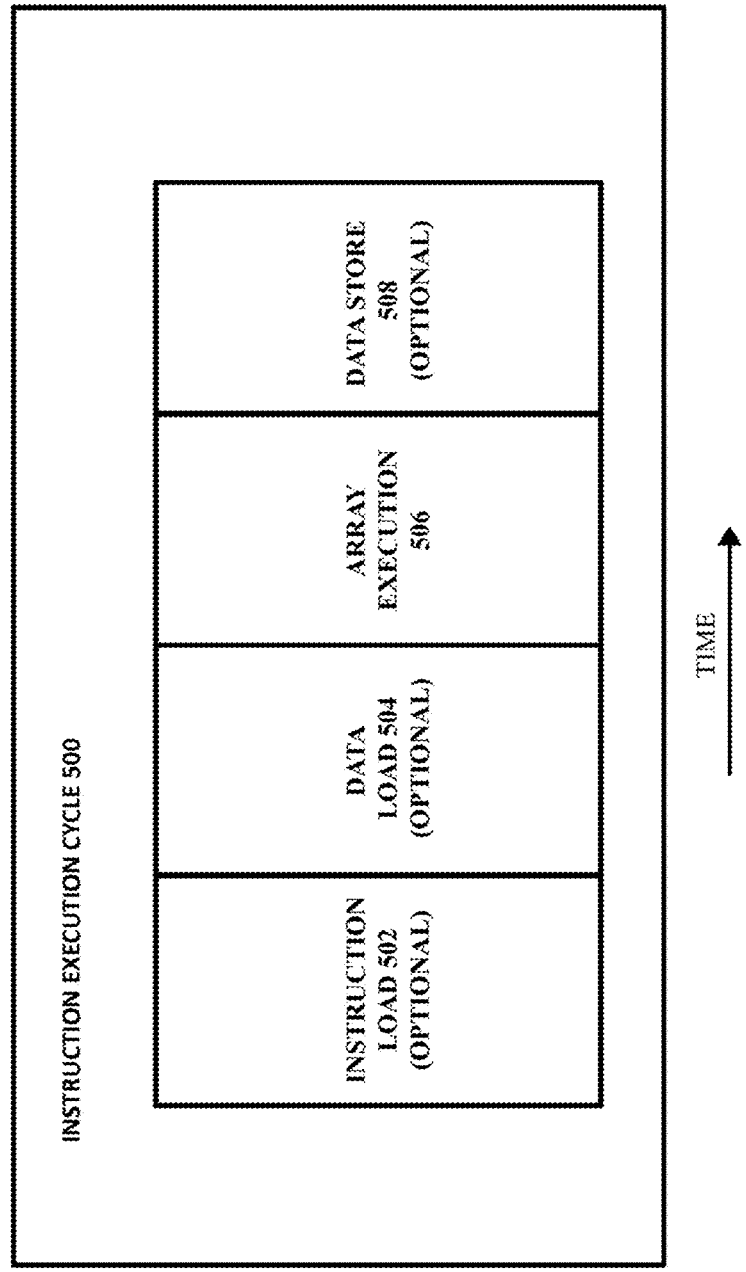
FIG. 5 is a representation of four dynamic and sequential aspects of an instruction execution by the dynamically reconfigurable processor of FIG. 1.

Referring now generally to the Figures and particularly to FIG. 5, FIG. 5 is a representation of the four dynamic and sequential aspects 500-506 of an instruction execution 500 by the DRP 100. These four phases instruction load 502, data load 504, array execution 506, and data store 508. In the instruction load phase 502, a single instruction 206A-206N is read from memory 150 into the instruction back buffer 140. If the instruction 206A-206N in question is previously stored in a back buffer 140, the instruction load phase 502 may be skipped. The instruction load phase 502 never affects the contents of the iterators 190.A.X-190.N.Z. In the data load phase 504, data may be read from memory 150 into the iterators 190.A.X-190.N.Z. In the array execution phase 506, data and values 402A-402N may be asserted by the itouts 190.A.X.OL-190.N.Z.OL from iterators 190.A.X-190.N.Z at the beginning of the array execution phase 506 and latched by itins 190.ITIN of the iterators 190.A.X-190.N.Z at the conclusion of the array execution phase 506. In the data store phase 508, data and values 402A-402N may be written from iterators 190.A.X-190.N.Z into memory 150. Given the four phases 502-508 of execution, there are two unique states for iterators 190.A.X-190.N.Z per execution of each instruction 206A-206N, i.e., the prefix, after data has been loaded from memory, and the suffix, after data has been latched in the array. Data and values 402A-402N must be managed in all the states that the data and values 402A-402N occupy.

The Problem

Values 402A-402N in the DRP 100 may be required to be available within the RLU 110 for the execution of two or more instructions 206A-206N. Values 402A-402N are preferably available from an iterator 190.A.X-190.N.Z in an instruction cycle in which the instant value 402A-402N is accessed or applied during an execution of an instruction 206A-206N. As the reconfigurable logic of the RLU 110 is used by each successive execution of the instructions 206A-206N, the data and values 402A-402N available to each of these instructions 206A-206N comes from the iterators 190.A.X-190.N.Z at the beginning of its execution cycle. Likewise, any data or values 402A-402N created in the RLU 110 that shall be used outside an execution of the instruction 206A-206N shall be stored in an iterator 190.A.X-190.N.Z or the memory 150 at the end of an instruction execution cycle in order to be persisted. The next instruction 206A-206N will only see what data and values 402A-402N the combined actions of all previous instructions 206A-206N that have persisted in the iterators 190.A.X-190.N.Z, and only in the exact locations the previous instructions 206A-206N have persisted them. Thus there is a need to algorithmically enforce the persistence of data and values 402A-402N in iterators 190.A.X-190.N.Z between and among instructions 206A-206N in order for the correct data and values 402A-402N to be accessible, positioned and available for use at the correct RLU 110 location on a required execution cycle.

Each iterator 190.A.X-190.N.Z can store a word of data.

One or more values 402A-402N May have multiple sources, or places where a new value 402A-402N can be placed into the iterator 190.A.X-190.N.Z. Most commonly, a value 402A-402N is sourced by having a new value 402A-402N latched into it via the iterator 190.A.X-190.N.Z's input latch (or "itin") at the conclusion of an execution cycle. The second most common situation is that the value 402A-402N is sourced by memory 150 via an input memory controller, or loader. These sources are called "hard sources" because they must be separately managed to be moved to a new place.

A value 402A-402N can also be sourced by having more than one instruction 206A-206N possibly precede the value 402A-402N. For example, the first instruction 206A-206N in a loop may have those iterators 190.A.X-190.N.Z supplied by the instruction 206A-206N immediately preceding the loop or by the instruction 206A-206N at the conclusion of the loop. If the bottom of the loop supplies a new value 402A-402N, this new value 402A-402N is considered a "loop variable" of the loop in question. Loop variables are preferably identified at the top of the loop where the two values 402A-402N join with a fake resource of type pi. This joining can be modeled by considering the version of the value 402A-402N from the bottom of the loop to be a soft source of a value 402A-402N.

Any value 402A-402N that is used during or after a loop but is not modified by the instant loop still needs to be persisted throughout the loop, and is called a "loop constant" of the loop in question. Such values 402A-402N may still have two origins at the top of the loop, one from the instruction 206A-206N preceding the loop and the other from the bottom of the loop, but in latter case, the values 402A-402N needs to be preserved. This loop dynamic could be modeled by considering the version of the value 402A-402N from the bottom of the loop to be a "soft" source of a value 402A-402N.

A third way a value 402A-402N can have two origins is when there is a conditional jump in the instructions 206A-206N, such as to avoid a conditional loop. In this case, the value 402A-402N can either originate from the instruction 206A-206N containing the jump or from the instruction 206A-206N preceding the jump target in the case the jump was not taken. In this case the value 402A-402N could be different magnitudes depending on whether the jump was taken or not. This could be modeled by considering the version of the value 402A-402N from the instruction 206A-206N containing the jump to be a "soft" data source.

Each value 402A-402N can also have multiple sinks, or places where the value 402A-402N needs to be provided, accessed and used. A frequently discovered condition is that a value 402A-402N is expressed into the RLU 110 at the beginning of an execution cycle via the output of an itout 190.A.X.OL-190.N.Z.OL latch (or "itout"). Another common condition is that a value 402A-402N is stored in a register via the address bus, as represented by an addreg. Another common instance is that of a value 402A-402N is stored in the DRP memory 150 via an output memory controller, as represented by a storer. These are all "hard" value 402A-402N sinks.

A given instruction 206A-206N can also possibly precede multiple other instructions 206A-206N, creating situations that are effectively sink situations. An instruction 206A-206N at the bottom of a loop supplies data to both the instruction 206A-206N at the top of the loop and the instruction 206A-206N succeeding the loop. This instant value 402A-402N could either be a loop variable or a loop constant.

An instruction 206A-206N containing a conditional jump supplies either the succeeding instruction 206A-206N or the jump target instruction 206A-206N with data. These situations could be modeled by considering a value 402A-402N supplied to an instruction 206A-206N not immediately succeeding the instruction 206A-206N in question to be a "soft" data sink.

Simple Placement

The way to route a value 402A-402N by means of defining a path 400A-400N is to find a place where 1) there is an available iterator 190.A.X-190.N.Z at the same place in each instruction 206A-206N prefix and suffix the value 402A-402N occupies, and 2) all sources and sinks in the value 402A-402N can be moved to that place. This placement is accomplished by the invented compiler 200 by moving all hard sources and sinks of the paths 400A-400N to the place 406A-406N in question and then assigning the selected place 406A-406N to all itins 190.ITIN, itouts 190.ITOUT, and iterators 190.A.X-190.N.Z in the path 400A-400N. All paths 400A-400N are eventually routed in this way or are split into multiple paths 400A-400N that can be routed in this way.

This approach raises two questions: 1) how does the invented compiler 200 determine whether there is an available iterator 190.A.X-190.N.Z at a given place; and 2) how does the invented compiler 200 determine where and how a given source or sink can be moved? Since many aspects of question 1 depend on a resolution of question 2, the second question will be addressed first.

The following explicates how the invented compiler 200 determines where a given addreg, loader, or storer of the bubbles 212-212 N can be moved. These software resources can be placed into any open slot or even steal the slot placement of any resource that's in an unrouted value 402A-402N. The terms "slot" refers to column position and availability. Each column of logic elements 190A-190N of the RLU 110 is communicatively coupled to a dedicated set of one addreg circuit, two loader circuits and two storer circuits.

If slot choices are low, these resources can sometimes be moved to adjacent bubbles 212A-212N to alleviate the problem. Failing this, a new instruction 206A-206N can always be created that "creates" slots into which the resource can be placed. These software resources must be ripped up, re-placed, and re-routed by the invented compiler 200. The invented compiler 200 is adapted to explore alternative resource designations by software modeling of the DRP 100.

In order to avoid infinite attempts to route at unworkable places, a record needs to be kept, possibly in the memory 150, of all places that have been attempted for a value 402A-402N. This record should be cleared if a value 402A-402N is altered. For example, the record should be cleared if a value 402A-402N is split into two values 402A-402N with an array link. This record could contain why the placement failed or how well the placement succeeded for each place. This would aid in finding the best solution to routing the value 402A-402N.

Repositioning itins and itouts by the compiler 200 in the context of RLU 110 can create instructions 206A-206N that burn more, or less, energy and expend, or save, resources depending on their positioning. As a result, a bubble 212A-

212N can get packed too full to allow the reasonable movement of itouts and itins.

Array Links

When there is a conflict and no place where all sources and sinks in a value 402A-402N can be moved, the value 402A-402N must be split using an array link or other means. Also, from an energy standpoint, placing a value 402A-402N at a given place when many hops have to be added to route it there may often be inferior to adding an array link and splitting the value 402A-402N into two lower energy values 402A-402N.

In energy terms, adding an array link is at minimum approximately the same as adding a hop since both use at least one output in the RLU 110. The energy of an array link circuit, formed by elements of the RLU 110 to instantiate the instant array link, is therefore proportional to the number of hops, or transfers of values 402A-402N from logic element 190A-190N to logic element 190A-190N that the array link circuit uses plus one for the array link circuit itself. Other portions of an array link circuit expend power, but these array link circuit portions may be ignored in forecasting energy expenditures for the purposes of selecting a lowest energy, or otherwise preferred, instantiation of an array link circuit.

Array links must properly split the value 402A-402N. Loop constants can not be split using array links because the loop constant value 402A-402N still has to loop back to the beginning of the loop. At best, a section of the loop constant value 402A-402N can be offset using two array links. Any value 402A-402N that is not a loop constant in a given instruction 206A-206N can be split with an array link in that instruction 206A-206N.

By adding array links, a bubble 212A-212N can get packed too full to allow the reasonable movement of itouts and itins or the addition of further links. In this case, the invented compiler determines that a first exemplary bubble 212A shall be split into two bubbles 212B, 214-218.

Some source/sink conflicts in the same bubble 212A or between adjoining bubbles 212B-212C can't be solved using array links. These situations must instead be avoided algorithmically, or, as a last resort, each can be avoided using various methods to be described.

In the case of place conflicts with addregs, loaders, or storers, the invented compiler 200 in some instances avoids creating a whole new bubble by pushing the operation in question, for example from a third bubble 212C into the previous bubble 212B or into the next bubble 212D. This would be an optimization, but a useful one in these rare cases.

Figure 6:
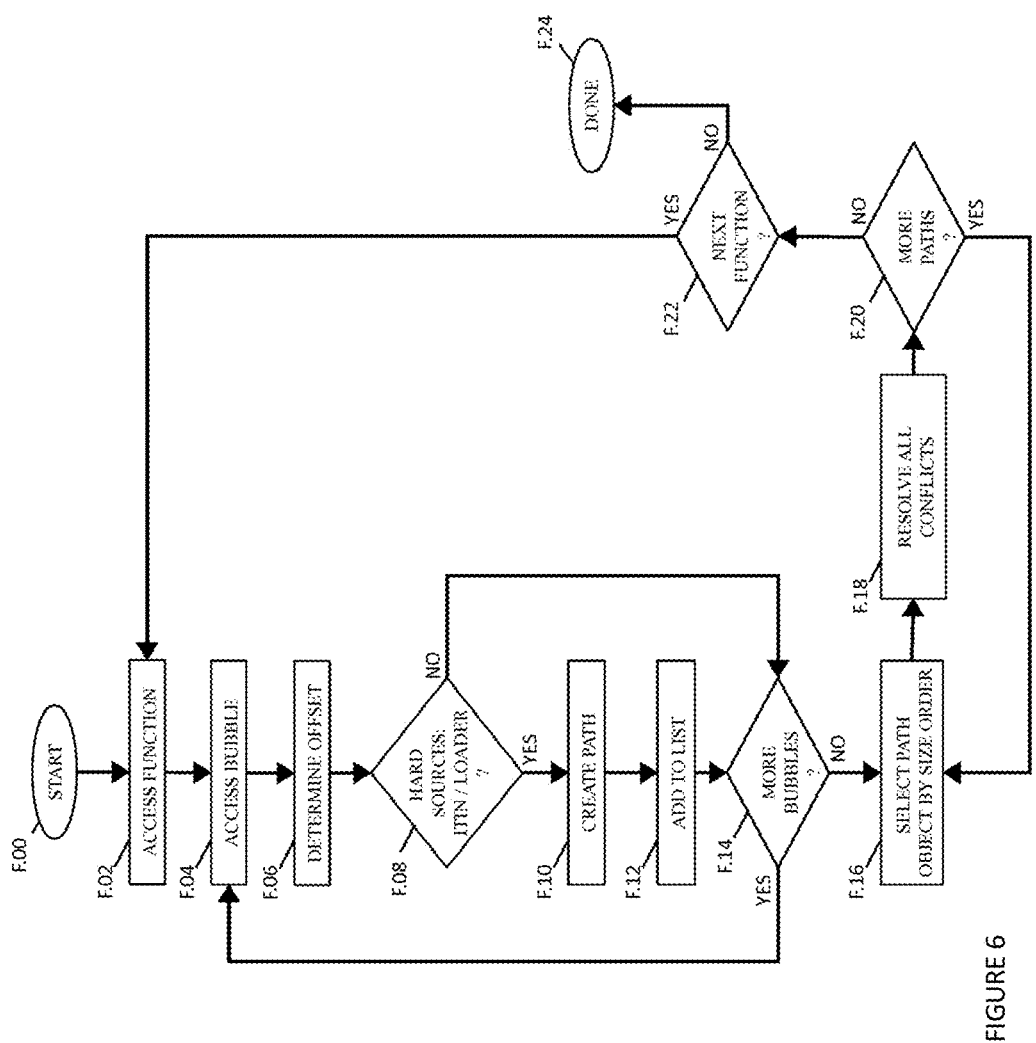
FIG. 6 is a software flow chart of the of a preferred embodiment of the of the invented method.

Referring now generally to the Figures and particularly to FIG. 6, FIG. 6 is a software flowchart of the invented compiler 200 modifying the software code of a function 210A-210N to remove possible conflicts of assignments of resources that will or might cause a conflict of an iterator 190.A.X-190.N.Z. It is understood that a conflict of an iterator 190.A.X-190.N.Z is caused when in the execution of an instruction 206A-206N either (a.) an iterator 190.A.X-190.N.Z is assigned to store two different values 402A-402N or (b.) a place 406A-406N is assigned to more than three paths 400N-400N in the first method.

In step F.02 the invented compiler 200 accesses a particular function 210A-210N and processes the accessed function 210A-210N selected in step F.02. The following discussion of an exemplary first function 210A is offered as an illustrative and not limiting, wherein the process of FIG. 4 may be applied to more, each and/or every function 210A-210N of the software program 200.

In a first execution of step F.04 a first bubble 212A is selected for processing by the invented compiler 200 through the loop of steps F.06 through F.14, and each additional bubble 212B-212N of the instant first function 210A are individually processed through the loop of steps F.08 through F.14. A place 406A-406B is determined and assigned in step F.06.

When a hard source is found in a bubble 212A-212N in step F.08 a path 400A-400N is identified in step F.10 and this path 400A-400N is added to the instant bubble 212A-212N in step F.12. The invented compiler 200 then determines in step F.14 whether any additional bubbles 212A-214D comprised within the first function 210A have not been processed through the loop of steps F.08 through F.14 and continues to select and process each and every bubble 212A-212D comprised within the instant first function 210A through the loop of step F.08 through F.14. In step F.16, a path 400A-400N that was identified in the process of applying steps F.08 through F.14 to each bubble 212A-214D of the first function 210A is examined to select an individual place 406A-406N of placement of the first path 400A. The sources and sinks of each path 400A-400N individually are resolved in an order from first occurring to last occurring in successive executions of step F.18. When the invented compiler 200 determines in step F.20 that each path 400A-400N identified by the most recent series of executions of steps F.08 through F.14 and as derived from the function 210A-210N selected in the most recent execution of step F.02, the invented compiler 200 assigns places and routes the bubbles 212A-212D of the exemplary first function 210A in step F.20. The method of step F.20 is more precisely explained in FIG. 7.

The invented compiler 200 determines in step F.22 whether any additional functions 210B-210N exist within the software program 200 that have not yet been processed through steps F.02 through F.20, and returns to step F.02 to process a single unprocessed function 212B-212N, or alternatively proceeds on to step F.24 and proceeds on to alternate computational operations.

Figure 7:
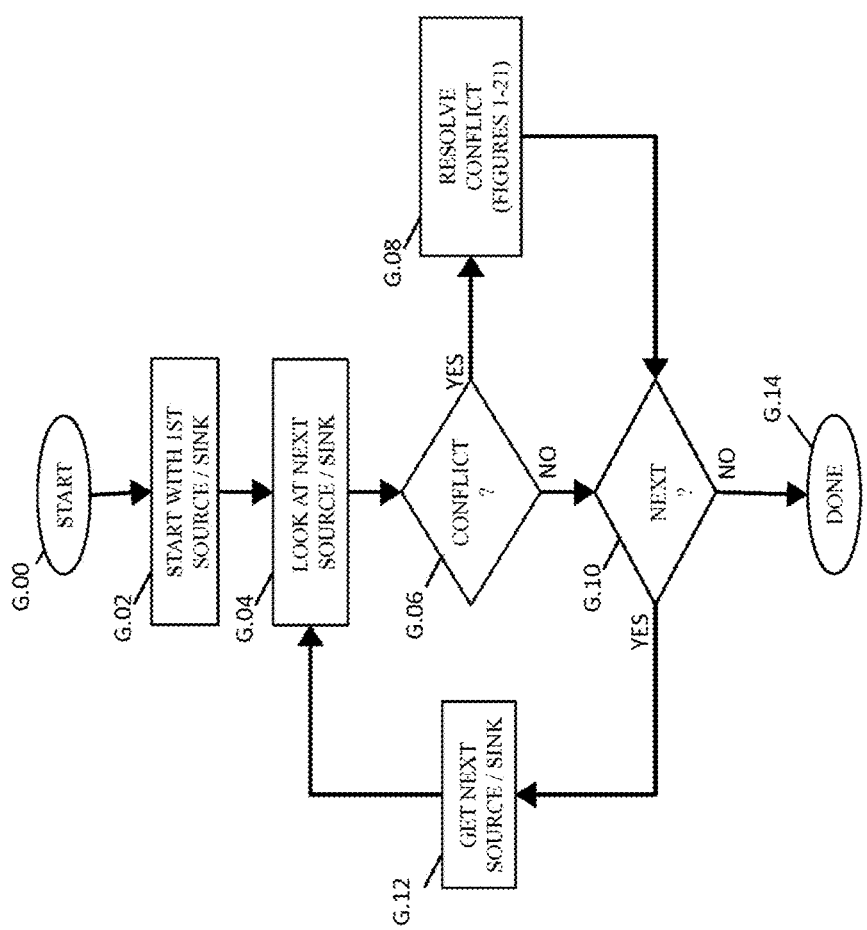
FIG. 7 is an expanded flow chart of elements of step F.20 of FIG. 6.

Referring now generally to the Figures and particularly to FIG. 7, FIG. 7 is a software flowchart of an operation of the invented compiler 200 as indicated by step F.16 of FIG. 6. In step G.02 a first source or sink is selected from the paths 400A-400N and is compared with the places 406A-406N of the comprising exemplary first function 210A by the invented compiler 200 in step G.04 to determine if any conflicts of iterators 190.A.X-190.N.Z may be caused by the instant first sink or source. When and if a conflict is determined by the invented compiler 200 in step G.06, the compiler proceeds on to step G.08 to modify the instant function 210A to remove the possibility of conflict. The process of step G.08 is further explicated in FIGS. 16 through 36 herein.

The invented compiler 200 determines in step G.10 whether any additional sources or sinks cited by the paths 400A-400N remain to be examined for conflicts. The invented compiler 200 separately processes each source or sink discovered by the invented compiler 200 as existent within the exemplary first function 210A through the steps of G.04 and G.06 and step G.08 as determined by the invented compiler 200. When each and every source or sink of the exemplary function has been examined in step G.06, the invented compiler 200 proceeds from step G.10 to step G.14 and perform alternate computational processes.

It is understood that each function 210A-210N of the software program 200 is preferably processed by the method of FIG. 6, FIG. 7 and FIGS. 16 through 36 as determined by the invented compiler 200.

Figure 8:
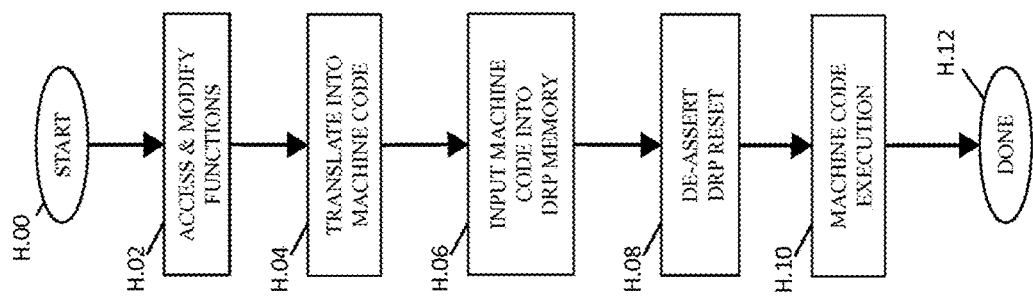
FIG. 8 is a process chart of an additional alternate preferred embodiment of the invented method.

Referring now generally to the Figures and particularly to FIG. 8, FIG. 8 is a flowchart of the DRP 100 in applying the invented compiler 200. In step H.02 the invented compiler 200 accesses and modifies the functions 210A-210N to avoid conflicts of iterators 190.A.X-190.N.Z when the machine code 204 is later being executed by the DRP 100. The invented compiler 200 in step H.04 compiles and translates the software program 200 into machine code 600 that may be executed by the DRP 100. The machine code 600 is then input into the memory 150 of the DRP in step H.06 and the reset setting of the DRP 100 is de-asserted in step H.08. The DRP 100 then executes the machine code 600 in step H.10.

Figure 9:
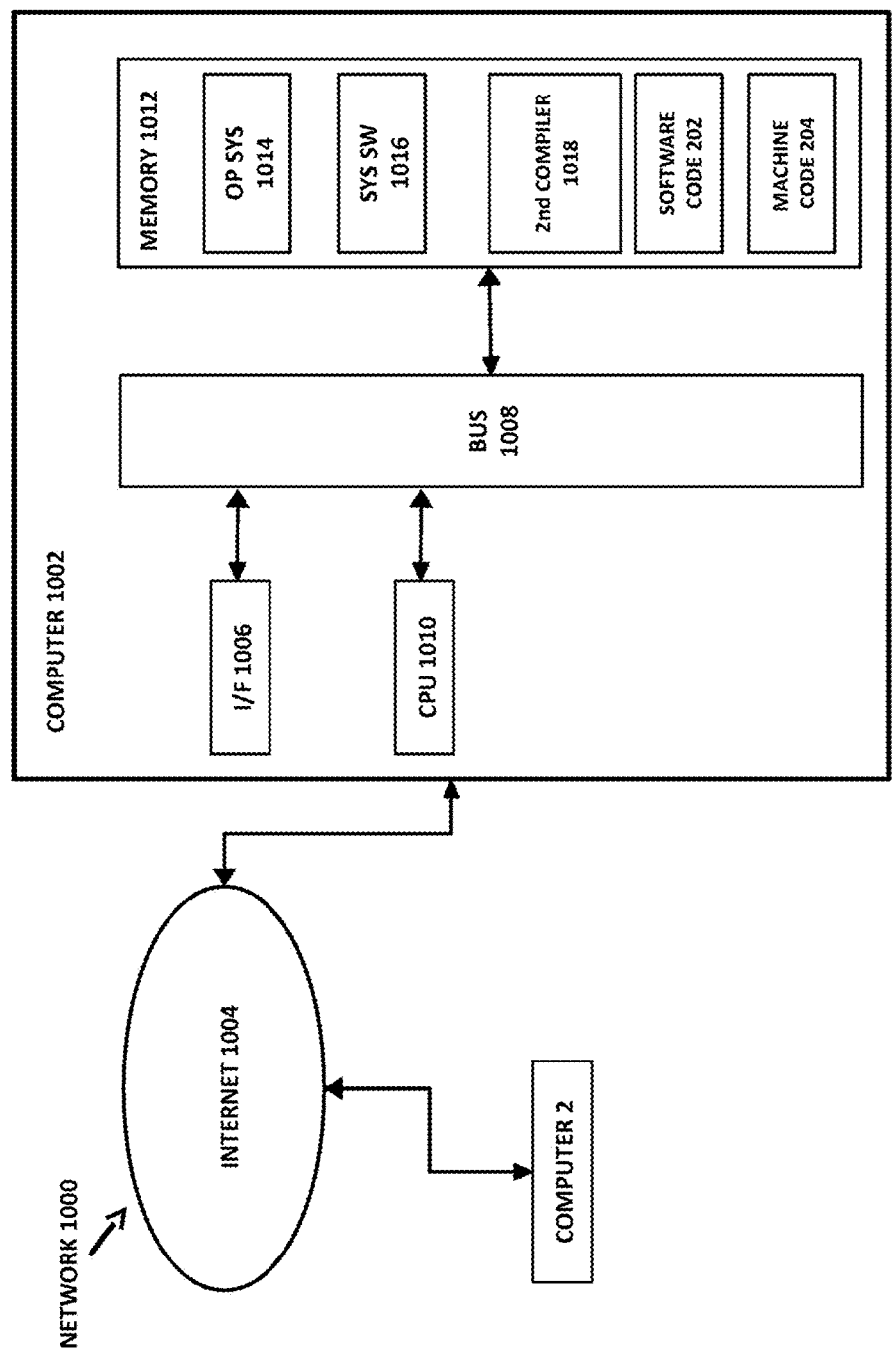
FIG. 9 is a block diagram of an electronic communications network that includes the dynamically reconfigurable computer of FIG. 1 and a prior art computer.

FIG. 9 is a block diagram of an electronic communications network 1000 that includes the dynamically reconfigurable computer 2 and a prior art computer 1002. The electronic communications network 1000 (hereinafter, "the network 1000") optionally comprises the Internet 1004 and/or one or more additional electronic computational or communications networks (not shown). The network 1000 enables the prior art computer 1002 to provide the machine code 204 to the computer 2, whereby the DRP 100 is enabled and may be directed to execute the machine code 204. The prior art computer 1002 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; or (e.) other suitable electronic device, wireless communications device, computational system or electronic communications device known in the art.

The prior art computer 1002 includes a network interface circuit 1006 that bi-directionally communicatively couples the prior art computer 1002 with the network 1000 and the computer 2. More particularly, a power and communications bus 1008 bi-directionally communicatively couples the network interface circuit 1006 with a central processing unit 1010 (hereinafter, "CPU" 1010) and a system memory 1012. The system memory 1012 a system operating system 1014, a system software 1016 and a second invented compiler 1018. The second invented compiler 1018 comprises software encoded instructions that direct the prior art computer 1002 to derive the machine code 204 from the software code 202 by execution of the methods of FIGS. 4, 6, 7, 8 and 16 through 37. In other words, the second invented compiler 1018 is adapted to direct the prior art computer to derive the representation D of from the representation B of FIG. 4 as executed by the prior art computer 1002.

The system operating system 1014 enables the prior art computer 1002 to perform basic and essential computational tasks, such as scheduling tasks, executing applications, and controlling peripherals. The system software 1016 provides software-encoded instructions, data and information that enables the prior art computer 1002 to perform in accordance with the aspects of the method of the present invention including applying the second invented compiler 1018 to execute the some or all of the aspects of the methods of FIGS. 6, 7 8, and 16 through 37 to the software code 202, whereby the second invented compiler 1018 derives the machine code 204 from the software code 202. The system software 1016 provides software-encoded instructions that enable the prior art computer 1002 to provide a copy of the machine code 202 to the computer 2, optionally by electronic messaging via the network 2, and for execution of the machine code 202 by the DRP 100 as per step H.10 of the method of FIG. 8.

Figure 10:
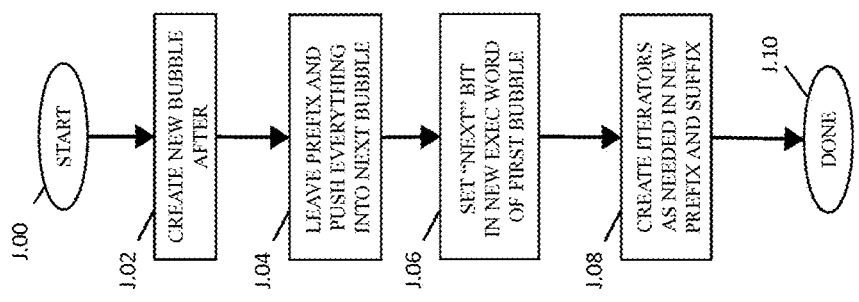
FIG. 10 is a software flowchart of the invented compiler generating a new bubble and inserting the newly generated before an existing bubble of FIG. 2.

Referring now generally to the Figures and particularly to FIG. 10, FIG. 10 is a software flowchart of the invented compiler 200 generating a first new bubble 214 and inserting the newly generated before a pre-existing bubble 212A-212N. The exemplary second bubble 212B will be used as an example object of the explanation of FIGS. 10, 11 and 12, and these references to the second bubble 212A are meant to be explanatory in scope and not limiting. The invented compiler 200 may create numerous other new bubbles in the instantiation of the method of the present invention.

In step J.02 the invented compiler 200 creates a first new bubble 214 for insertion into the order of bubbles 212A-212N before an earlier created bubble, e.g., the exemplary second bubble 212B.

In step J.04 the invented compiler 200 leaves the prefix of the earlier created second bubble 212B in the second bubble 212B, and transfers the array information of the second bubble 212B including all cells and the suffix of the second bubble 2123 into the newly created before-bubble 214.

In step J.06 the invented compiler 200 sets the "next" newly created exec word of the exemplary second bubble 212B.

In step J.08 the invented compiler 200 creates and assigns iterator resources as needed in the newly created prefix and suffix of the first new bubble 214.

Figure 11:
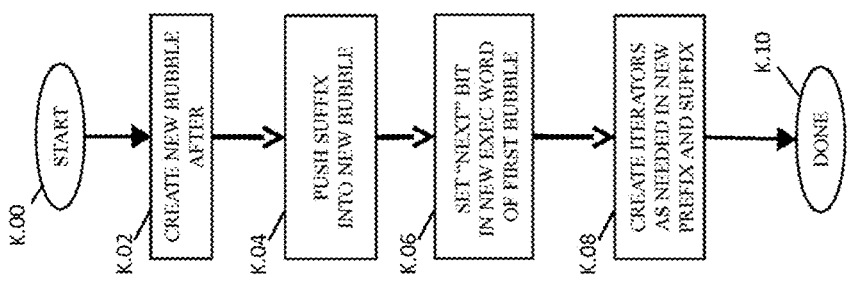
FIG. 11 is a software flowchart of the invented compiler generating a new bubble and inserting the newly generated after an existing bubble of FIG. 2.

Referring now generally to the Figures and particularly to FIG. 11, FIG. 11 is a software flowchart of the invented compiler 200 generating a second new bubble 216 and inserting the second newly generated bubble 216 after a pre-existing bubble 212B. As mentioned previously, the second bubble 212B shall be used as an exemplary focus of the discussion of the process of FIG. 11 that is not meant to limit the focus of the invented method.

In step K.02 the invented compiler 200 creates the second new bubble 216 for insertion into the order of bubble 212A-212N after the exemplary reference second bubble 212B.

In step K.04 the invented compiler 200 pushes the suffix of the pre-existing bubble 212B into the second new bubble 216.

In step K.06 the invented compiler 200 sets the "next" bit in a newly created exec word of the referenced second bubble 212B.

In step K.08 the invented compiler 200 creates iterators as needed in the newly created prefix and suffix.

Figure 12:
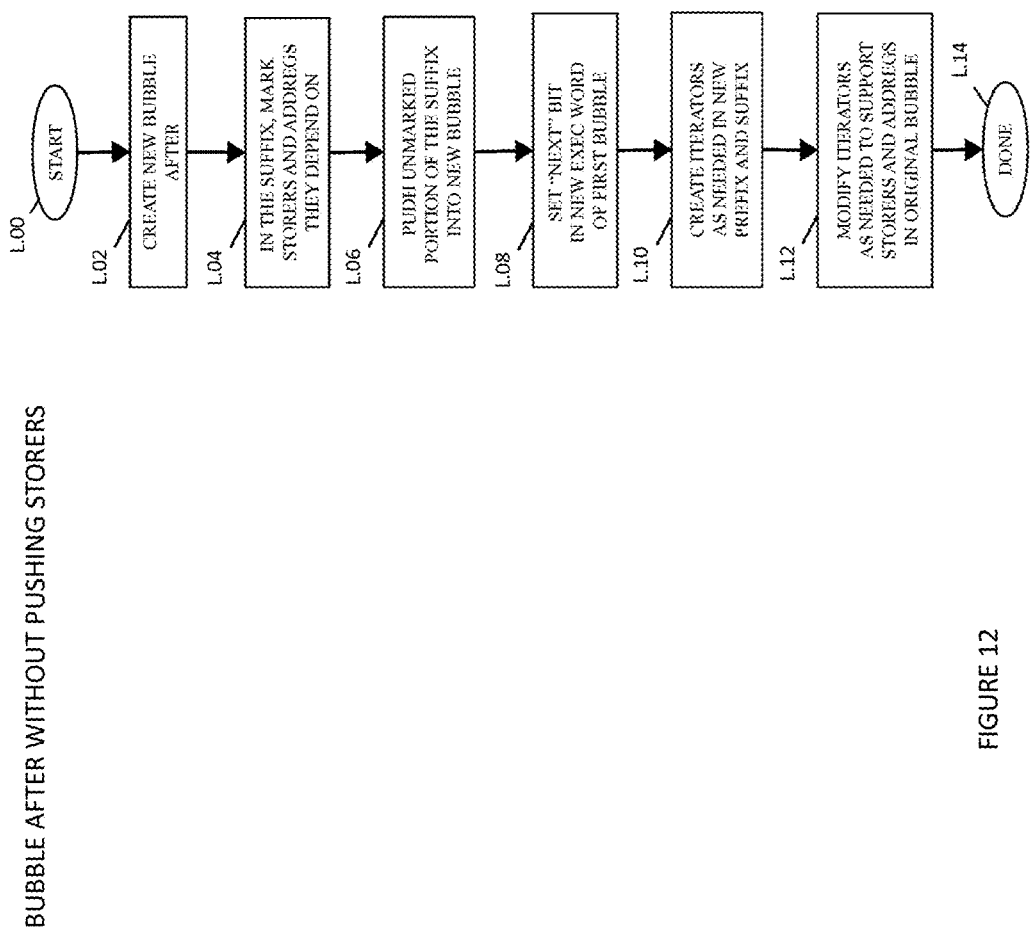
FIG. 12 is a software flowchart of the invented compiler generating a new bubble without pushing storer resources of a bubble of FIG. 2 and inserting the newly generated after an existing bubble of FIG. 2.

FIG. 12 is a software flowchart of the invented compiler generating a third new after-bubble 218 without pushing storer resources of any pre-existing bubble 212A-212N and inserting the newly generated third bubble 218 to be ordered after a pre-existing bubble 212A-212N. As mentioned above, the second exemplary bubble 212B will be the focus of the explanation of FIG. 12 and is not offered by way of limitation.

In step L.02 the invented compiler 200 creates a new third bubble 218 that is ordered and adapted for insertion into the bubbles 212A-212N after the exemplary second bubble 212B.

In step L.04 the invented compiler 200 marks any storer resources in the suffix of the earlier existing second bubble 212B along with any addreg resources that the marked storer resources depend on.

In step L.06 the invented compiler 200 transfers the unmarked portion of the suffix of e earlier existing second bubble 212B into the third new bubble 218.

In step L.08 the invented compiler 200 sets the "next" bit in the newly created exec word of the exemplary second bubble 212B.

In step L.10 the invented compiler 200 create iterators as needed in the newly created prefix and suffix of the third new bubble 218.

In step L.12 the invented compiler 200 modifies iterator resources as needed to support storer resources and addreg resources in the original, pre-existing bubble, i.e., the second bubble 212B is offered as an example of the original bubble.

Figure 13:
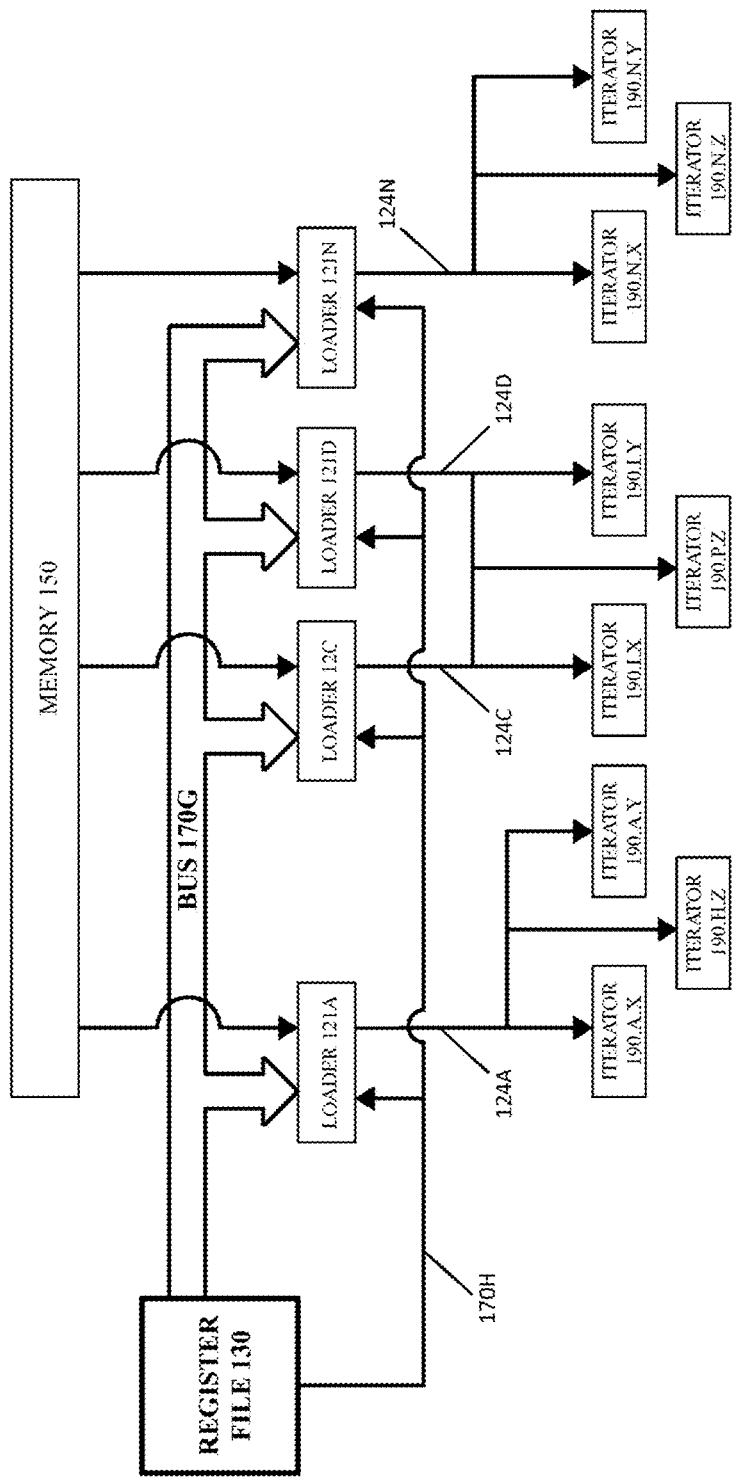
FIG. 13 is a schematic diagram of a representative plurality of loader circuits and loader buses of the dynamically reconfigurable processor of FIG. 1.

Referring now generally to the Figures and particularly to FIG. 1 and FIG. 13, FIG. 13 is a block diagram of selected elements of the DRP 100. A plurality of loader buses 124A-124N are each individually and exclusively coupled to a single loader circuit 121A-121N. The exemplary first loader bus 124A is coupled with the exemplary first loader circuit 121A and further unidirectionally communicatively coupled with the memory 150, the register file 130, and a first plurality of eight logic elements 190A-190H, whereby the first loader bus 124A may, as directed by the first loader circuit 121A, read data from the memory 150 or the register file 130 and assert the instant data read from the memory 150 or the register file 130 into one or more, or all, of the 24 coupled iterators 190.A.X-190.H.Z of the first plurality of eight logic elements 190A-190H.

An exemplary third loader bus 124C is coupled with an exemplary third loader circuit 121C and further unidirectionally communicatively coupled with the memory 150, the register file 130, and a second plurality of eight logic elements 190I-190P, whereby the third loader bus 124C may, as directed by the third loader circuit 121C, read data from the memory 150 or the register file 130 and assert the data read from the memory or the register file 130 into one or more, or all, of the 24 coupled iterators 190.I.X-190.P.Z of the second plurality of eight logic elements 190I-190P.

An exemplary fourth loader bus 124D is coupled both with an exemplary fourth loader circuit 121D and the memory 150, and is further and additionally unidirectionally communicatively coupled with the second plurality of eight logic elements 190I-190P, whereby the fourth loader bus 124D may, as directed by the fourth loader circuit 121D, read data from the memory 150 and also assert the data read from the memory 150 or the register file 130 into one or more, or all, of the 24 coupled iterators 190.I.X-190.P.Z of the second plurality of eight logic elements 190I-190P.

An exemplary Nth loader bus 124N is coupled with an exemplary Nth loader circuit 121N and further unidirectionally communicatively coupled with the memory 150 and an Nth plurality of eight logic elements 190N, whereby the Nth loader bus 124N may, as directed by the Nth loader circuit 121N, read data from the memory and assert the data read from the memory 150 or register file 130 into one or more, or all, of the 24 coupled iterators 190.N-8.X-190.N.Z.

Figure 14:
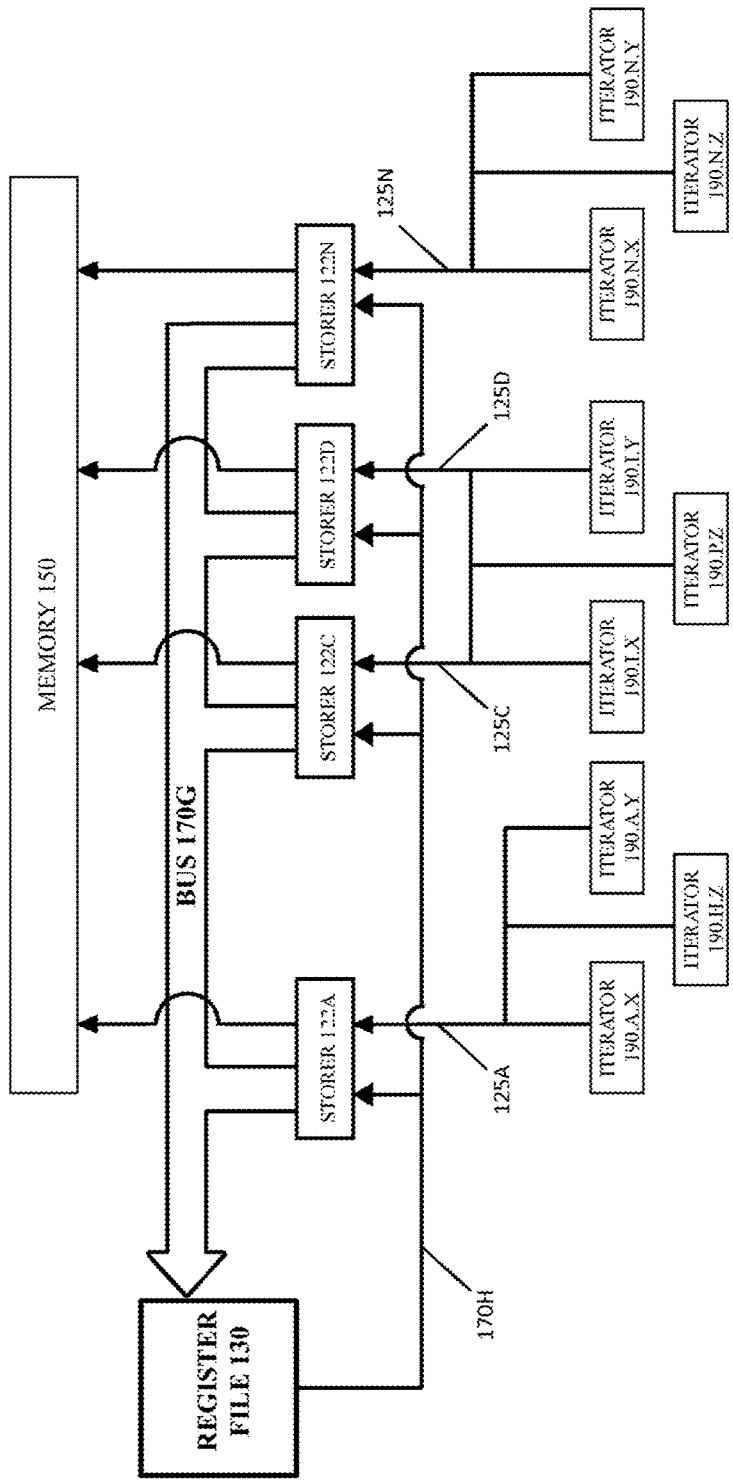
FIG. 14 is a is a schematic diagram of a representative plurality of storer circuits and storer buses of the dynamically reconfigurable processor of FIG. 1.

Referring now generally to the Figures and particularly to FIG. 1 and FIG. 14, FIG. 14 is a block diagram of selected elements of the DRP 100. A plurality of storer buses 125A-125N are each individually and exclusively coupled to a single storer circuit 122A-122N. The exemplary first storer bus 125A is coupled with the exemplary first storer circuit 122A and further unidirectionally communicatively coupled with the memory 150, the register file 130, and the first plurality of eight logic elements 190A-190H, whereby the first storer bus 125A may, as directed by the first storer circuit 122A, selectively read data from each of the 24 coupled iterators 190.A.X-190.H.Z of the first plurality of logic elements 190A-190H and assert the instant data into the memory 150 and/or the register file 130.

An exemplary third storer bus 125C is coupled with an exemplary third storer circuit 122C and further unidirectionally communicatively coupled with the memory 150, the register file 130, and the second plurality of eight logic elements 190I-190P, whereby the third storer bus 125C may, as directed by the third storer circuit 122C, selectively read data from each of the 24 coupled iterators 190.I.X-190.P.Z of the second plurality of logic elements 190I-190P and assert the instant data into the memory 150 and/or the register file 130.

An exemplary fourth storer bus 125D is coupled with an exemplary fourth storer circuit 122D and further unidirectionally communicatively coupled with the memory 150, the register file 130, and additionally with the second plurality of eight logic elements 190I-190P, whereby the fourth storer bus 125D may, as directed by the fourth storer circuit 122D, selectively read data from each of the 24 coupled iterators 190.I.X-190.P.Z of the second plurality of logic elements 190I-190P and assert the instant data into the memory 150 and/or the register file 130.

An exemplary Nth storer bus 125N is coupled with an exemplary Nth storer circuit 122N and further unidirectionally communicatively coupled with the memory 150, the register file 130 and an Nth plurality of eight logic elements 190N-8-190N, whereby the Nth storer bus 125N may, as directed by the Nth storer circuit 122N, selectively and sequentially read data from one or more, or all of the 24 coupled iterators 190.N-8.X-190.N.Z of the Nth plurality of logic elements 190N-8-190N and assert the instant data into the memory 150 and/or the register file 130.

Figure 15:
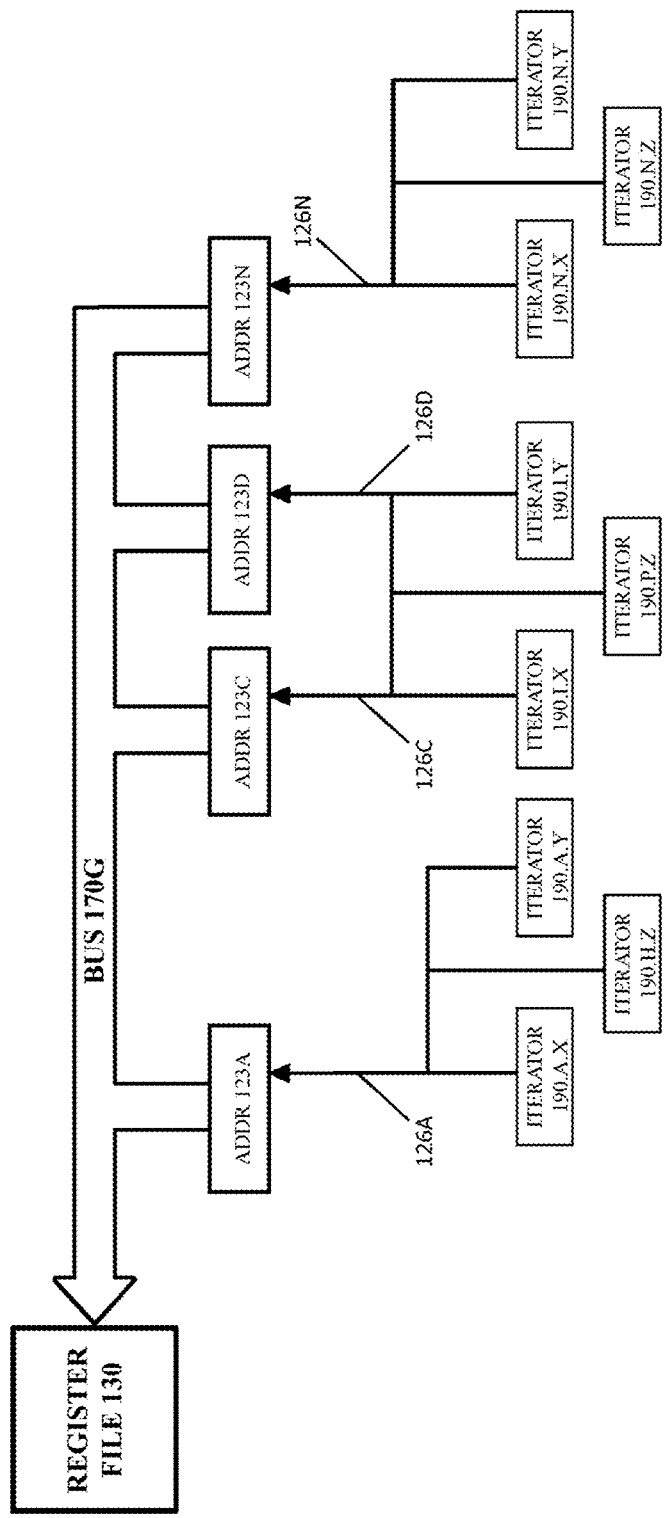
FIG. 15 is a is a schematic diagram of a representative plurality of address register bus controllers and addreg buses of the dynamically reconfigurable processor of FIG. 1.

Referring now generally to the Figures and particularly to FIG. 1 and FIG. 15, FIG. 15 is a block diagram of selected elements of the DRP 100. A plurality of addreg buses 126A-126N are each individually and exclusively coupled to a single address register bus control circuit 123A-123N. The exemplary first addreg bus 126A is coupled with the exemplary first address register bus control circuit 123A and further unidirectionally communicatively coupled with the register file 130 and the first plurality of eight logic elements 190A-190H, whereby the first addreg bus 126A may, as directed by the first address register bus control circuit 123A, selectively read data from each of the 24 coupled iterators 190.A.X-190.H.Z of the first plurality of logic elements 190A-190H and assert the instant data into the register file 130.

An exemplary third addreg bus 126C is coupled with an exemplary third address register bus control circuit 123C and further unidirectionally communicatively coupled with the register file 130 and the second plurality of eight logic elements 190I-190P, whereby the third addreg bus 126C may, as directed by the third address register bus control circuit 123C, selectively read data from each of the 24 coupled iterators 190.I.X-190.P.Z of the second plurality of logic elements 190I-190P and assert the instant data into the register file 130.

An exemplary fourth addreg bus 126D is coupled with an exemplary fourth address register bus control circuit 123D and further unidirectionally communicatively coupled with the register file 130 and additionally with the second plurality of eight logic elements 190I-190P, whereby the fourth addreg bus 126D may, as directed by the fourth address register bus control circuit 123D, selectively read data from each of the 24 coupled iterators 190.I.X-190.P.Z of the second plurality of logic elements 190I-190P and assert the instant data into the register file 130.

An exemplary Nth addreg bus 126N is coupled with an exemplary Nth address register bus control circuit 123N and further unidirectionally communicatively coupled with the register file 130 and an Nth plurality of eight logic elements 190N, whereby the Nth addreg bus 126N may, as directed by the Nth address register bus control circuit 123N, selectively and sequentially read data from one or more, or all of the 24 coupled iterators 190.N-8.X-190.N.Z of the Nth plurality of logic elements 190N-8-190N and assert the instant data into the register file 130 as directed by the Nth address register bus control circuit 123N.

Referring now generally to the Figures and particularly to FIGS. 16 through 38, FIGS. 16 through 38 describe a variety of actions that the invented compiler 200 may take to remove or reduce the potential for iterator conflicts from arising in an execution of the machine code 600 by modifying the software program 200 prior to the derivation of the machine code 600 from the software program 200.

Figure 16:
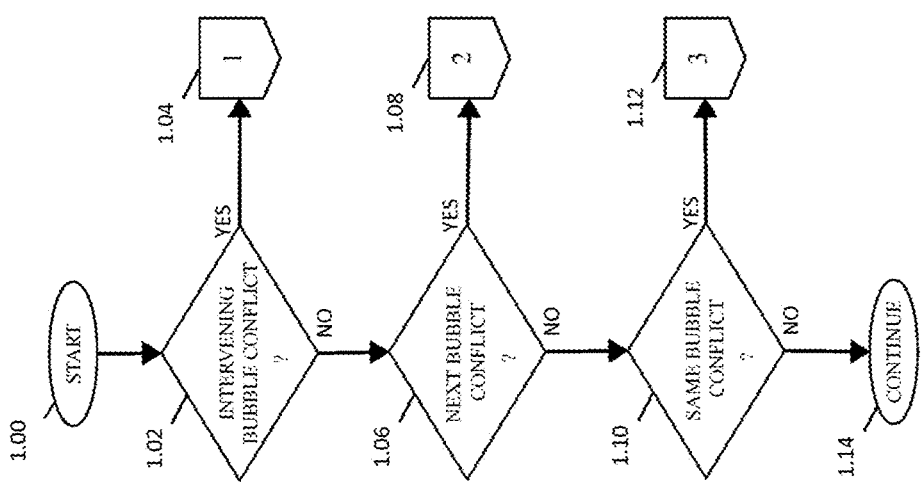
FIG. 16 is a flow chart depicting the process of determining where, in relation to a current bubble, a conflict has been modeled by the invented compiler of FIG. 1, i.e., a conflict of resource allocation with an intervening bubble, a next bubble or a same bubble.

Referring now generally to the Figures and particularly to FIG. 16, the invented compiler 200 determines in step 1.02 if a detected iterator conflict with an intervening bubble 212B has been determined in step G.06. When the invented compiler 200 determines in step 1.02 that a detected iterator conflict with an intervening bubble 212B has been determined in step G.06, the invented compiler 200 proceeds on to step 1.04 and to the process of FIG. 17. In the alternative, the invented compiler 200 proceeds from step 1.02 to step 1.06 when the discovered iterator conflict is not with an intervening bubble 212B.

The invented compiler 200 determines in step 1.06 if a detected iterator conflict with a next bubble 212B has been determined in step G.06. When the invented compiler 200 determines in step 1.06 that a detected iterator conflict with a next bubble 212B has been determined in step G.06, the invented compiler 200 proceeds on to step 1.08 and to the process of FIG. 18. In the alternative, the invented compiler 200 proceeds from step 1.06 to step 1.10 when the discovered iterator conflict is not with a next bubble 212B.

The invented compiler 200 determines in step 1.10 if a detected iterator conflict within a same bubble 212A has been determined in step G.06. When the invented compiler 200 determines in step 1.10 that a detected iterator conflict within a same bubble 212A has been determined in step G.06, the invented compiler 200 proceeds on to step 1.12 and to the process of FIG. 19. In the alternative, the invented compiler 200 proceeds from step 1.10 to step 1.14 when the discovered iterator conflict is not within a same bubble 212A.

Figure 17:
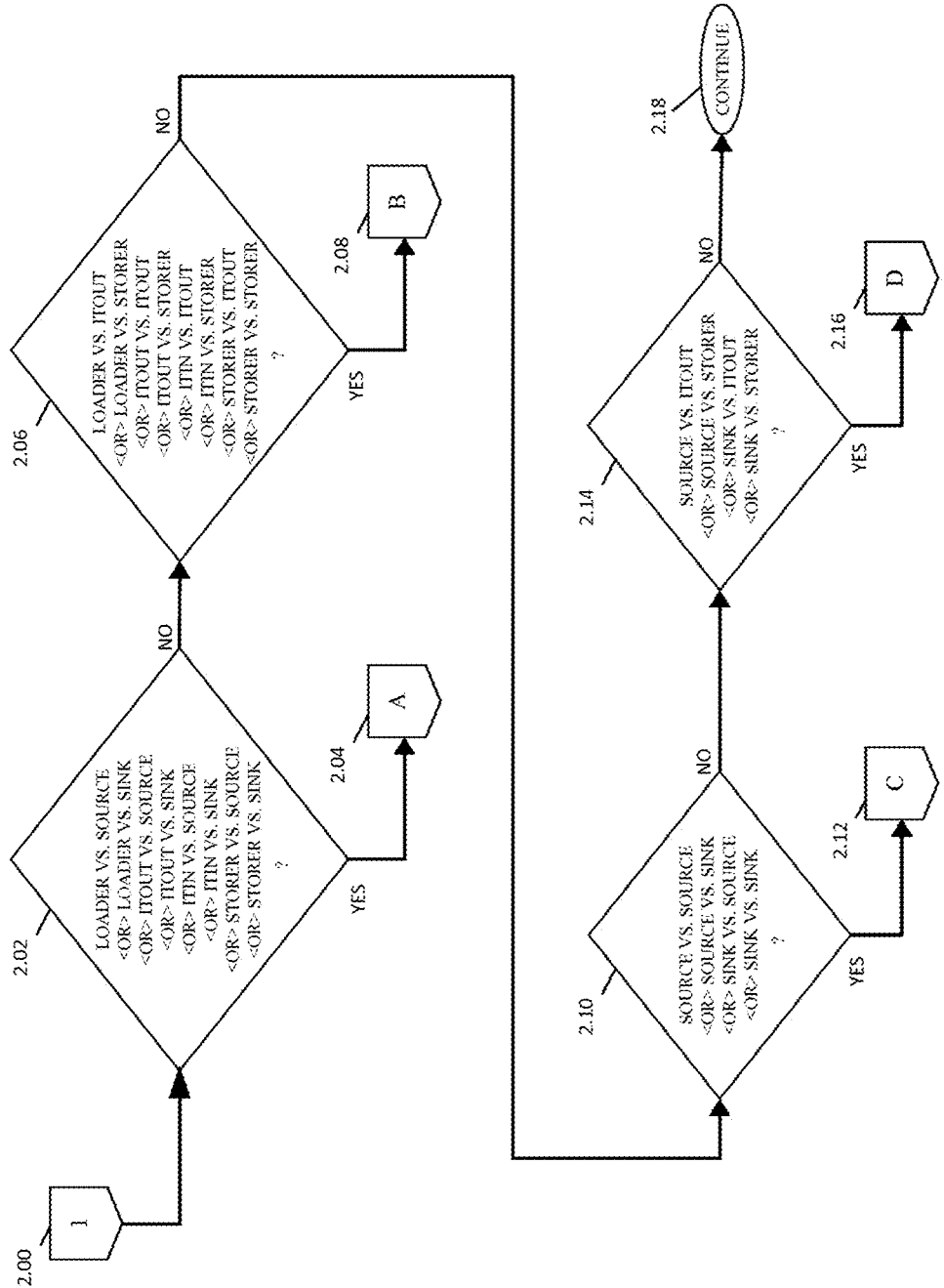
FIG. 17 is a flow chart depicting all possible conflict scenarios between reconfigurable processor resources in the presence of an intervening bubble conflict.

FIG. 17 is a flow chart depicting all possible conflict scenarios between reconfigurable processor resources in the presence of an intervening bubble conflict. When the invented compiler 200 determines in step 2.02 that the iterator conflict is between a LOADER VS. a SOURCE, a LOADER VS. a SINK, an ITOUT VS. a SOURCE, an ITOUT VS. a SINK, an ITIN VS. a SOURCE, an ITIN VS. SINK, a STORER VS. a SOURCE, or a STORER VS. a SINK, the compiler proceeds from step 2.02 to step 2.04 and to execute the process of FIG. 20; in the alternative, the invented compiler 200 proceeds from step 2.02 to step 2.06.

When the invented compiler 200 determines in step 2.06 that the iterator conflict is between a LOADER VS. an ITOUT, a LOADER VS. a STORER, an ITOUT VS. an ITOUT, an ITOUT VS. a STORER, an ITIN VS. an ITOUT, an ITIN VS. a STORER, a STORER VS. an ITOUT, or a STORER VS. STORER, the compiler proceeds from step 2.06 to step 2.08 and to execute the process of FIG. 21; in the alternative, the invented compiler 200 proceeds from step 2.06 to step 2.10.

Figure 22:
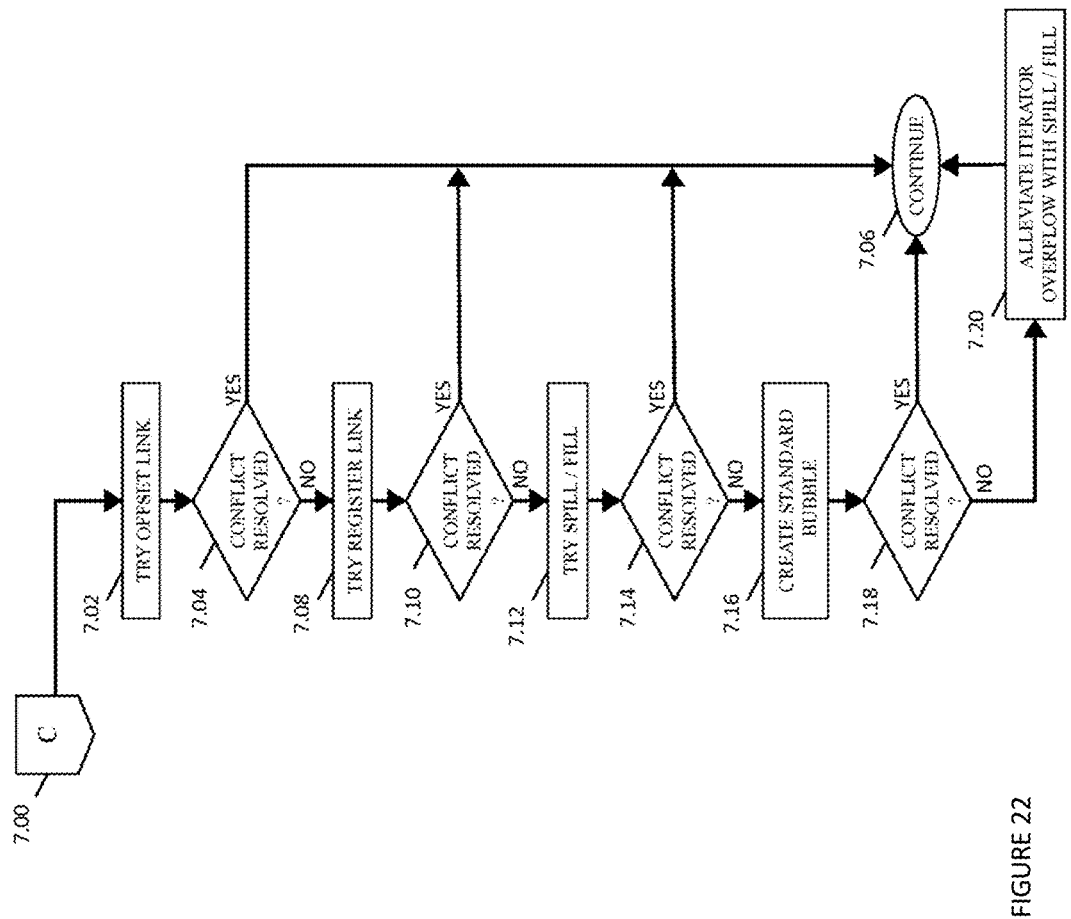
FIG. 22 is a flow chart depicting a process of resolving an intervening bubble conflict between the following pairs of reconfigurable processor resources: SOURCE VS. SOURCE, SOURCE VS. SINK, SINK VS. SOURCE, SINK VS. SINK.

When the invented compiler 200 determines in step 2.10 that the iterator conflict is between a SOURCE VS. a SOURCE, a SOURCE VS. a SINK, a SINK VS. a SOURCE, or a SINK VS. a SINK, the invented compiler 200 proceeds from step 2.10 to step 2.12 and to execute the process of FIG. 22; in the alternative, the invented compiler 200 proceeds from step 2.10 to step 2.14.

Figure 23:
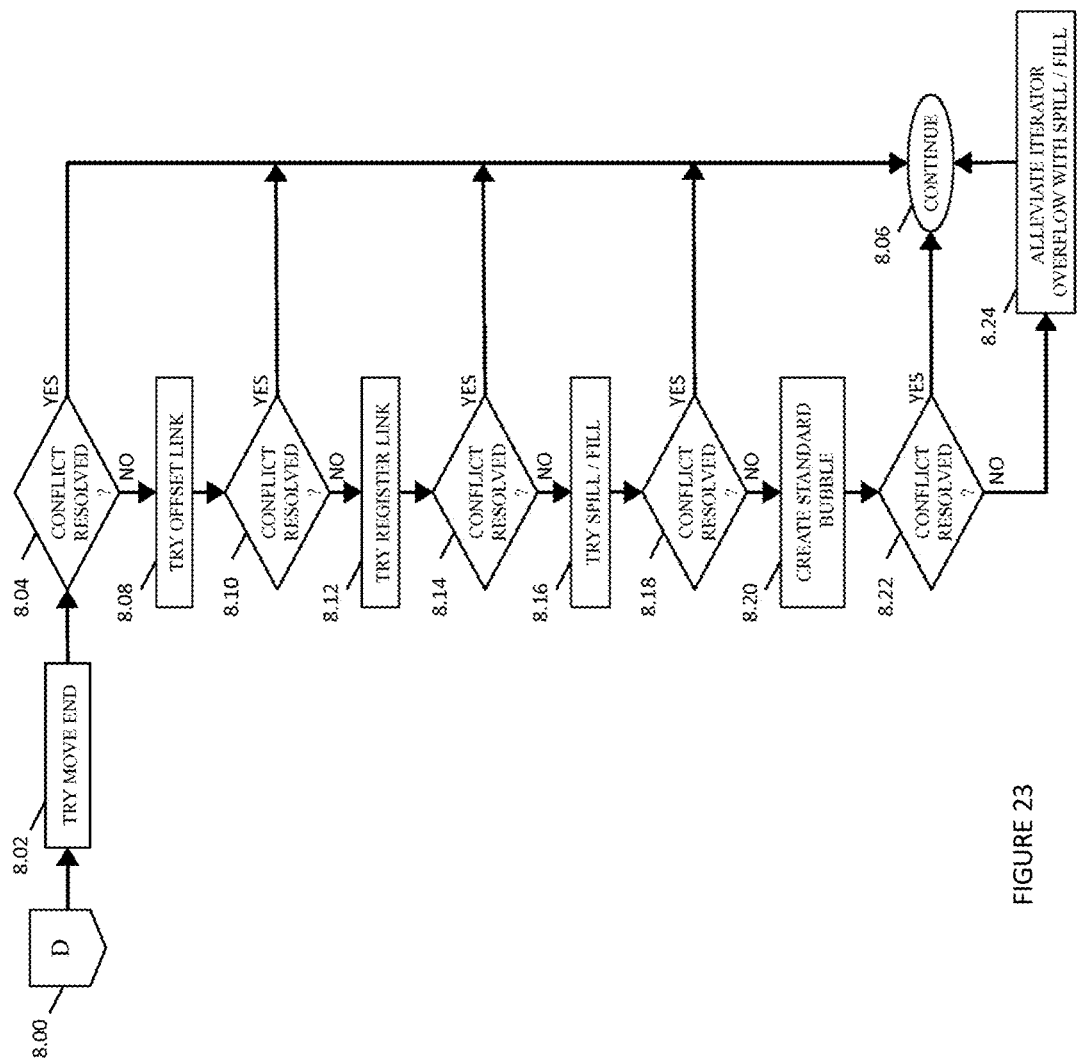
FIG. 23 is a flow chart depicting a process of resolving an intervening bubble conflict between the following pairs of reconfigurable processor resources: SOURCE VS. ITOUT, SOURCE VS. STORER, SINK VS. ITOUT, SINK VS. STORER.

When the invented compiler 200 determines in step 2.14 that the iterator conflict is between a SOURCE VS. an ITOUT, a SOURCE VS. a STORER, a SINK VS. an ITOUT, or a SINK VS. a STORER, the invented compiler 200 proceeds from step 2.14 to step 2.16 and to execute the process of FIG. 23; in the alternative, the invented compiler 200 proceeds from step 2.14 to step 2.18 and to perform alternative computational processes.

Figure 18:
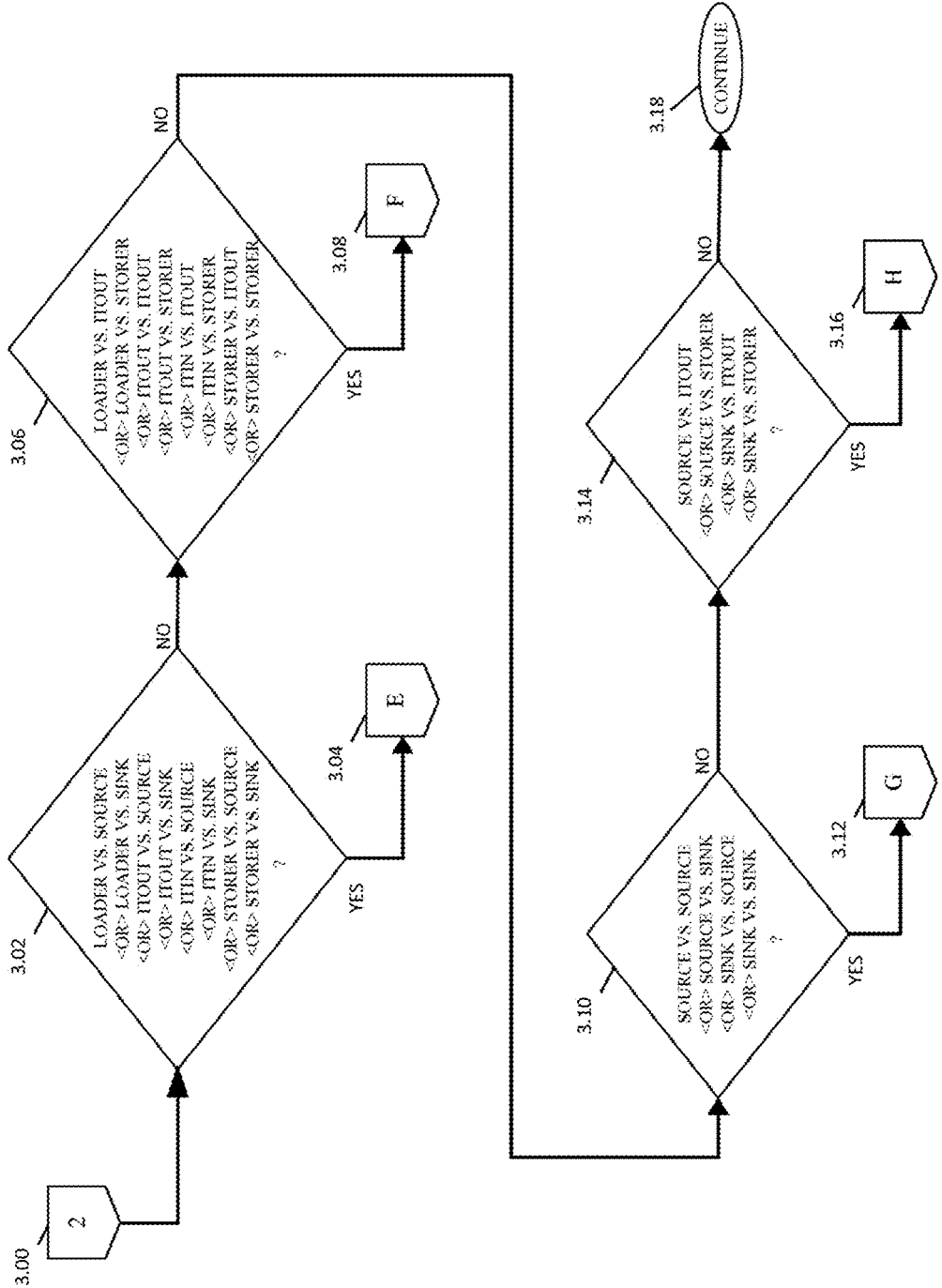
FIG. 18 is a flow chart depicting all possible conflict scenarios between reconfigurable processor resources in the presence of a next bubble conflict.

FIG. 18 is a flow chart depicting all possible conflict scenarios between reconfigurable processor resources in the presence of a next bubble conflict.

Figure 24:
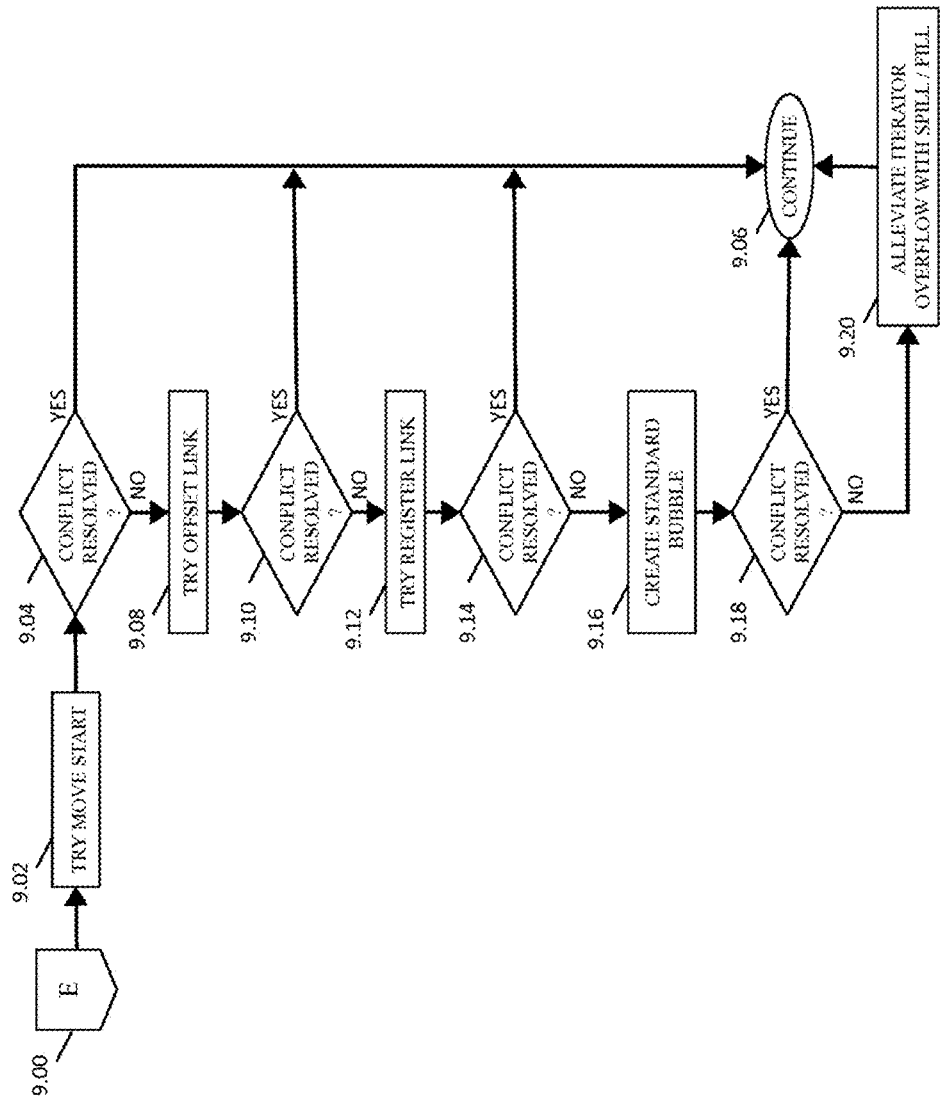
FIG. 24 is a flow chart depicting a process of resolving a next bubble conflict between the following pairs of reconfigurable processor resources: LOADER VS. SOURCE, LOADER VS. SINK, ITOUT VS. SOURCE, ITOUT VS. SINK, ITIN VS. SOURCE, ITIN VS. SINK, STORER VS. SOURCE, STORER VS. SINK.

When the invented compiler 200 determines in step 3.02 that the iterator conflict is between a LOADER VS. a SOURCE, a LOADER VS. a SINK, an ITOUT VS. a SOURCE, an ITOUT VS. a SINK, an ITIN VS. a SOURCE, an ITIN VS. a SINK, a STORER VS. a SOURCE, or a STORER VS. a SINK, the compiler proceeds from step 3.02 to step 3.04 and to execute the process of FIG. 24; in the alternative, the invented compiler 200 proceeds from step 3.02 to step 3.06.

Figure 25:
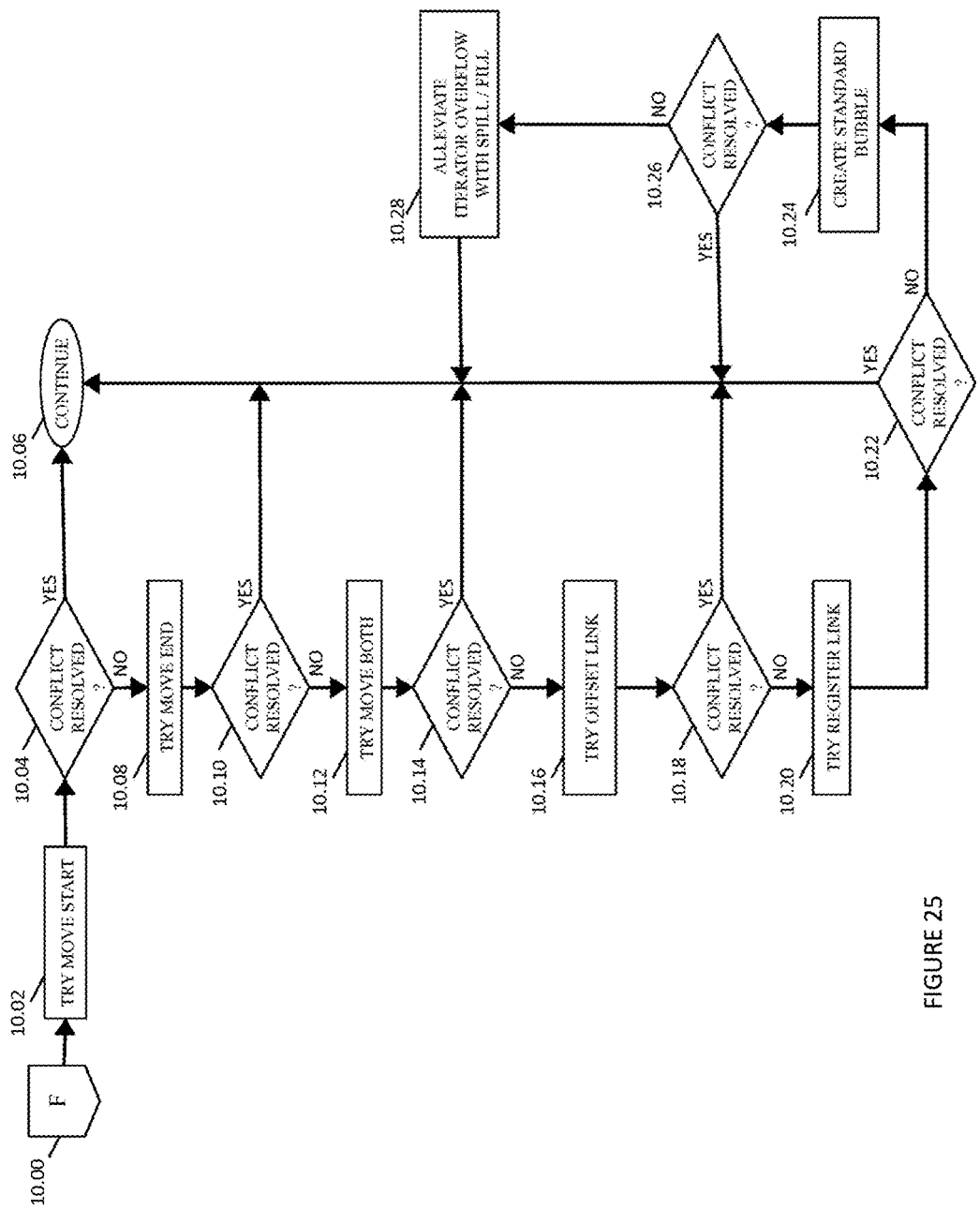
FIG. 25 is a flow chart depicting a process of resolving a next bubble conflict between the following pairs of reconfigurable processor resources: LOADER VS. ITOUT, LOADER VS. STORER, ITOUT VS. ITOUT, ITOUT VS. STORER, ITIN VS. ITOUT, ITIN VS. STORER, STORER VS. ITOUT, STORER VS. STORER.

When the invented compiler 200 determines in step 3.06 that the iterator conflict is between a LOADER VS. an ITOUT, a LOADER VS. a STORER, an ITOUT VS. an ITOUT, an ITOUT VS. a STORER, an ITIN VS. an ITOUT, an ITIN VS. a STORER, a STORER VS. an ITOUT, or a STORER VS. a STORER, the compiler proceeds from step 3.06 to step 3.08 and to execute the process of FIG. 25; in the alternative, the invented compiler 200 proceeds from step 3.06 to step 3.10.

Figure 26:
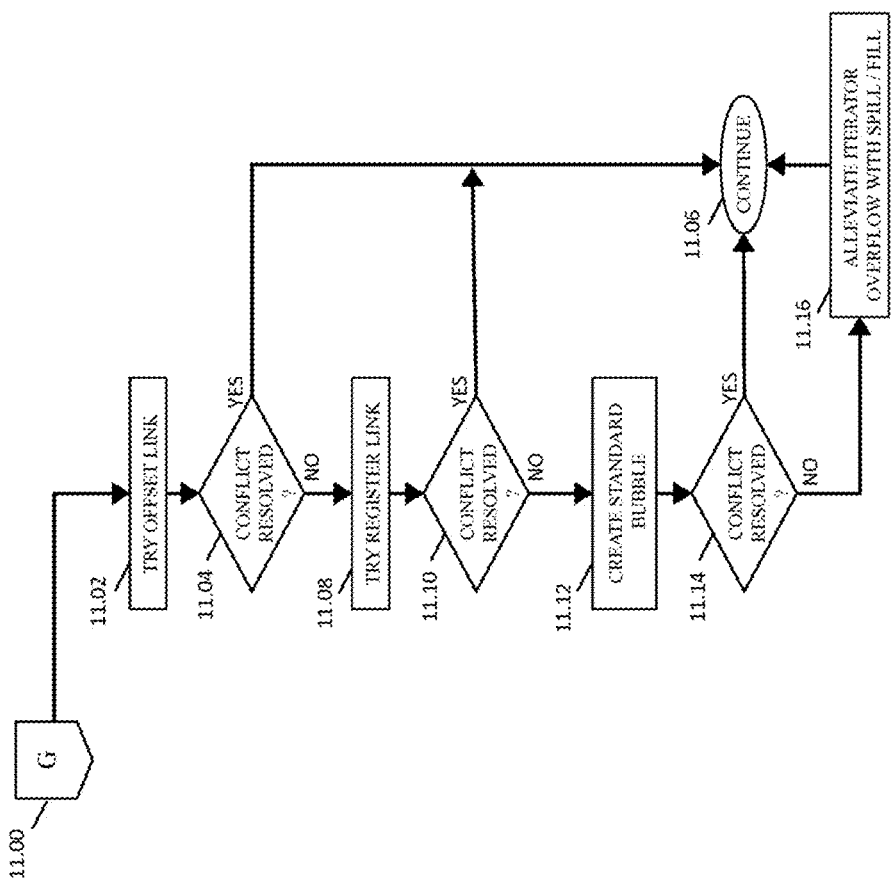
FIG. 26 is a flow chart depicting a process of resolving a next bubble conflict between the following pairs of reconfigurable processor resources: SOURCE VS. SOURCE, SOURCE VS. SINK, SINK VS. SOURCE, SINK VS. SINK.

When the invented compiler 200 determines in step 3.10 that the iterator conflict is between a SOURCE VS. a SOURCE, a SOURCE VS. a SINK, a SINK VS. a SOURCE, or a SINK VS. a SINK, the invented compiler 200 proceeds from step 3.10 to step 3.12 and to execute the process of FIG. 26; in the alternative, the invented compiler 200 proceeds from step 3.10 to step 3.14.

Figure 27:
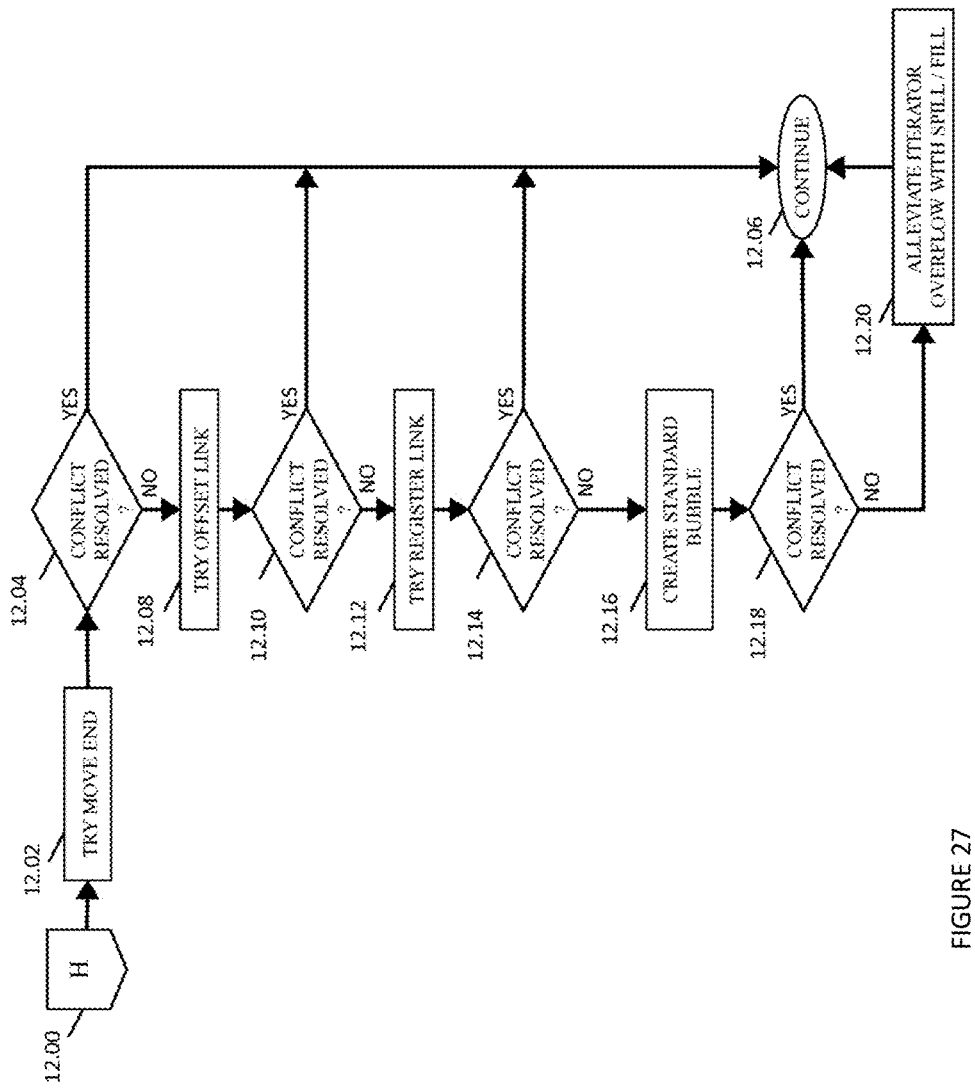
FIG. 27 is a flow chart depicting a process of resolving a next bubble conflict between the following pairs of reconfigurable processor resources: SOURCE VS. ITOUT, SOURCE VS. STORER, SINK VS. ITOUT, SINK VS. STORER.

When the invented compiler 200 determines in step 3.14 that the iterator conflict is between a SOURCE VS. an ITOUT, a SOURCE VS. a STORER, a SINK VS. an ITOUT, or a SINK VS. a STORER, the invented compiler 200 proceeds from step 3.14 to step 3.16 and to execute the process of FIG. 27; in the alternative, the invented compiler 200 proceeds from step 3.14 to step 3.18 and to perform alternative computational processes.

Figure 19:
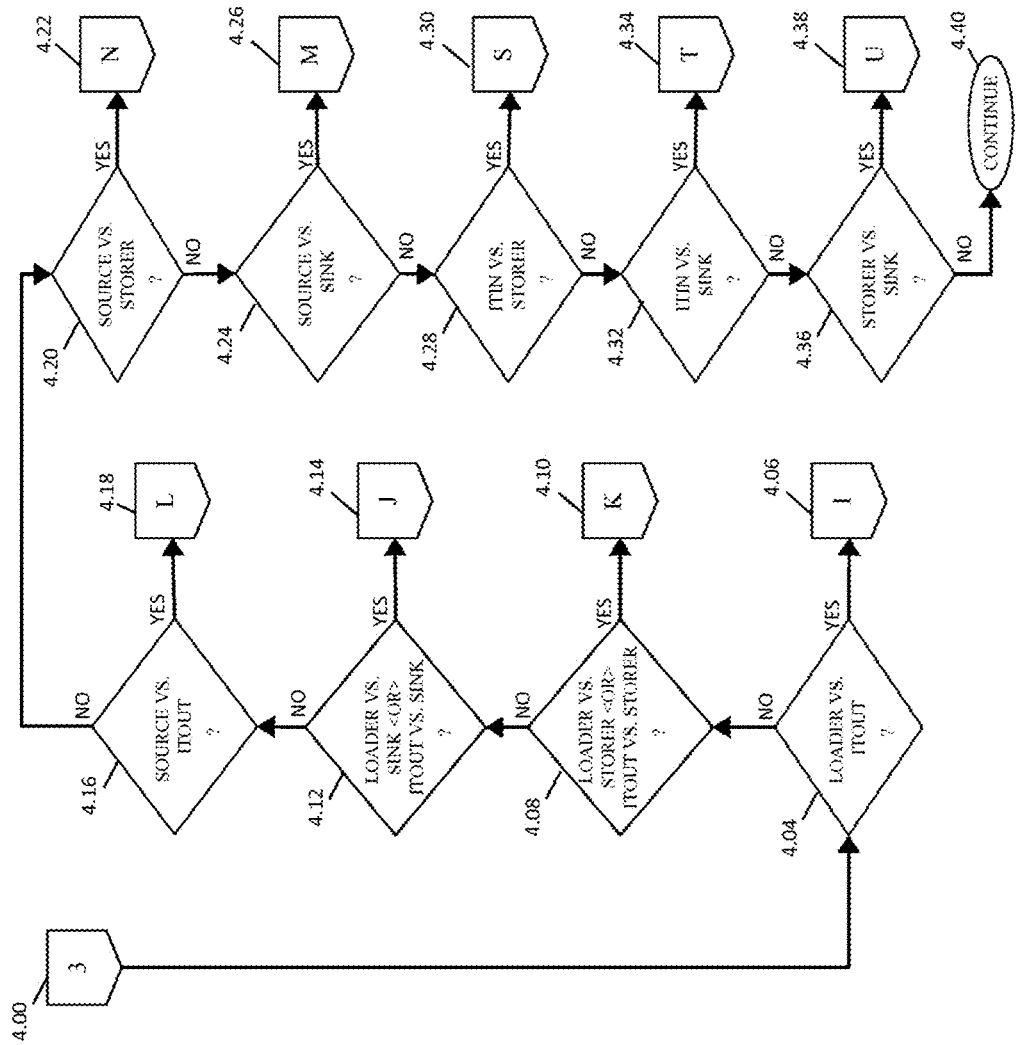
FIG. 19 is a flow chart depicting all possible conflict scenarios between reconfigurable processor resources in the presence of a same bubble conflict.

Referring now generally to the Figures and particularly to FIG. 19, FIG. 19 is a flow chart depicting all possible scenarios of determination and action by the invented compiler 200 in resolving conflicts determined to exist by the invented compiler between reconfigurable processor resources in the presence of a same bubble conflict. The invented compiler 200 makes the following determinations and takes the indicated actions as follows: when the conflict is determined in step 4.02 to be of the type LOADER VS. ITOUT, the invented compiler 200 proceeds to step 4.04 and to apply the method of FIG. 28; when the conflict is determined in step 4.06 to be of the type LOADER VS. STORER or ITOUT VS. STORER, the invented compiler 200 proceeds to step 4.08 and to apply the method of FIG. 30; when the conflict is determined in step 4.10 to be of the type LOADER VS. SINK or ITOUT VS. SINK, the invented compiler 200 proceeds to step 4.12 and to apply the method of FIG. 29; when the conflict is determined in step 4.14 to be of the type SOURCE VS. ITOUT, the invented compiler 200 proceeds to step 4.16 and to apply the method of FIG. 31; when the conflict is determined in step 4.18 to be of the type SOURCE VS. STORER, the invented compiler 200 proceeds to step 4.20 and to apply the method of FIG. 33; when the conflict is determined in step 4.22 to be of the type SOURCE VS. SINK, the invented compiler 200 proceeds to step 4.24 and to apply the method of FIG. 32; when the conflict is determined in step 4.26 to be of the type ITIN VS. STORER, the invented compiler 200 proceeds to step 4.28 and to apply the method of FIG. 34; when the conflict is determined in step 4.30 to be of the type ITIN VS. SINK, the invented compiler 200 proceeds to step 4.32 and to apply the method of FIG. 35; and when the conflict is determined in step 4.34 to be of the type STORER VS. SINK, the invented compiler 200 proceeds to step 4.36 and to apply the method of FIG. 36. When the conflict is determined in step 4.34 to be not of the type STORER VS. SINK, the invented compiler 200 proceeds to step 4.38 and to perform alternate computational operations.

Figure 20:
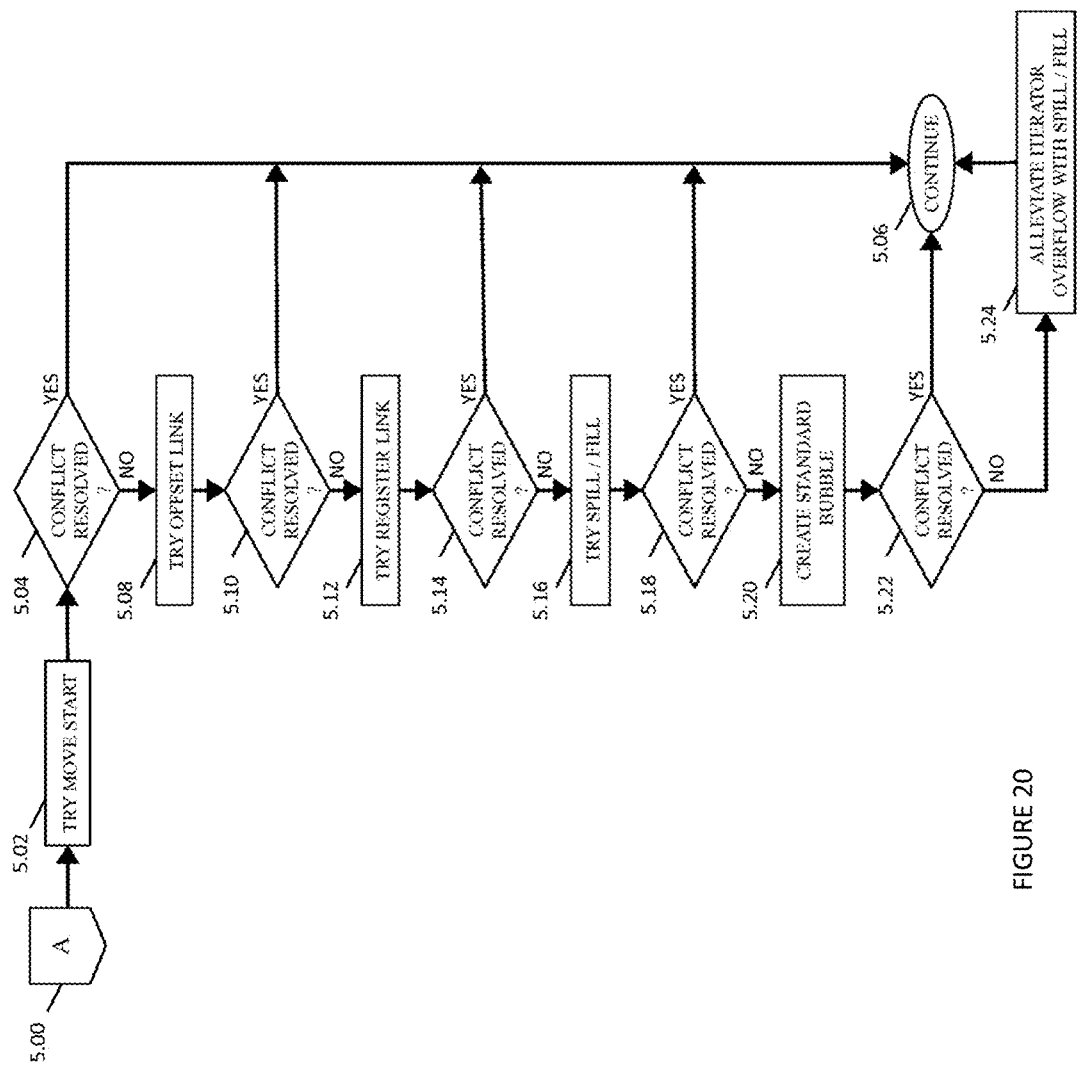
FIG. 20 is a flow chart depicting a process of resolving an intervening bubble conflict between the following pairs of reconfigurable processor resources: LOADER VS. SOURCE, LOADER VS. SINK, ITOUT VS. SOURCE, ITOUT VS. SINK, ITIN VS. SOURCE, ITIN VS. SINK, STORER VS. SOURCE, STORER VS. SINK.

Referring now generally to the Figures and particularly to FIG. 20, FIG. 20 is a flow chart depicting all possible scenarios of determination and action by the invented compiler 200 in resolving an intervening bubble conflict between the following pairs of reconfigurable processor resources: LOADER VS. SOURCE, LOADER VS. SINK, ITOUT VS. SOURCE, ITOUT VS. SINK, ITIN VS. SOURCE, ITIN VS. SINK, STORER VS. SOURCE, or STORER VS. SINK. The invented compiler 200 attempts to move the start of the exemplary first value 402A in step 5.02, and if this attempt is determined by the invented compiler 200 to resolve the instant conflict in step 5.04, the invented compiler 200 proceeds from step 5.04 to step 5.06 and to perform alternate computational operations. The invented compiler 200 attempts to apply an array link of the exemplary first value 402A in step 5.08, and if this attempt is determined in step 5.10 by the invented compiler 200 to resolve the instant conflict, the invented compiler 200 proceeds from step 5.10 to step 5.06 and to perform alternate computational operations. The invented compiler 200 attempts to apply a register link of the exemplary first value 402A in step 5.12, and if this attempt is determined in step 5.14 by the invented compiler 200 to resolve the instant conflict, the invented compiler 200 proceeds from step 5.14 to step 5.06 and to perform alternate computational operations. The invented compiler 200 attempts to apply a spill/fill of the exemplary first value 402A in step 5.16, and if this attempt is determined in step 5.18 by the invented compiler 200 to resolve the instant conflict, the invented compiler 200 proceeds from step 5.18 to step 5.06 and to perform alternate computational operations. The invented compiler 200 attempts to generate a new standard bubble 212E to route the exemplary first value 402A in step 5.20, and if this attempt is determined in step 5.22 by the invented compiler 200 to resolve the instant conflict, the invented compiler 200 proceeds from step 5.22 to step 5.06 and to perform alternate computational operations. Finally, the invented compiler 200 alleviates an apparent iterator overflow condition in step 5.24, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A.

Figure 21:
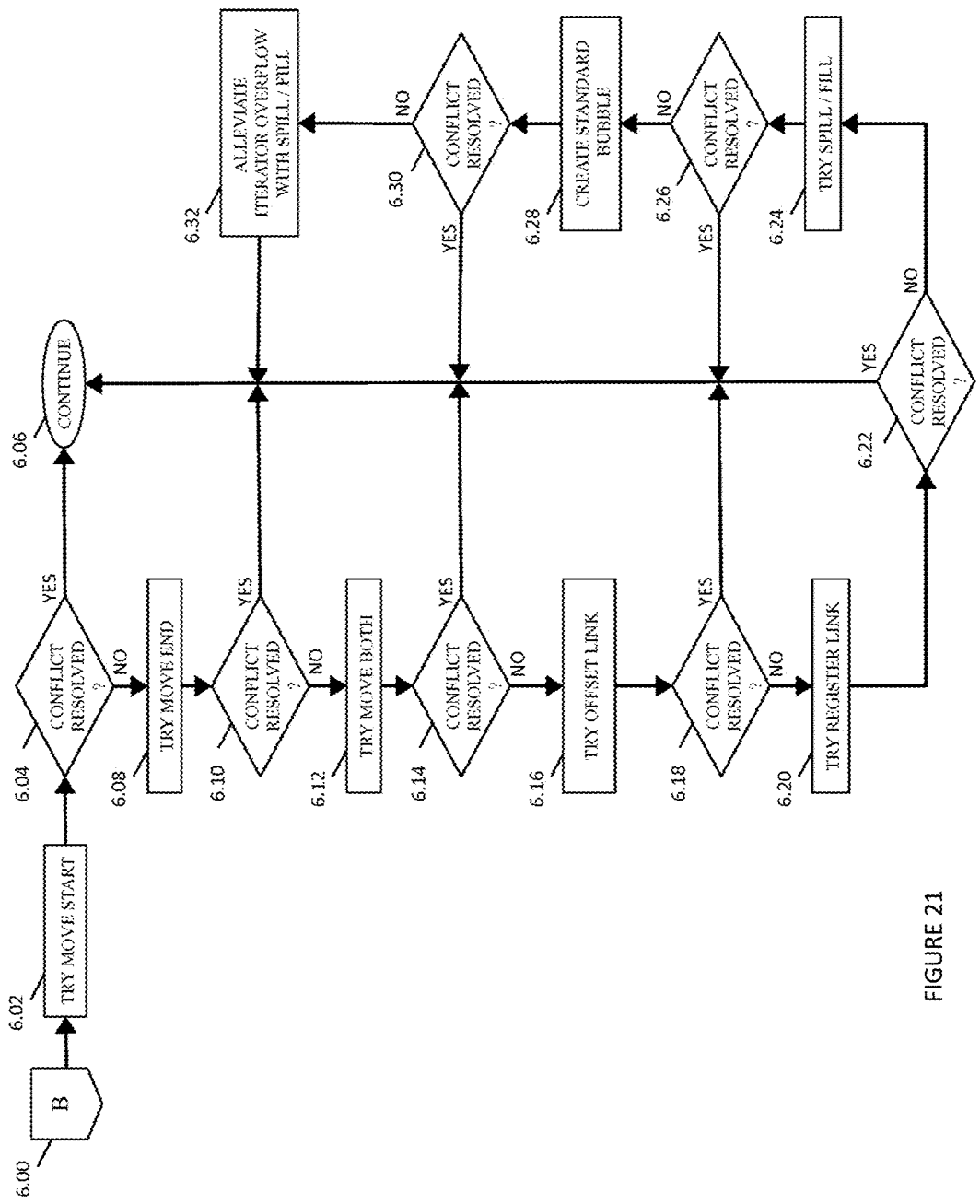
FIG. 21 is a flow chart depicting a process of resolving an intervening bubble conflict between the following pairs of reconfigurable processor resources: LOADER VS. ITOUT, LOADER VS. STORER, ITOUT VS. ITOUT, ITOUT VS. STORER, ITIN VS. ITOUT, ITIN VS. STORER, STORER VS. ITOUT, STORER VS. STORER.

Referring now generally to the Figures and particularly to FIG. 21, FIG. 21 is a flow chart depicting all possible scenarios of determination and action by the invented compiler 200 in resolving an intervening bubble conflict between the following pairs of reconfigurable processor resources: LOADER VS. ITOUT, LOADER VS. STORER, ITOUT VS. ITOUT, ITOUT VS. STORER, ITIN VS. ITOUT, ITIN VS. STORER, STORER VS. ITOUT, STORER VS. STORER.

The invented compiler 200 attempts to move the start of the exemplary first value 402A in step 6.02, and if this attempt is determined by the invented compiler 200 to resolve the instant conflict in step 6.04, the invented compiler 200 proceeds from step 6.04 to step 6.06 and to perform alternate computational operations. The invented compiler 200 attempts to designate an alternate resource within the exemplary first bubble 212A as the end resource associated with the exemplary first value 402A in step 6.08, and if this attempt is determined in step 6.10 by the invented compiler 200 to resolve the instant conflict, the invented compiler 200 proceeds from step 6.10 to step 6.06 and to perform alternate computational operations. The invented compiler 200 attempts in step 6.12 to both (a.) designate an alternate resource within the exemplary first bubble 212A as the end resource associated with the exemplary first value 402A and (b.) move the start of the exemplary first path 400A, and if this attempt is determined in step 6.14 by the invented compiler 200 to resolve the instant conflict, the invented compiler 200 proceeds from step 6.14 to step 6.06 and to perform alternate computational operations. The invented compiler 200 attempts to apply an array link in step 6.16, and if this attempt is determined in step 6.18 by the invented compiler 200 to resolve the instant conflict, the invented compiler 200 proceeds from step 6.18 to step 6.06 and to perform alternate computational operations. The invented compiler 200 attempts to apply a register link in step 6.20, and if this attempt is determined in step 6.22 by the invented compiler 200 to resolve the instant conflict, the invented compiler 200 proceeds from step 6.22 to step 6.06 and to perform alternate computational operations. The invented compiler 200 attempts to apply a spill/fill in step 6.24, and if this attempt is determined in step 6.26 by the invented compiler 200 to resolve the instant conflict, the invented compiler 200 proceeds from step 6.26 to step 6.06 and to perform alternate computational operations. The invented compiler 200 attempts to resolve the conflict by generating a new bubble 212E in step 6.28, and if this attempt is determined in step 6.30 by the invented compiler 200 to resolve the instant conflict, the invented compiler 200 proceeds from step 6.30 to step 6.06 and to perform alternate computational operations. Finally, the invented compiler 200 alleviates an apparent iterator overflow condition in step 6.32, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 6.32 to step 6.06.

Referring now generally to the Figures and particularly to FIG. 22, FIG. 22 is a flow chart depicting all possible scenarios of determination and action by the invented compiler 200 in resolving an intervening bubble conflict between the following pairs of reconfigurable processor resources: SOURCE VS. SOURCE, SOURCE VS. SINK, SINK VS. SOURCE, SINK VS. SINK.

The invented compiler 200 attempts to apply an array link in step 7.02, and if this attempt is determined in step 7.04 by the invented compiler 200 to resolve the instant conflict, the invented compiler 200 proceeds from step 7.04 to step 7.06 and to perform alternate computational operations. The invented compiler 200 attempts to apply a register link in step 7.08, and if this attempt is determined in step 7.10 by the invented compiler 200 to resolve the instant conflict, the invented compiler 200 proceeds from step 7.10 to step 7.06 and to perform alternate computational operations. The invented compiler 200 attempts to apply a spill/fill in step 7.12, and if this attempt is determined in step 7.14 by the invented compiler 200 to resolve the instant conflict, the invented compiler 200 proceeds from step 7.14 to step 7.06 and to perform alternate computational operations. The invented compiler 200 attempts to resolve the conflict by generating a new bubble 212E in step 7.16, and if this attempt is determined in step 7.18 by the invented compiler 200 to resolve the instant conflict, the invented compiler 200 proceeds from step 7.18 to step 7.06 and to perform alternate computational operations. Finally, the invented compiler 200 alleviates an apparent iterator overflow condition in step 7.20, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 7.20 to step 7.06.

Referring now generally to the Figures and particularly to FIG. 23, FIG. 23 is a flow chart depicting all possible scenarios of determination and action by the invented compiler 200 in resolving an intervening bubble conflict between the following pairs of reconfigurable processor resources: SOURCE VS. ITOUT, SOURCE VS. STORER, SINK VS. ITOUT, or SINK VS. STORER.

The invented compiler 200 attempts to designate an alternate resource within the exemplary first bubble 212A as the end resource associated with the exemplary first value 402A in step 8.02, and if this attempt is determined in step 8.04 by the invented compiler 200 to resolve the instant conflict, the invented compiler 200 proceeds from step 8.04 to step 8.06 and to perform alternate computational operations.

The invented compiler 200 attempts to apply an array link in step 8.08, and if this attempt is determined in step 8.10 by the invented compiler 200 to resolve the instant conflict, the invented compiler 200 proceeds from step 8.10 to step 8.06 and to perform alternate computational operations. The invented compiler 200 attempts to apply a register link in step 8.12, and if this attempt is determined in step 8.14 by the invented compiler 200 to resolve the instant conflict, the invented compiler 200 proceeds from step 8.14 to step 8.06 and to perform alternate computational operations. The invented compiler 200 attempts to apply a spill/fill in step 8.16, and if this attempt is determined in step 8.18 by the invented compiler 200 to resolve the instant conflict, the invented compiler 200 proceeds from step 8.18 to step 8.06 and to perform alternate computational operations. The invented compiler 200 attempts to resolve the conflict by generating a new bubble 212E in step 8.20, and if this attempt is determined in step 8.22 by the invented compiler 200 to resolve the instant conflict, the invented compiler 200 proceeds from step 8.22 to step 8.06 and to perform alternate computational operations. Finally, the invented compiler 200 alleviates an apparent iterator overflow condition in step 8.24, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 8.24 to step 8.06.

Referring now generally to the Figures and particularly to FIG. 24, FIG. 24 is a flow chart depicting all possible scenarios of determination and action by the invented compiler 200 in resolving a next bubble conflict between the following pairs of reconfigurable processor resources: LOADER VS. SOURCE, LOADER VS. SINK, ITOUT VS. SOURCE, ITOUT VS. SINK, ITIN VS. SOURCE, ITIN VS. SINK, STORER VS. SOURCE, or STORER VS. SINK.

The invented compiler 200 attempts to designate a start associated with the exemplary first value 402A in step 9.02, and if this attempt is determined in step 9.04 by the invented compiler 200 to resolve the instant conflict, the invented compiler 200 proceeds from step 9.04 to step 9.06 and to perform alternate computational operations.

The invented compiler 200 attempts to apply an array link in step 9.08, and if this attempt is determined in step 9.10 by the invented compiler 200 to resolve the instant conflict, the invented compiler 200 proceeds from step 9.10 to step 9.06 and to perform alternate computational operations. The invented compiler 200 attempts to apply a register link in step 9.12, and if this attempt is determined in step 9.14 by the invented compiler 200 to resolve the instant conflict, the invented compiler 200 proceeds from step 9.14 to step 9.06 and to perform alternate computational operations. The invented compiler 200 attempts to resolve the conflict by generating a new bubble 212E in step 9.16, and if this attempt is determined in step 9.18 by the invented compiler 200 to resolve the instant conflict, the invented compiler 200 proceeds from step 9.18 to step 9.06 and to perform alternate computational operations. Finally, the invented compiler 200 alleviates an apparent iterator overflow condition in step 9.20, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 9.20 to step 9.06.

Referring now generally to the Figures and particularly to FIG. 25, FIG. 25 is a flow chart depicting all possible scenarios of determination and action by the invented compiler 200 in resolving a next bubble conflict between the following pairs of reconfigurable processor resources LOADER VS. ITOUT, LOADER VS. STORER, ITOUT VS. ITOUT, ITOUT VS. STORER, ITIN VS. ITOUT, ITIN VS. STORER, STORER VS. ITOUT, or STORER VS. STORER.

The invented compiler 200 attempts to move the start of the exemplary first value 402A in step 10.02, and if this attempt is determined by the invented compiler 200 to resolve the instant conflict in step 10.04, the invented compiler 200 proceeds from step 10.04 to step 10.06 and to perform alternate computational operations. The invented compiler 200 attempts to designate an alternate resource within the exemplary first bubble 212A as the end resource associated with the exemplary first value 402A in step 10.08, and if this attempt is determined in step 10.10 by the invented compiler 200 to resolve the instant conflict, the invented compiler 200 proceeds from step 10.10 to step 10.06 and to perform alternate computational operations. The invented compiler 200 attempts in step 10.12 to both (a.)

designate an alternate resource within the exemplary first bubble 212A as the end resource associated with the exemplary first value 402A and (b.) move the start of the exemplary first path 400A, and if this attempt is determined in step 10.14 by the invented compiler 200 to resolve the instant conflict, the invented compiler 200 proceeds from step 10.14 to step 10.06 and to perform alternate computational operations. The invented compiler 200 attempts to apply an array link in step 10.16, and if this attempt is determined in step 10.18 by the invented compiler 200 to resolve the instant conflict, the invented compiler 200 proceeds from step 10.18 to step 10.06 and to perform alternate computational operations. The invented compiler 200 attempts to apply a register link in step 10.20, and if this attempt is determined in step 10.22 by the invented compiler 200 to resolve the instant conflict, the invented compiler 200 proceeds from step 10.22 to step 10.06 and to perform alternate computational operations. The invented compiler 200 attempts to resolve the conflict by generating a new bubble 212E in step 10.24, and if this attempt is determined in step 10.26 by the invented compiler 200 to resolve the instant conflict, the invented compiler 200 proceeds from step 10.26 to step 10.06 and to alternate computational operations. Finally, the invented compiler 200 alleviates an apparent iterator overflow condition in step 10.28, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 10.28 to step 10.06.

Referring now generally to the Figures and particularly to FIG. 26, FIG. 26 is a flow chart depicting all possible scenarios of determination and action by the invented compiler 200 in resolving a next bubble conflict between the following pairs of reconfigurable processor resources: SOURCE VS. SOURCE, SOURCE VS. SINK, SINK VS. SOURCE, or SINK VS. SINK.

The invented compiler 200 attempts to apply an array link in step 11.02, and if this attempt is determined in step 11.04 by the invented compiler 200 to resolve the instant conflict, the invented compiler 200 proceeds from step 11.04 to step 11.06 and to perform alternate computational operations. The invented compiler 200 attempts to apply a register link in step 11.08, and if this attempt is determined in step 11.10 by the invented compiler 200 to resolve the instant conflict, the invented compiler 200 proceeds from step 11.10 to step 11.06 and to perform alternate computational operations. The invented compiler 200 attempts to resolve the conflict by generating a new bubble 212E in step 11.12, and if this attempt is determined in step 11.14 by the invented compiler 200 to resolve the instant conflict, the invented compiler 200 proceeds from step 11.14 to step 11.06 and to perform alternate computational operations. Finally, the invented compiler 200 alleviates an apparent iterator overflow condition in step 11.16, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 11.16 to step 11.06.

Referring now generally to the Figures and particularly to FIG. 27, FIG. 27 is a flow chart depicting all possible scenarios of determination and action by the invented compiler 200 in resolving a next bubble conflict between the following pairs of reconfigurable processor resources: SOURCE VS. ITOUT, SOURCE VS. STORER, SINK VS. ITOUT, or SINK VS. STORER.

The invented compiler 200 attempts to designate an alternate resource within the exemplary first bubble 212A as the end resource associated with the exemplary first value 402A in step 12.02, and if this attempt is determined in step 12.04 by the invented compiler 200 to resolve the instant conflict, the invented compiler 200 proceeds from step 12.04 to step 12.06 and to perform alternate computational operations.

The invented compiler 200 attempts to apply an array link in step 12.08, and if this attempt is determined in step 12.10 by the invented compiler 200 to resolve the instant conflict, the invented compiler 200 proceeds from step 12.10 to step 12.06 and to perform alternate computational operations. The invented compiler 200 attempts to apply a register link in step 12.12, and if this attempt is determined in step 12.14 by the invented compiler 200 to resolve the instant conflict, the invented compiler 200 proceeds from step 12.14 to step 12.06 and to perform alternate computational operations. The invented compiler 200 attempts to resolve the conflict by generating a new bubble 212E in step 12.16, and if this attempt is determined in step 12.18 by the invented compiler 200 to resolve the instant conflict, the invented compiler 200 proceeds from step 12.18 to step 12.06 and to perform alternate computational operations. Finally, the invented compiler 200 alleviates an apparent iterator overflow condition in step 12.20, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 12.20 to step 12.06.

Figure 28:
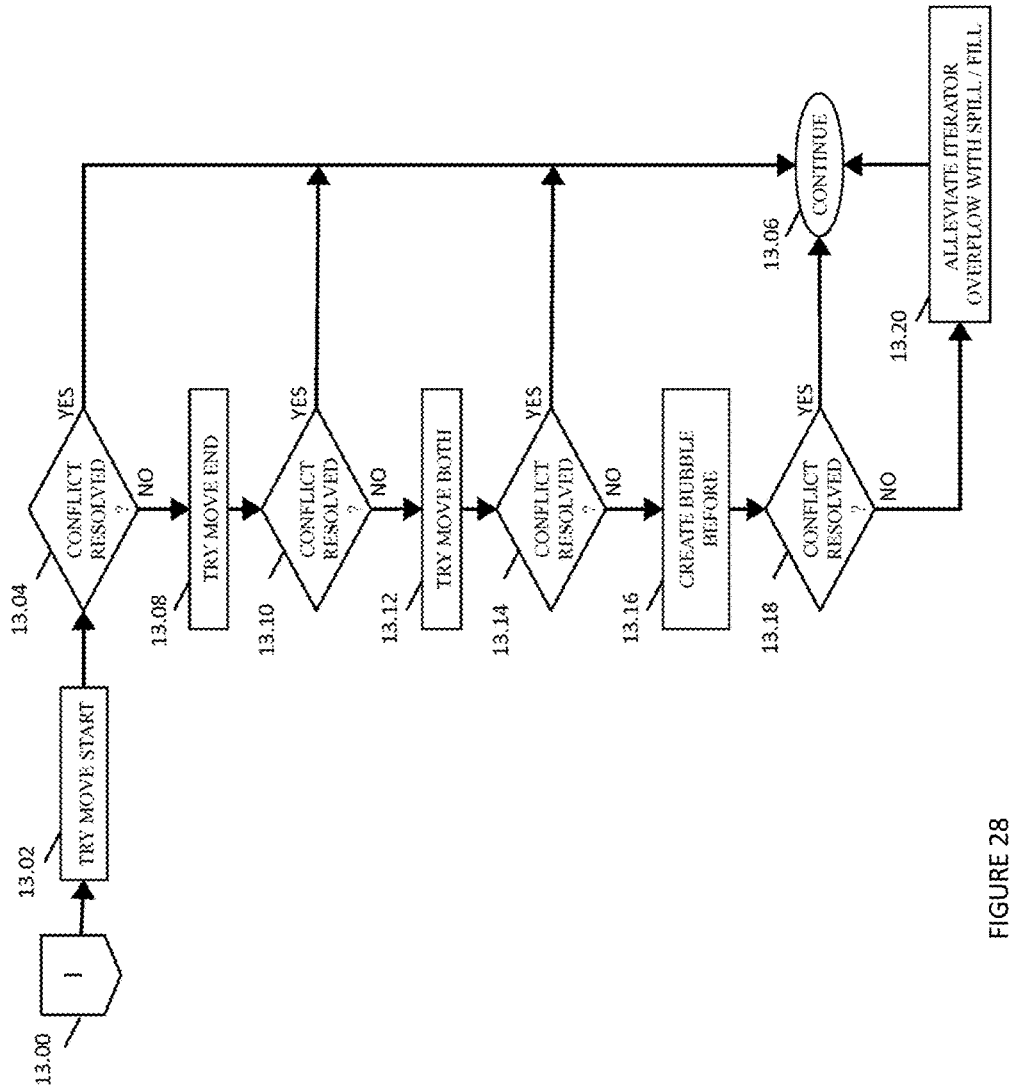
FIG. 28 is a flow chart depicting a process of resolving a same bubble conflict between the following pairs of reconfigurable processor resources: LOADER VS. SOURCE, SOURCE VS. SOURCE, ITOUT VS. SOURCE, ITOUT VS. ITOUT, ITIN VS. SOURCE, ITIN VS. ITOUT, STORER VS. SOURCE, STORER VS. ITOUT, STORER VS. STORER, SINK VS. SOURCE, SINK VS. ITOUT, SINK VS. STORER, SINK VS. SINK.

Referring now generally to the Figures and particularly to FIG. 28, FIG. 28 is a flow chart depicting a process of resolving a bubble conflict within the first bubble 212A between the following pairs of reconfigurable processor resources: LOADER VS. SOURCE, SOURCE VS. SOURCE, ITOUT VS. SOURCE, ITOUT VS. ITOUT, ITIN VS. SOURCE, ITIN VS. ITOUT, STORER VS. SOURCE, STORER VS. ITOUT, STORER VS. STORER, SINK VS. SOURCE, SINK VS. ITOUT, SINK VS. STORER, or SINK VS. SINK.

The invented compiler 200 attempts to move the start of the exemplary first value 402A in step 13.02, and if this attempt is determined by the invented compiler 200 to resolve the instant conflict in step 13.04, the invented compiler 200 proceeds from step 13.04 to step 13.06 and to perform alternate computational operations. The invented compiler 200 attempts to designate an alternate resource within the exemplary first bubble 212A as the end resource associated with the exemplary first value 402A in step 13.08, and if this attempt is determined in step 13.10 by the invented compiler 200 to resolve the instant conflict, the invented compiler 200 proceeds from step 13.10 to step 13.06 and to perform alternate computational operations. The invented compiler 200 attempts in step 13.12 to both (a.) designate an alternate resource within the exemplary first bubble 212A as the end resource associated with the exemplary first value 402A and (b.) move the start of the exemplary first path 400A, and if this attempt is determined in step 13.14 by the invented compiler 200 to resolve the instant conflict, the invented compiler 200 proceeds from step 13.14 to step 13.06 and to perform alternate computational operations. The invented compiler 200 attempts to resolve the conflict by generating a new before bubble 214 in step 13.16, and if this attempt is determined in step 13.18 by the invented compiler 200 to resolve the instant conflict, the invented compiler 200 proceeds from step 13.18 to step 13.06 and to alternate computational operations. Finally, the invented compiler 200 alleviates an apparent iterator overflow condition in step 13.20, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 13.20 to step 13.06.

Figure 29:
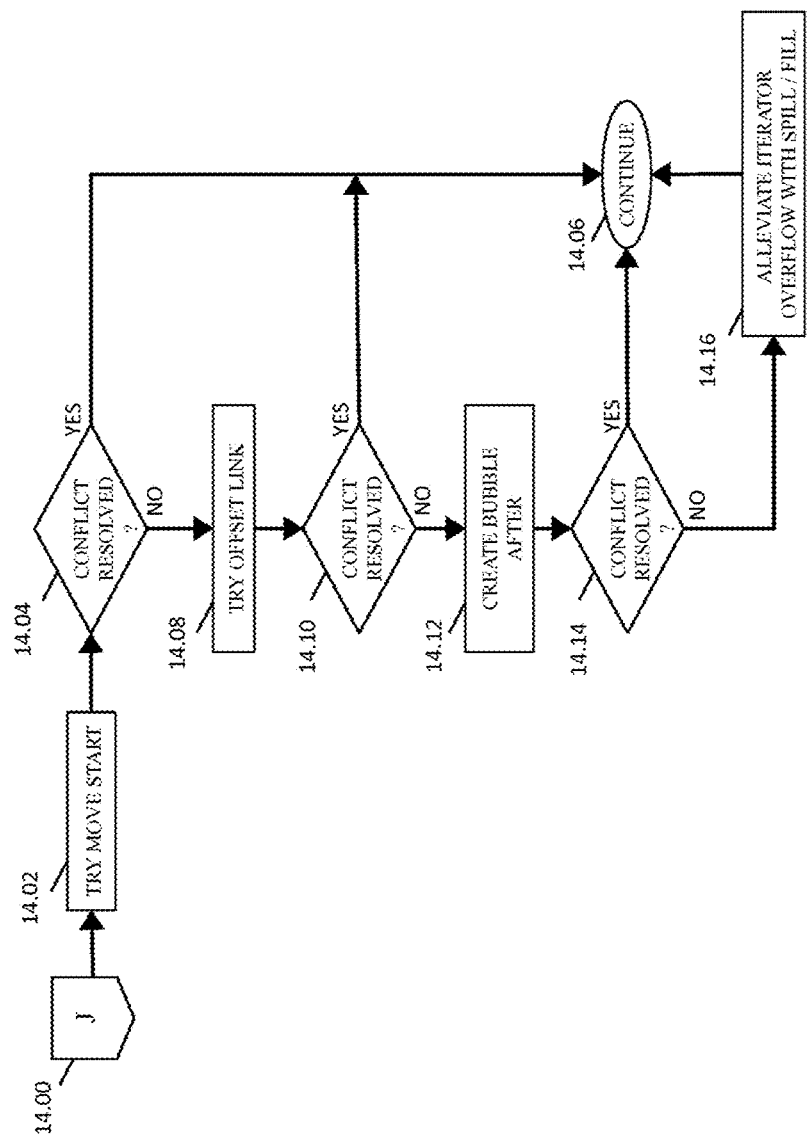
FIG. 29 is a flow chart depicting a process of resolving a same bubble conflict between the following pairs of reconfigurable processor resources: LOADER VS. SINK, ITOUT VS. SINK.

Referring now generally to the Figures and particularly to FIG. 29, FIG. 29 is a flow chart depicting all possible scenarios of determination and action by the invented compiler 200 in resolving a bubble conflict within a same first bubble 212A between the following pairs of reconfigurable processor resources: : LOADER VS. SINK or ITOUT VS. SINK.

The invented compiler 200 attempts to designate an start associated with the exemplary first value 402A in step 14.02, and if this attempt is determined in step 14.04 by the invented compiler 200 to resolve the instant conflict, the invented compiler 200 proceeds from step 14.04 to step 14.06 and to perform alternate computational operations.

The invented compiler 200 attempts to apply an array link in step 14.08, and if this attempt is determined in step 14.10 by the invented compiler 200 to resolve the instant conflict, the invented compiler 200 proceeds from step 14.10 to step 14.06 and to perform alternate computational operations. The invented compiler 200 attempts to resolve the conflict by generating a new bubble 214, 216 & 218 in step 14.12, and if this attempt is determined in step 14.14 by the invented compiler 200 to resolve the instant conflict, the invented compiler 200 proceeds from step 14.14 to step 14.06 and to perform alternate computational operations. Finally, the invented compiler 200 alleviates an apparent iterator overflow condition in step 14.16, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 14.16 to step 14.06.

Figure 30:
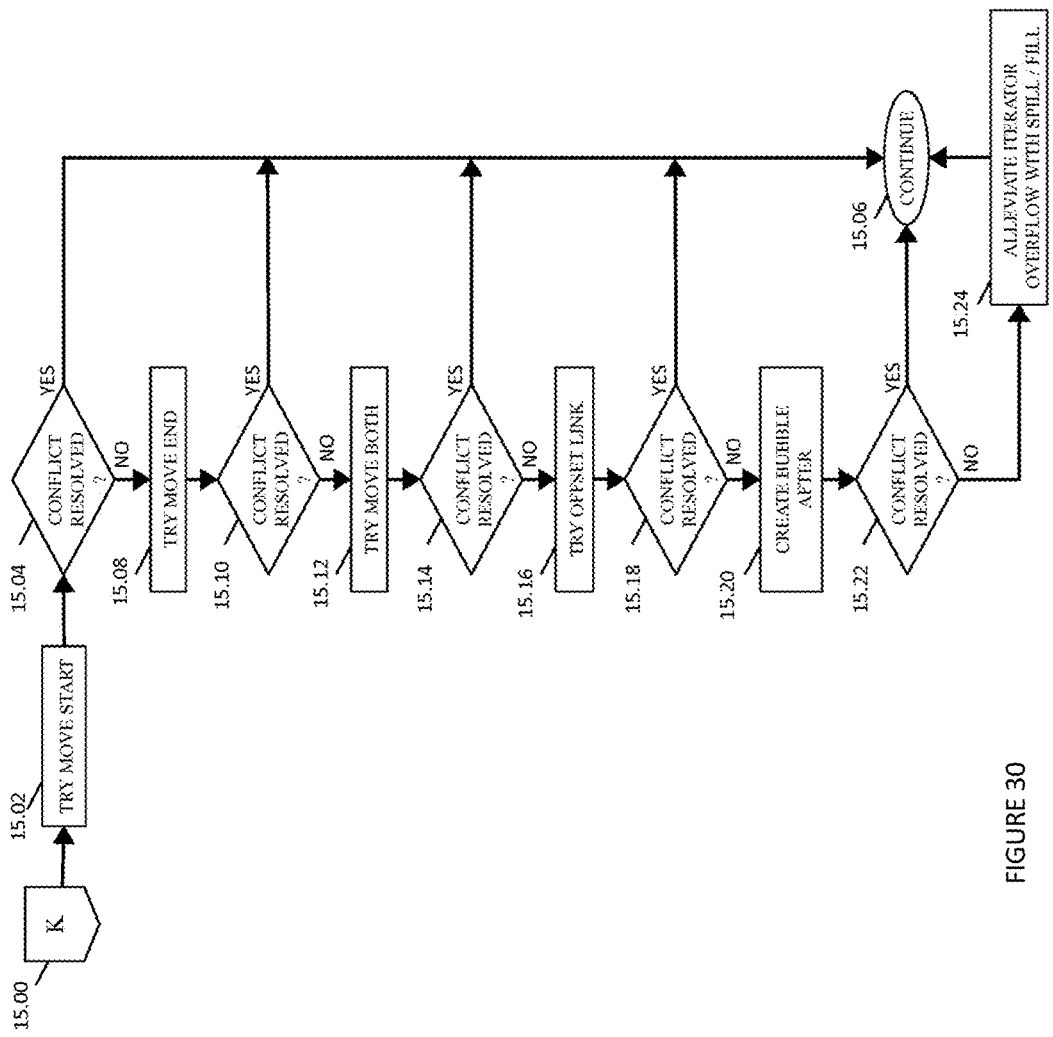
FIG. 30 is a flow chart depicting a process of resolving a same bubble conflict between the following pairs of reconfigurable processor resources: LOADER VS. STORER, ITOUT VS. STORER.

Referring now generally to the Figures and particularly to FIG. 30, FIG. 30 is a flow chart depicting a process of resolving a conflict within the same first bubble 212A between the following pairs of reconfigurable processor resources: LOADER VS. STORER, ITOUT VS. STORER.

The invented compiler 200 attempts to move the start of the exemplary first value 402A in step 15.02, and if this attempt is determined by the invented compiler 200 to resolve the instant conflict in step 15.04, the invented compiler 200 proceeds from step 15.04 to step 15.06 and to perform alternate computational operations. The invented compiler 200 attempts to designate an alternate resource within the exemplary first bubble 212A as the end resource associated with the exemplary first value 402A in step 15.08, and if this attempt is determined in step 15.10 by the invented compiler 200 to resolve the instant conflict, the invented compiler 200 proceeds from step 15.10 to step 15.06 and to perform alternate computational operations. The invented compiler 200 attempts in step 15.12 to both (a.) designate an alternate resource within the exemplary first bubble 212A as the end resource associated with the exemplary first value 402A and (b.) move the start of the exemplary first path 400A, and if this attempt is determined in step 15.14 by the invented compiler 200 to resolve the instant conflict, the invented compiler 200 proceeds from step 15.14 to step 15.06 and to perform alternate computational operations. The invented compiler 200 attempts to apply an array link in step 15.16, and if this attempt is determined in step 15.18 by the invented compiler 200 to resolve the instant conflict, the invented compiler 200 proceeds from step 15.18 to step 15.06 and to perform alternate computational operations.

The invented compiler 200 attempts to resolve the conflict by generating a new after-bubble 216 in step 15.20, and if this attempt is determined in step 15.22 by the invented compiler 200 to resolve the instant conflict, the invented compiler 200 proceeds from step 15.22 to step 15.06 and to alternate computational operations. Finally, the invented compiler 200 alleviates an apparent iterator overflow condition in step 15.24, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 15.24 to step 15.06.

Figure 31:
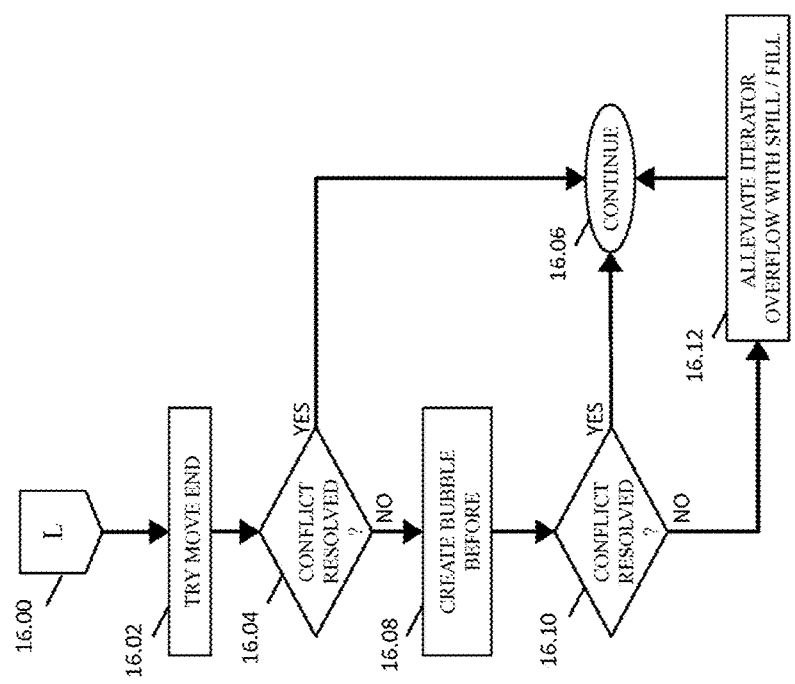
FIG. 31 is a flow chart depicting a process of resolving a same bubble conflict between the following pair of reconfigurable processor resources: SOURCE VS. ITOUT.

Referring now generally to the Figures and particularly to FIG. 31, FIG. 31 is a flow chart depicting a process of resolving a conflict within the same first bubble 212A between the pair of reconfigurable processor resources of SOURCE VS. ITOUT.

The invented compiler 200 attempts to designate an alternate resource within the exemplary first bubble 212A as the end resource associated with the exemplary first value 402A in step 12.02, and if this attempt is determined in step 12.04 by the invented compiler 200 to resolve the instant conflict, the invented compiler 200 proceeds from step 12.04 to step 12.06 and to perform alternate computational operations.

The invented compiler 200 attempts to resolve the conflict by generating a new before bubble 212E in step 12.08, and if this attempt is determined in step 12.10 by the invented compiler 200 to resolve the instant conflict, the invented compiler 200 proceeds from step 12.10 to step 12.06 and to perform alternate computational operations. Finally, the invented compiler 200 alleviates an apparent iterator overflow condition in step 12.12, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 12.12 to step 12.06.

Figure 32:
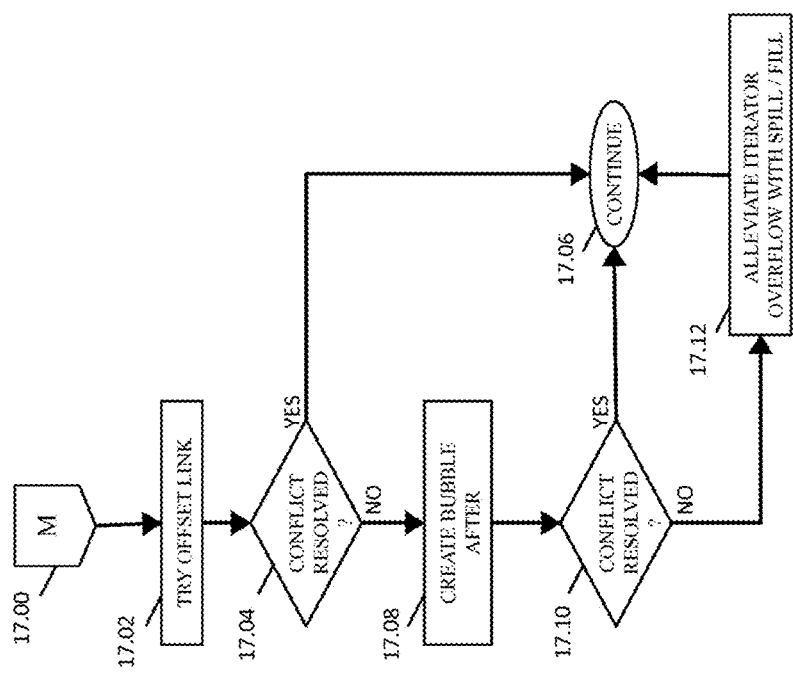
FIG. 32 is a flow chart depicting a process of resolving a same bubble conflict between the following pair of reconfigurable processor resources: SOURCE VS. SINK.

Referring now generally to the Figures and particularly to FIG. 32, FIG. 32 is a flow chart depicting a process of resolving a conflict within the same first bubble 212A between the pair of reconfigurable processor resources of SOURCE VS. SINK.

The invented compiler 200 attempts to apply an array link in step 17.02, and if this attempt is determined in step 17.04 by the invented compiler 200 to resolve the instant conflict, the invented compiler 200 proceeds from step 17.04 to step 17.06 and to perform alternate computational operations.

The invented compiler 200 attempts to resolve the conflict by generating a new after-bubble 216 in step 17.08, and if this attempt is determined in step 17.10 by the invented compiler 200 to resolve the instant conflict, the invented compiler 200 proceeds from step 17.10 to step 17.06 and to alternate computational operations. Finally, the invented compiler 200 alleviates an apparent iterator overflow condition in step 17.12, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 17.12 to step 17.06.

Figure 33:
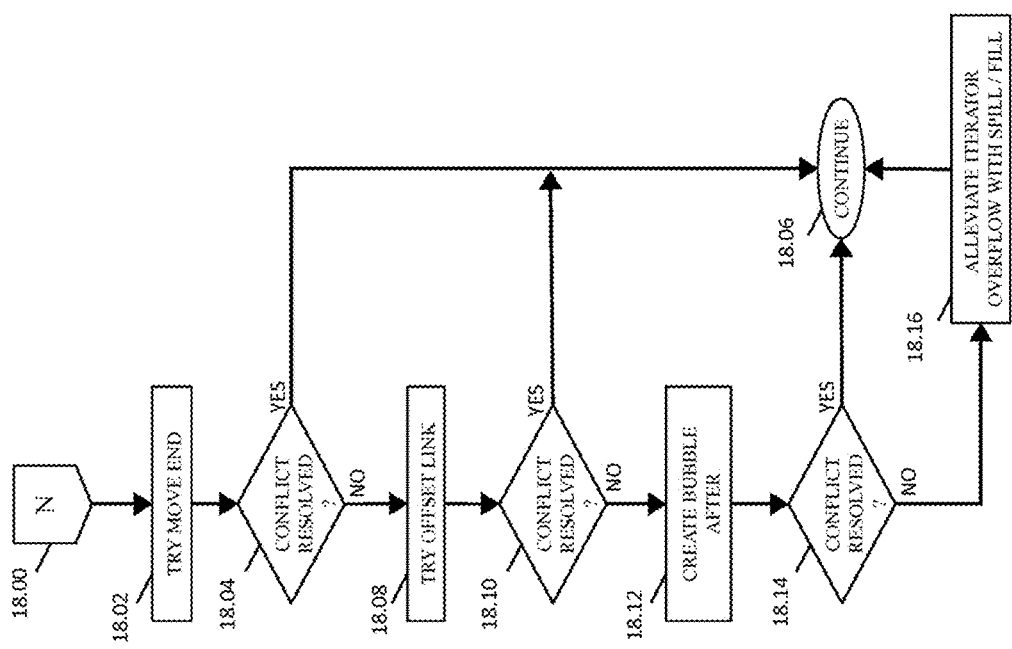
FIG. 33 is a flow chart depicting a process of resolving a same bubble conflict between the following pair of reconfigurable processor resources: SOURCE VS. STORER.

Referring now generally to the Figures and particularly to FIG. 33, FIG. 33 is a flow chart depicting a process of resolving a conflict within the same first bubble 212A between the pair of reconfigurable processor resources of SOURCE VS. STORER. The invented compiler 200 attempts to designate an alternate resource within the exemplary first bubble 212A as the end resource associated with the exemplary first value 402A in step 18.02, and if this attempt is determined in step 18.04 by the invented compiler 200 to resolve the instant conflict, the invented compiler 200 proceeds from step 18.04 to step 18.06 and to perform alternate computational operations.

The invented compiler 200 attempts to apply an array link in step 18.08, and if this attempt is determined in step 18.10 by the invented compiler 200 to resolve the instant conflict, the invented compiler 200 proceeds from step 18.10 to step 18.06 and to perform alternate computational operations.

The invented compiler 200 attempts to resolve the conflict by generating a new after-bubble 216 in step 18.12, and if this attempt is determined in step 18.14 by the invented compiler 200 to resolve the instant conflict, the invented compiler 200 proceeds from step 18.14 to step 18.06 and to alternate computational operations. Finally, the invented compiler 200 alleviates an apparent iterator overflow condition in step 18.16, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 18.16 to step 18.06.

Figure 34:
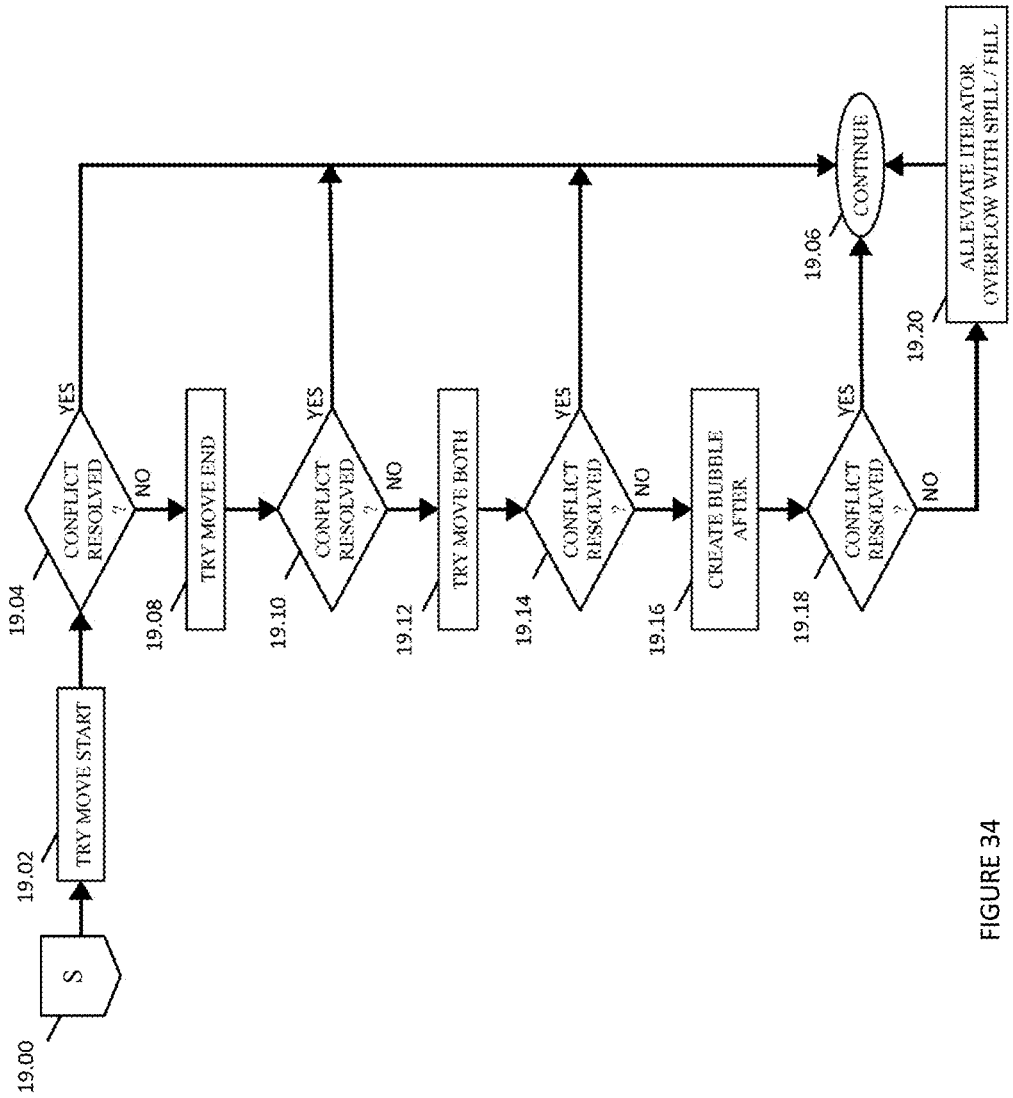
FIG. 34 is a flow chart depicting a process of resolving a same bubble conflict between the following pair of reconfigurable processor resources: ITIN VS. STORER.

Referring now generally to the Figures and particularly to FIG. 34, FIG. 34 is a flow chart depicting a process of resolving a conflict within the same first bubble 212A between the pair of reconfigurable processor resources of ITIN VS. STORER.

The invented compiler 200 attempts to move the start of the exemplary first value 402A in step 19.02, and if this attempt is determined by the invented compiler 200 to resolve the instant conflict in step 19.04, the invented compiler 200 proceeds from step 19.04 to step 19.06 and to perform alternate computational operations. The invented compiler 200 attempts to designate an alternate resource within the exemplary first bubble 212A as the end resource associated with the exemplary first value 402A in step 19.08, and if this attempt is determined in step 19.10 by the invented compiler 200 to resolve the instant conflict, the invented compiler 200 proceeds from step 19.10 to step 19.06 and to perform alternate computational operations. The invented compiler 200 attempts in step 19.12 to both (a.) designate an alternate resource within the exemplary first bubble 212A as the end resource associated with the exemplary first value 402A and (b.) move the start of the exemplary first path 400A, and if this attempt is determined in step 19.14 by the invented compiler 200 to resolve the instant conflict, the invented compiler 200 proceeds from step 19.14 to step 19.06 and to perform alternate computational operations.

The invented compiler 200 attempts to resolve the conflict by generating a new after-bubble 216 in step 19.16, and if this attempt is determined in step 19.18 by the invented compiler 200 to resolve the instant conflict, the invented compiler 200 proceeds from step 19.18 to step 19.06 and to alternate computational operations. Finally, the invented compiler 200 alleviates an apparent iterator overflow condition in step 19.20, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 19.20 to step 19.06.

Figure 35:
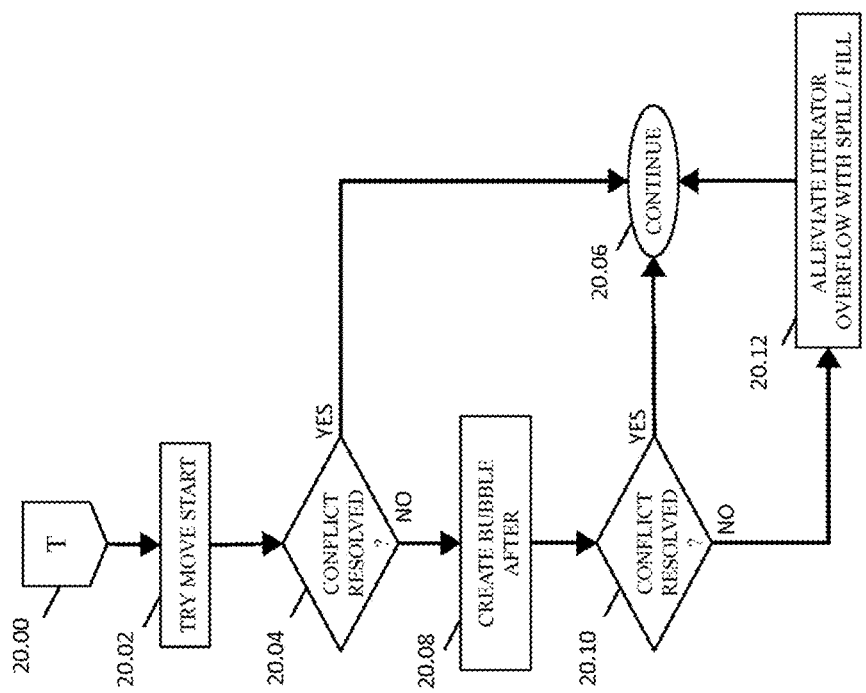
FIG. 35 is a flow chart depicting a process of resolving a same bubble conflict between the following pair of reconfigurable processor resources: ITIN VS. SINK.

Referring now generally to the Figures and particularly to FIG. 35, FIG. 35 is a flow chart depicting a process of resolving a conflict within the same first bubble 212A between the pair of reconfigurable processor resources of ITIN VS. SINK.

The invented compiler 200 attempts to move the start of the exemplary first value 402A in step 20.02, and if this attempt is determined by the invented compiler 200 to resolve the instant conflict in step 20.04, the invented compiler 200 proceeds from step 20.04 to step 20.06 and to perform alternate computational operations.

The invented compiler 200 attempts to resolve the conflict by generating a new after-bubble 218 in step 20.08, and if this attempt is determined in step 20.10 by the invented compiler 200 to resolve the instant conflict, the invented compiler 200 proceeds from step 20.10 to step 20.06 and to alternate computational operations. Finally, the invented compiler 200 alleviates an apparent iterator overflow condition in step 20.12, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 20.12 to step 20.06.

Figure 36:
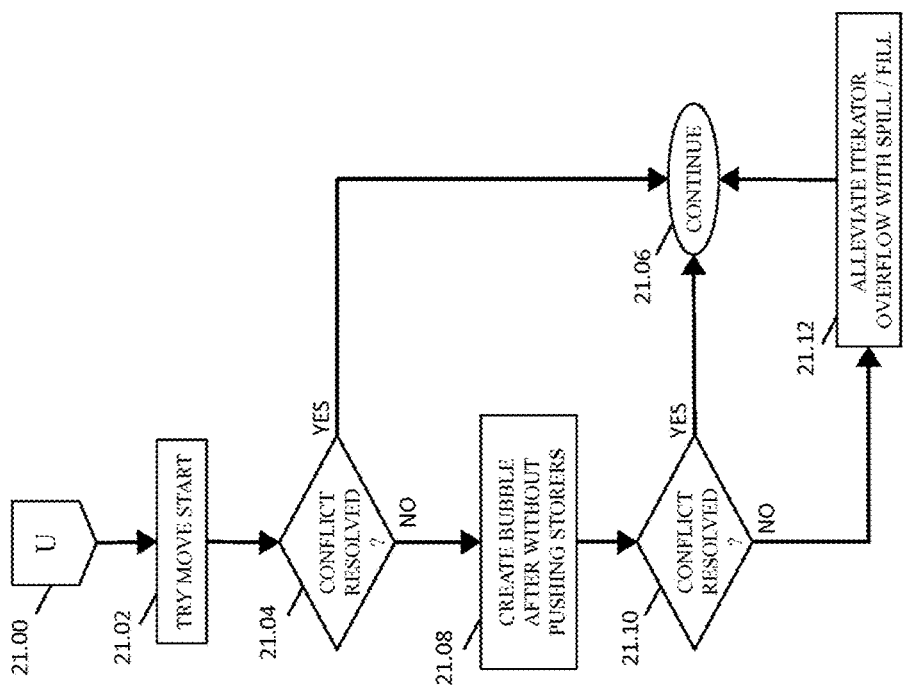
FIG. 36 is a flow chart depicting a process of resolving a same bubble conflict between the following pair of reconfigurable processor resources: STORER VS. SINK.

Referring now generally to the Figures and particularly to FIG. 36, FIG. 36 is a flow chart depicting a process of resolving a conflict within the same exemplary first bubble 212A between the pair of reconfigurable processor resources of STORER VS. SINK.

The invented compiler 200 attempts to move the start of the exemplary first value 402A in step 21.02, and if this attempt is determined by the invented compiler 200 to resolve the instant conflict in step 20.04, the invented compiler 200 proceeds from step 21.04 to step 21.06 and to perform alternate computational operations.

The invented compiler 200 attempts to resolve the conflict by generating a new bubble after 218 in step 21.08, and if this attempt is determined in step 21.10 by the invented compiler 200 to resolve the instant conflict, the invented compiler 200 proceeds from step 21.10 to step 21.06 and to alternate computational operations. Finally, the invented compiler 200 alleviates an apparent iterator overflow condition in step 21.12, wherein the RLU 110 has an insufficient count of iterators 190.A.X-190.N.Z to satisfy the requirements of the resources of the current first exemplary bubble 212A, by applying spill/fill to a plurality of the resources of the instant exemplary first bubble 212A. The invented compiler 200 proceeds from step 21.12 to step 21.06.

Attention is now respectfully drawn to examples of actual execution of the machine code 202 by the DRP 100. Each instruction 206A-206N of the machine code 202 as executed instantiates one or more of the pipelined stages 502-508 as outlined in the pipelined stages diagram of Figure 5. Given that these pipelined stages 502-508 are sequential and non-overlapping within each instruction 206A-206N, there are three distinct modes of instruction stage interleaving available, each with its own interdependency rules, namely: 1) non-interleaved mode, 2) half-interleaved mode, and 3) full-interleaved mode.

Consider first that in non-interleaved mode, no instruction 206A-206N overlaps in execution with a preceding or succeeding instructions 206A-206N. Using the three instructions 206A-206C as an exemplary implementation of a non-interleaved mode of execution, following the completion of the data store stage 508 of a first instruction 206A, the instruction load stage 502 of a succeeding and next executed second instruction 206B commences. If the instant instruction 206B is already stored in one of the back buffer circuits 140, the instruction load stage 502 of the execution cycle 500 of the second instruction 206B is skipped. Otherwise, in the preferred embodiment, the instruction load stage 502 of the second instruction 206B may occupy the twenty clock cycles. If optional instruction decompression is added, the data load stage 504 of the instruction execution cycles 500 of one or more instructions 206A-206N might be reduced to as brief as one clock cycle.

Following the instruction load stage 502 of the second instruction 206B, or immediately in case of a skipped instruction load stage 502, the data load stage 504 of the second instruction 206B commences. In the preferred embodiment, the data load stage 504 occupies one clock cycle unless no loader circuits 121A-121N are required to be active in the current instruction 206A-206N, in which case this data load stage 504 of the instant instruction execution cycle 500 of the second instruction 206B is skipped, Following the execution the data load stage 504 of the second instruction 206B, or immediately in the case the data load stage 504 of the second instruction 206B is skipped, the array execution stage 506 of the second instruction 206B is executed. In the preferred embodiment, the array execution stage 506 occupies the number of clock cycles specified in an execution word 208A-208N of the currently executing instruction 206A-206N, e.g., the second instruction execution word 208B of the second instruction 206B, It is understood that each instruction 206A-206N comprises an execution word 208A-208N.

If the second instruction execution word 208B of the second instruction 206B specifies zero cycles for array execution stage 506, the array execution stage 506 of the second instruction 206B is executed. Following completion of the array execution stage 506 of the second instruction 206B, or immediately if this array execution stage 506 is skipped, the data store stage 508 of the same instruction cycle 500 of the second instruction 206B preferably immediately commences. In the preferred embodiment, the data store stage 508 of an instructions 206A-206N occupies one clock cycle unless no storer circuits 122A-122N of the memory controllers 120 are required to be active in the currently executing instruction 206A-206N, in which case the data store stage 508 of the current execution cycle, e.g., of the second instruction 206B, is skipped. Following the completion of the data store stage 508 second instruction 502B, or immediately if data store stage 508 is skipped of the second instruction 206B, the instruction load stage 502 of the succeeding instruction cycle 500 of the third instruction 206C commences.

In half-interleaved mode, the load stages 502 & 504 and store stages 508 of contiguously executed instructions 206A-206C overlap. Concurrent with the execution of the data store stage 508 of the first instruction's 206A, the instruction load stage 502 of the second instruction 206B commences. In the preferred embodiment, an instruction load stage 502 may take twenty clock cycles.

Figure 39:
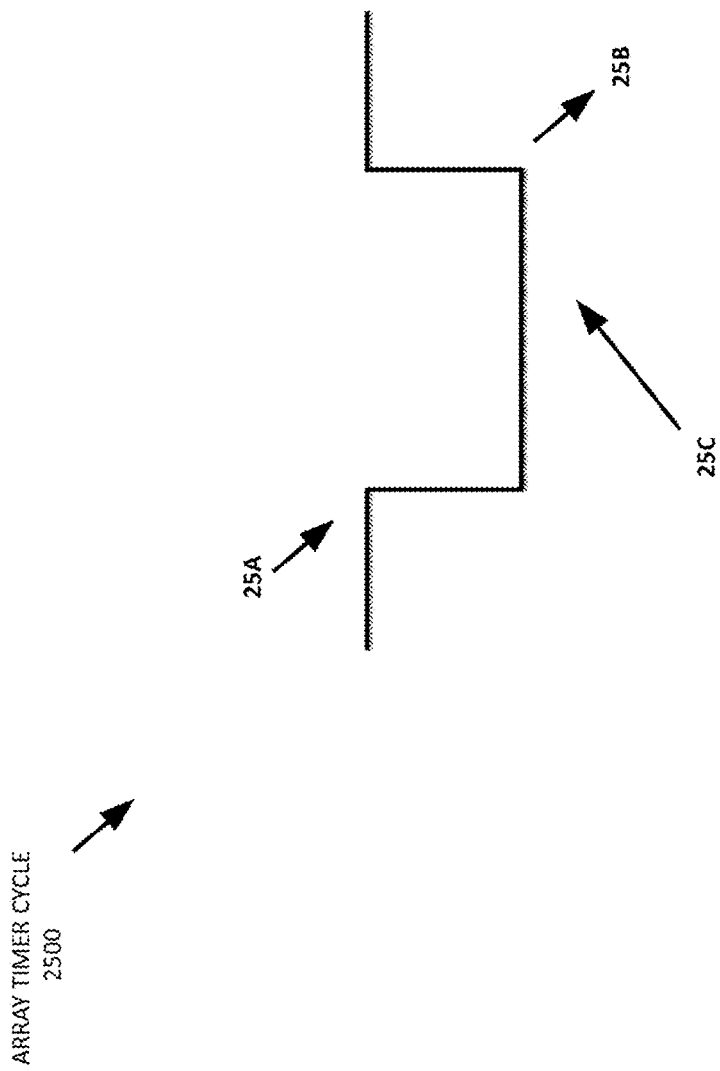
FIG. 39 is a is a flowchart of an execution of an array link as instantiated at the run time of the machine code by the DRP.

If the instruction load stage 502 of the second instruction 206B is skipped, then data load stage 504 of the second 206B is instead executed concurrently with the data store stage 508 of the earlier executing first instruction 206A. In the preferred embodiment, this combined data load/store stage 504 & 508 process occupies one memory cycle unless there are both no storer circuits 122A-122N configured in the first instruction 206A and no loader circuits 121A-121N configured in the second instruction 206B, in which case both of these data load and store stages 504 & 508 of this combined load/store stage 504 & 508 process are skipped. If either of the instruction load stage 502 of the second instruction 206B or the data store stage 508 of the first instruction 206A requires activating memory controller circuits 121A-123N, the combined load/store stage 502 & 508 is not skipped. Following the execution of the combined data load and data store stage 504 & 508 is the array execution stage 506 of the second instruction 206B. Loader circuit 121A-121N and storer circuit 122A-122N are preferably dark and are shut off during the array execution stage 506 of each instruction 206A-206N. As before, if an array timer circuit 2400 of the DRP 100, as shown in FIG. 39, is set to zero by operation of the comprised execution word 208A-208N of an instruction 206A-206, the immediate array execution stage 506 is skipped. More particularly, if the array timer circuit 2400 (hereinafter, "array timer 2400") is set at a zero value in the second instruction execution word 206B of the second instruction, the array execution stage 508 of the second instruction 206B is skipped.

When the array execution stage 508 of the second instruction 206B is instantiated, upon the completion of this array execution stage 506 of the second instruction, the data store stage 508 of the second instruction 206B is executed concurrently with either the instruction load phase 502 or the data load phase 504 of the third instruction 206C. In the preferred embodiment, if (a.) no loader circuits 121A-121N are configured in either the instruction load stage 502 or the data load stage 504 of the third instruction 206C, and (b.) storer circuits 122A-122N are configured in the data store stage 508 of the second instruction 206C, this combined stage 502, 504 & 508 will be skipped.

In full-interleaved mode, the load, execution and store stages 502-608 of the instructions 206A-206N overlap in a cascading fashion. Consider an execution of instructions 206A through 206E executing in a fully interleaved fashion, wherein stage overlaps are as follows. The data store stage 508 of the first instruction 206A would execute concurrently with both the array execution stage 506 of a second instruction 206B and the instruction load stage 502 of instruction 206C. If all three of these load and store stages 502, 504 & 508 can be skipped, the instruction cycle 500 would be skipped. If only some of the load and store stages 502, 504 & 508 can be skipped, the stages will occur with the loader circuits 121A-121N and storers 121A-122N of those optional load and store stages 502, 504 & 508 being dark.

Next, the data store stage 508 of the second instruction 206B would execute concurrently with the array execution stage 506 of the third instruction 206C and the instruction load stage 502 of a fourth instruction 206D. The same rules would apply as with the first trio of load and store stages 502, 504 & 508 if some or all of these load and store stages 502, 504 &. 508 could be skipped. Next, the data store stage 508 of the third instruction 206C would execute concurrently with the array execution stage 506 of the fourth instruction 206D and the instruction load stage of a fifth instruction 206E. By examining all the aforementioned relationships with respect to the third instruction 206C, one can determine all interdependency relationships presented by full interleaved mode.

In the following discussion of FIGS. 37 though 45, it is understood that the DRP 100 is executing instructions 206A-206N in half-interleaved mode.

Figure 37:
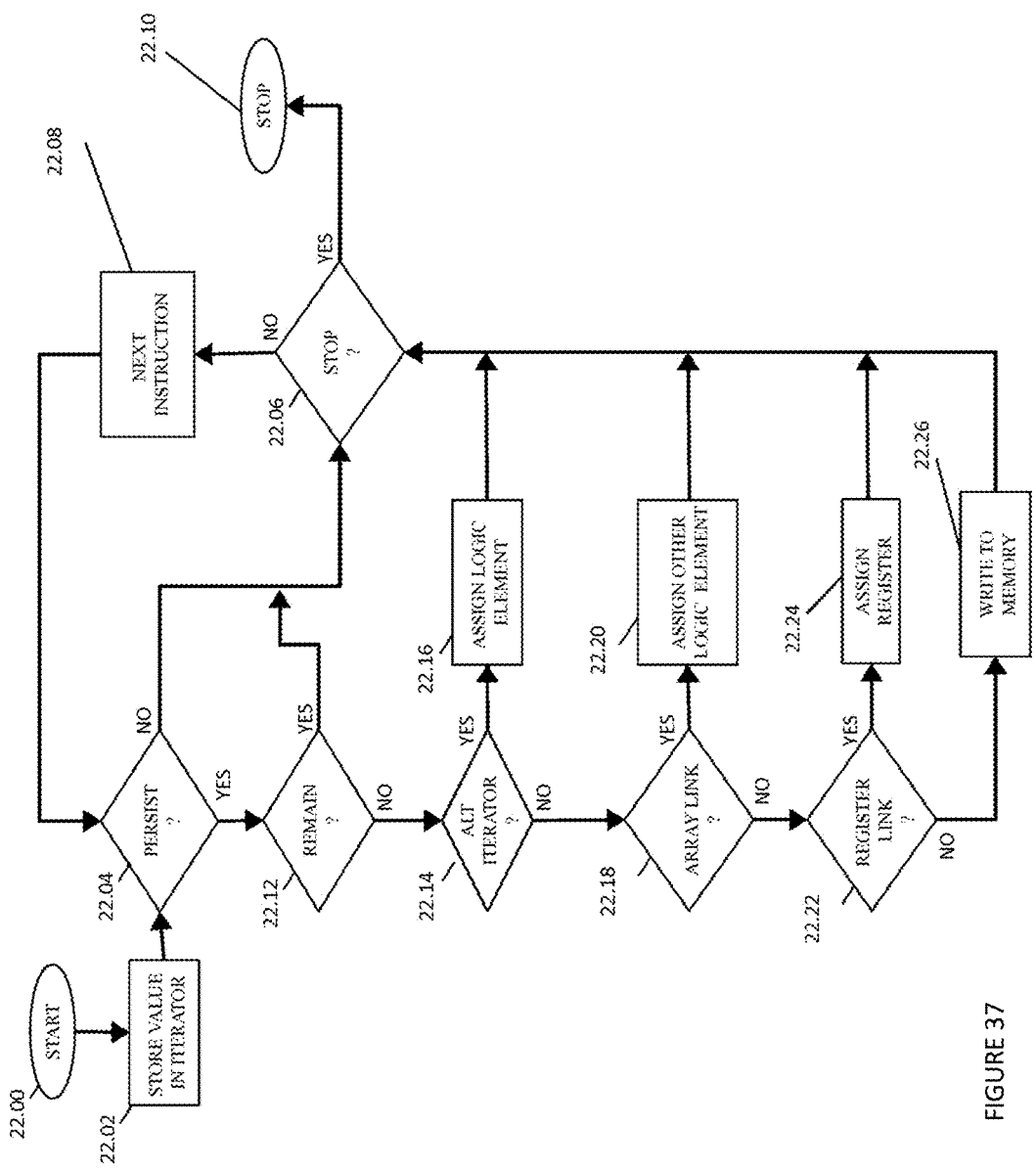
FIG. 37 is a flow chart of an aspect of the invented method wherein the compiler analyzes the software code to determine how to structure the machine code successfully execute the machine code in accordance with the software code.

Referring now generally to the Figures and particularly to FIG. 37, FIG. 37 is a process chart of the methodology of aspects of the invented method, wherein the compiler 200 analyzes the software code 202 to determine how to structure the machine code 204 to enable the persistence of 402A-402N as required to successfully execute the machine code 204 in accordance with the software code 202. In step 22,02 the compiler 200 notes that an exemplary first value 402A of an exemplary third instruction 206C shall be stored in an iterator 190.A.X-190.N.Z, and further determines In step 22.04 whether the exemplary first value 402A shall be persisted for more than one memory cycle. When the compiler 200 determines In step 22.04 that the exemplary first value 402A shall not be persisted for more than one memory cycle, the compiler proceeds on to step 22.06 and to determine whether to either cease compilation of the machine code 204 or to examine a next instruction 206D-206N in step 22.08. When the compiler 200 determines in step 22.06 to cease compilation of the machine code 204, the compiler 200 proceeds on to step 22.10 and to cease compilation.

When the compiler 200 determines In step 22.04 that the exemplary first value 402A shall be persisted for more than one memory cycle, the compiler 200 proceeds on to step 22.12 and to determine whether the exemplary first value 402A can be persisted in a single available iterator 190.A.X-190.N.Z for as long as required by the machine code 204. When the compiler 204 determines that the exemplary first value 402A can be persisted in a single available iterator 190.A.X-190.N.Z for as long as required by the machine code 204, the compiler 200 structures the machine code 204 to assign the first value 402A to the selected iterator 190.A.X-190.N.Z and proceeds on to step 2.06.

When the compiler 204 determines the exemplary first value 402A can not be persisted in a single available iterator 190.A.X-190.N.Z for as long as required by the machine code 204, the compiler 200 determines in step 22.14 whether the exemplary first value 402A can be persisted in a single available logic element 190.A-190.N by transference between or among iterators 190.A.X-190.N.Z within a same and available logic element 190.A-190.N. When the compiler 200 determines in step 22.14 that the exemplary first value 402A can be persisted in a single available logic element 190.A-190.N by transference between or among iterators 190.A.X-190.N.Z within a same and available logic element 190.A-190.N, the compiler 200 structures the machine code 204 to assign the first value 402A to the selected and available logic element 190.A-190.N in step 22.16 and proceeds therefrom on to step 22.06.

In the alternative, when the compiler 200 determines in step 22.14 that the exemplary first value 402A can not be persisted in a single available logic element 190.A-190.N by transference between or among iterators 190.A.X-190.N.Z within a same and available logic element 190.A-190.N, the compiler 200 proceeds on to step 22.18. In step 22.18 the compiler determines whether the exemplary first value 402A can be written from a first iterator 190.A.X.-190.N.Z of a first logic element 190.A.X-190.N,Z in an execution of the third instruction 206C into an alternate iterator 190.A.X-190A.Z of an alternate logic element 190.A.X-190.N.Z and thereby persist the first value 402A in the alternate logic element 190.A.X-190.N.Z for a time period required by the software code 202.

When the compiler 200 determines in step 22.18 that the exemplary first value 402A can be written from a first iterator 190.A.X.-190.N.Z of a first logic element 190.A.X-190.N.Z in an execution of the third instruction 206C into an alternate iterator 190.A.X-190A.Z of an alternate logic element 190.A.X-190.N.Z and thereby persist the first value 402A in the alternate logic element 190.A.X-190.N.Z for a time period required by the software code 202, the compiler 200 proceeds on to step 22.20 and to structure the third instruction 206C of the machine code 204 to assign the first iterator 190.A.X.-190.N.Z of the first logic element 190.A.X-190.N.Z in an execution of an array link to write the exemplary first value 402A into an assigned alternate iterator 190.A.X-190A.Z of an alternate logic element 190.A.X-190.N.Z. The compiler 200 proceeds for step 22.20 to step 22.06.

In the alternative, when an array link is not determined by the compiler 200 to be a viable solution in step 22.18, the compiler proceeds on to step 22.22 and to determine if a register link can be applied in the third instruction 206C to sufficiently persist the exemplary first value 402A.

When the compiler 200 determines in step 22.22 that a register link can be structured in the machine code 204 to enable a sufficient persistence of the exemplary first value 402A, the compiler proceeds on to step 22.24 and to structure the machine code 204 with a register link operation that enables sufficient persistence of the exemplary first value 402A. In the alternative, when the compiler 200 does not determine to generate a register link operation in step 22.22 sufficient to enable persistence of the exemplary first value 402A, the compiler 200 proceeds on to step 22.26 and to modify the machine code 204 to instantiate a spill/fill operation whereby the exemplary first value 402A is read from a first iterator 190.A.X-190.190.N.Z in one instruction execution into the memory 150 and then back from the memory and written into the same or a different iterator 190.A.X-190.N.Z in a following instruction execution cycle.

The compiler 200 proceeds from step 22.24 or step 22.26 to step 22.06.

Figure 38:
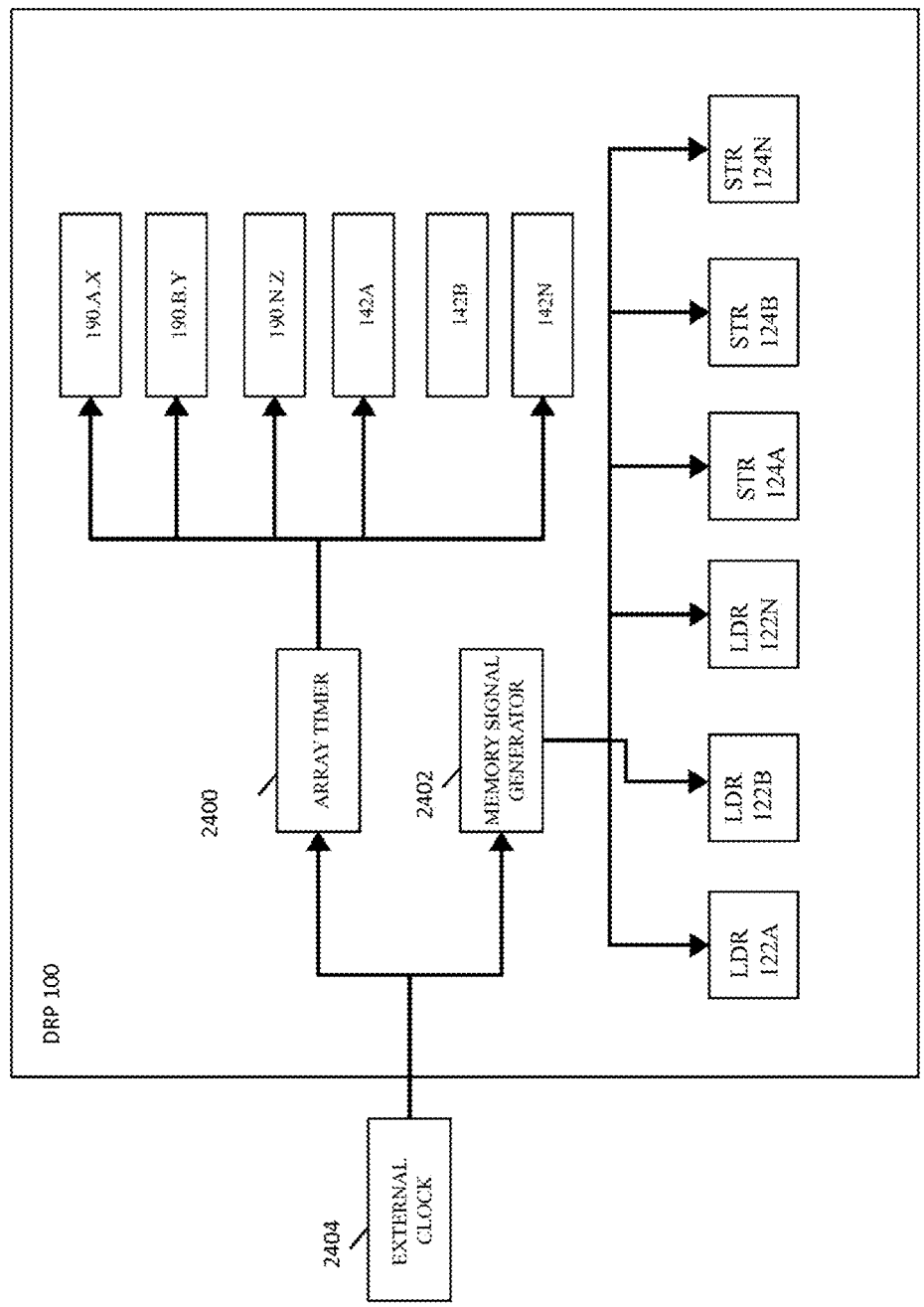
FIG. 38 is a block diagram describing aspects of the timing distribution organization of the DRP.

Referring now generally to the Figures and particularly to FIG. 38, FIG. 38 is block diagram of aspects of the timing distribution organization of the DRP 100. The array timer 2400 and a memory signal generator 2402 receive a same clock pulse from an external clock 2404 of the computer 2. The memory signal clock derives a memory timing pulse signal from the clock pulse provided by the external clock 2404 and provides this memory timing pulse signal to the each loader circuit 121A-121N and each storer circuit 123A-123B of the memory controllers 120. The array timer circuit 2400 derives an array timing pulse signal from the clock pulse provided by the external clock 2404 and provides the array timing pulse signal to the iterators 190.A.X-190.N.Z and to the back buffers 142A-142N.

Figure 41:
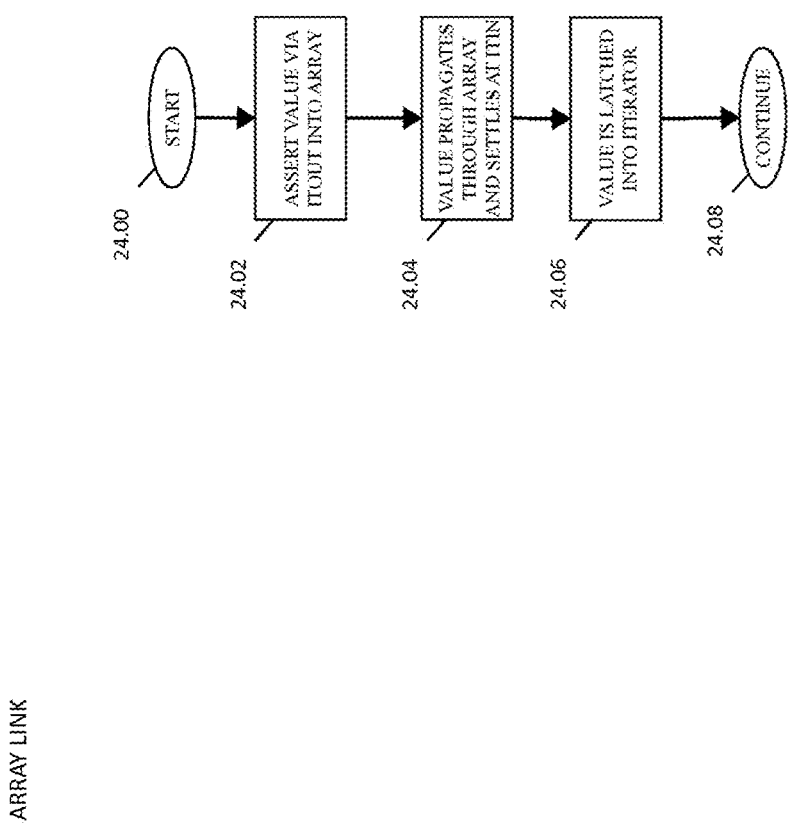
FIG. 41 is a hardware diagram of exemplary the DRP assets required to perform an exemplary array link.

Referring now generally to the Figures and particularly to FIG. 39, FIG. 39 is a flowchart of an execution of an array link as instantiated at the run time of the machine code 204 by the DRP 100. It is understood that each logic element preferably comprises three iterators, namely an X iterator, a Y iterator and a Z iterator. It is understood that the stipulations of the foregoing discussion of the method of FIG. 39 and the exemplary elements of FIG. 41 are offered primarily for the sake of clarity of explanation and not as limitation of the scope of the invention as recited in the claims, and that the DRP 100 may be directed to means of additional or alternate instructions 206A-206N and by applying additional elements 110-190.N.Z and aspects of the DRP 100, including but not limited to additional logic element connectivity traces 2600, register files 130, loader circuits 121A-121N, storer circuits 122A-122N, address register circuits 123A-123N, buses 170A-170H & 124A-126N, and logic elements 190A-190N then as mentioned specifically as exemplary elements. In the invented processor 200, the RLU 110 includes connectivity traces 2600 that enable each logic element to assert values 402A-402N to 16 other logic elements 190A-190N, as described in U.S. Pat. No. 7,840,777. It is understood that in certain alternate preferred embodiments of the invented processor 100, connectivity traces 2600 that enable each logic element to assert values 402A-402N to more or less than 16 other logic elements 190A-190N.

In step 24.02 an array execution cycle begins and the exemplary first value 402A is asserted by the first X iterator 190.A.X onto internal connectivity traces 2600 of the RLU 110. In step 24.04 the exemplary first value 402A propagates within the RLU 110 to an intended destination Z itin circuit 304 of an exemplary alternate third logic element 190.C. In step 24.06 the first exemplary value 402A is latched into an exemplary Z iterator 190.C.Z of the third logic element 190.0 and the current array execution cycle ends. By this means and method an array link wherein receipt of the exemplary first value 402A by the third Z iterator 190.C.Z from a source of the first X iterator 190.A.X of the first logic element 190.A is effected. The DRP 100 proceeds from step 24.06 to step 24.08 and to perform alternate or additional computational operations.

It is understood that the method of FIG. 39 may be adapted wherein the first value 402A may be transferred between two iterators 190.A.X-190.N.Z of a same logic element 190A-190N. In the example of the exemplary first logic element 190A, the first value 402A is asserted from the first X iterator 190.A.X to the first X itout 324 in step 24.02. The first value is then asserted from the first X itout 324 to an input 316 of the first logic element 190A in step 24.04, and the first value is then transferred to the first Y ITIN 302 and latched into the first Y iterator 190.A.Y in step 24.06. It is understood that a logic element 190A-190N may simultaneously or substantively contemporaneously assert a value 402A-402N onto the array connectivity trace 2600 and into an internal itin 302 and within a same execution cycle.

Figure 40:
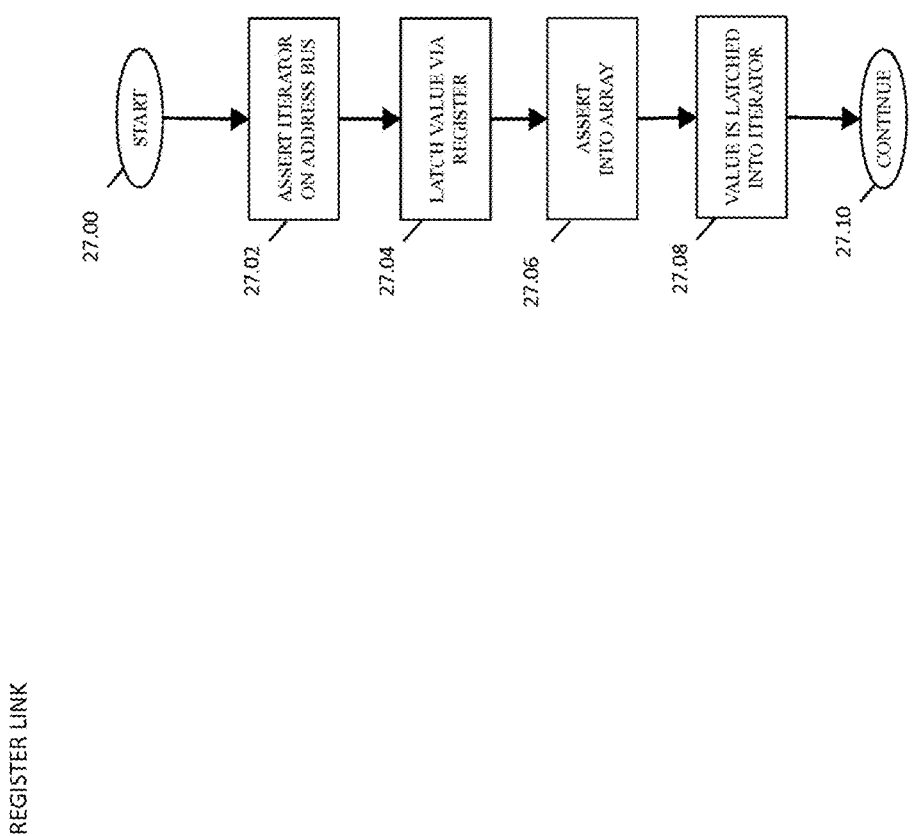
FIG. 40 is a representation of an array timer cycle of an array link operation.

Referring now generally to the Figures and particularly to FIG. 40, FIG. 40 is a representation of an array timer cycle 2500 of an array link operation wherein step 25.02 of the initiation of the array execution cycle occurs at the falling edge 25A, step 24.06 of the end of the array execution cycle and the latching of the exemplary first value 402A occurs at the rising edge 25B, and propagation of the exemplary first value 402A of step 24.06 within the RLU 110 and from the first X iterator 190.A.X and to the third Z iterator 190.C.Z occurs within a time period 25C occurring between the falling edge 25A and the rising edge 25B. The DRP 100 proceeds from step 25.06 to step 25.08 and to perform additional computational operations.

Referring now generally to the Figures and particularly to FIG. 40 and FIG. 41, FIG. 41 is a hardware diagram of exemplary the DRP assets required to perform an exemplary array link of FIG. 39. The exemplary first value 402A travels from the X iterator 190.A.X of the first logic element 190A through the X itout 324 and the output driver 308 of the same comprising first logic element 190A and is placed on the RLU connectivity traces 2600. When asserted by the output driver 308 of the first logic element 190A, the first value 402A is accepted by the Z input 320 of the third logic element 190.0 and from there is latched into the Z itin 306 of the Z iterator 190.C.Z of the third logic element 190C.

Figure 42:
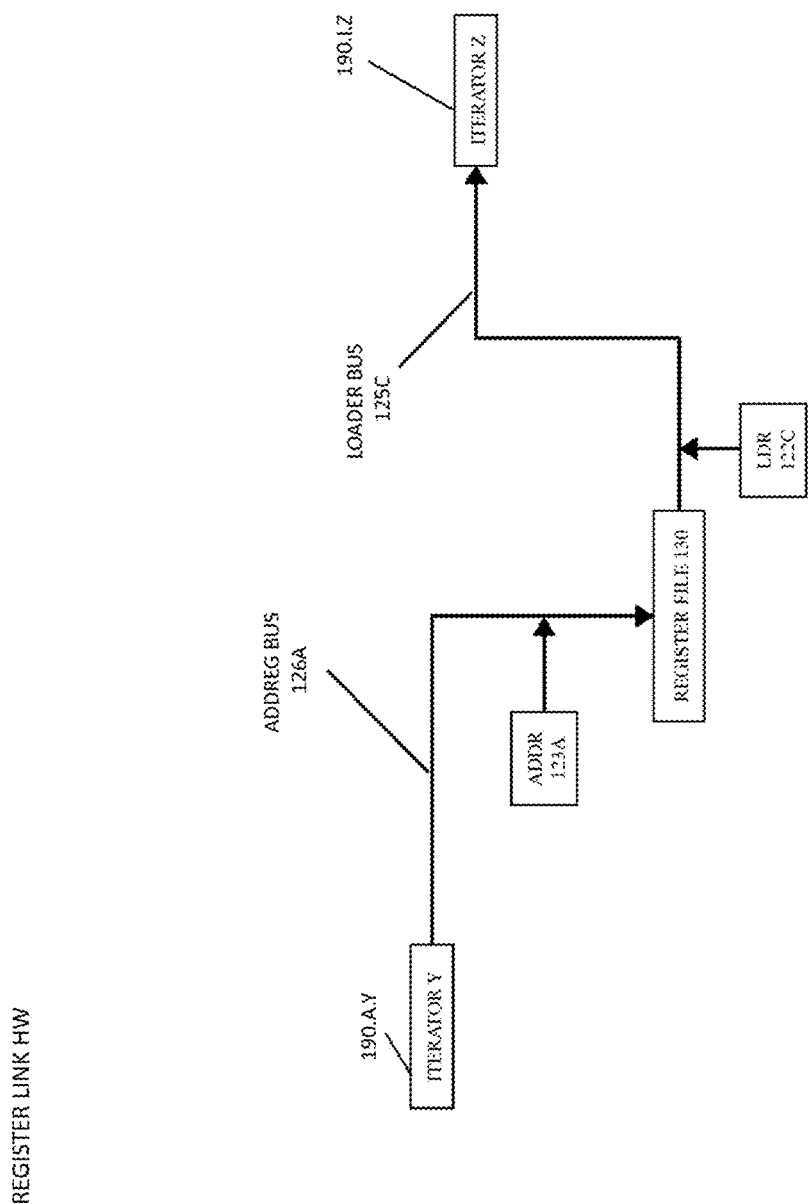
FIG. 42 flow chart of an aspect of an exemplary fourth instruction of the machine code wherein a register link process is effected.

Referring now generally to the Figures and particularly to FIG. 42, FIG. 42 is a flow chart of an aspect of an exemplary fourth instruction 206D of the machine code 204 wherein a register link process is effected. It is understood that the stipulations of the foregoing discussion of the method of FIG. 42 and the exemplary elements of FIG. 43 are offered primarily for the sake of clarity of explanation and not as limitation of the scope of the invention as recited in the claims, and that the DRP 100 may be directed to means of additional or alternate instructions 206A-206N and by applying additional elements 110-190.N.Z and aspects of the DRP 100, including but not limited to additional logic element connectivity 2600, register files 130. loader circuits 121A-121N, storer circuits 122A-122N, address register circuits 123A-123N, buses 170A-170H & 124A-126N, and logic elements 190A-190N then as mentioned specifically as exemplary elements.

The exemplary first value 402A stored in a Y iterator 190.A.Y of the first logic element 190.A is asserted onto the exemplary first address register bus 126A of the exemplary first address register circuit 123A in step 27.02. The first value 402A is then latched into the register file 130 in step 27.04 from the first address register bus 126A. In step 27.06 and during a later execution of another instruction 206E-206N, such as the next executed fifth instruction 206E or a later executed instruction 206F-206N, the first value 402A is then asserted back onto an exemplary third loader bus 125C of the exemplary third loader 122C from the register file 130. It is understood that in the first alternate preferred embodiment that the third loader bus 125C is unidirectionally communicatively coupled with a set of eight logic elements 190I-190P and may load values 402A-402N into any and all X, Y, or Z iterators 190.I.X-190.P.Z of this second plurality of eight logic elements 190I-190P.

The first value 402A is then latched into an exemplary ninth Z iterator 190.I.Z of the ninth logic element 190I in step 27.08. The DRP 100 proceeds from step 27.08 to step 27.10 and to perform alternate or additional computational operations.

Figure 43:
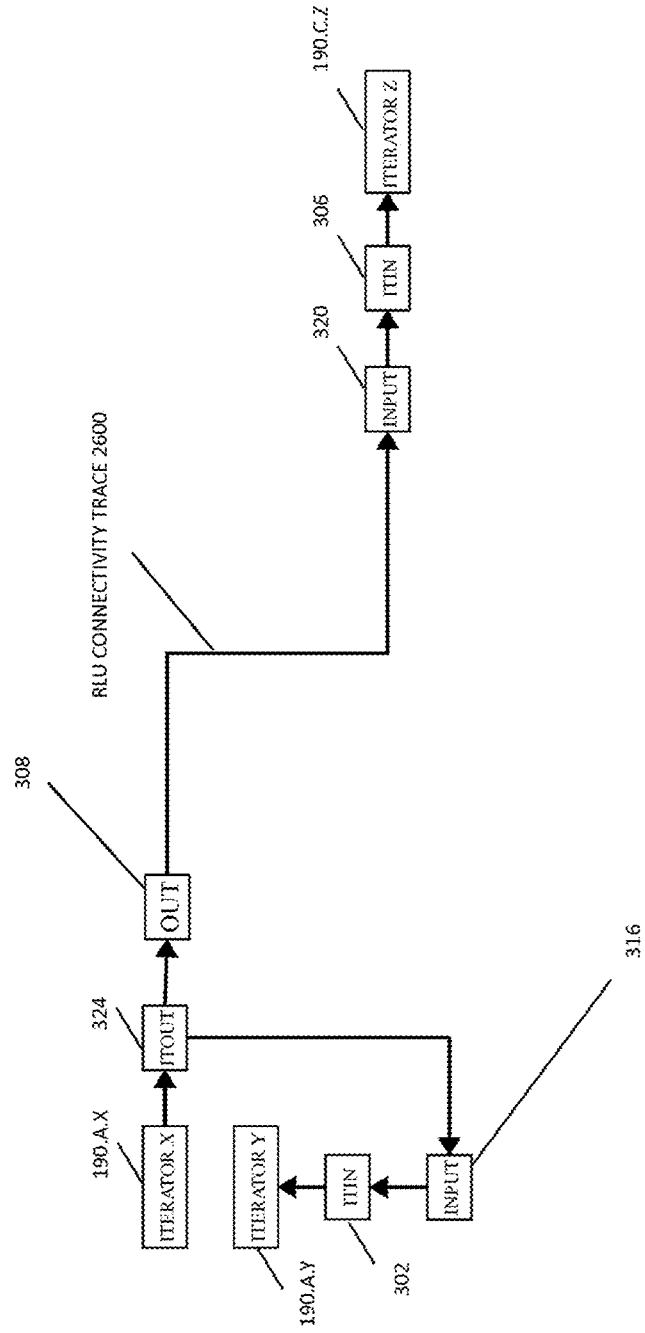
FIG. 43 is a hardware diagram of the DRP assets required to perform a register link.

Referring now generally to the Figures and particularly to FIG. 43, FIG. 43 is a hardware diagram of the DRP assets required to perform a register link.

In reference to the exemplary register link execution of FIG. 42, the first exemplary value 402A travels from the first Y iterator 190.A.Y of the first logic element 190A through a first addreg bus 126A and a first address register circuit 123A to the register file 130. The first value may then be stored in the register file until a next instruction cycle, or for an arbitrarily large or small number of instruction cycles, before being asserted onto a third loader bus 125C and transferring through the third loader 122C and being written into the ninth Z iterator 190.I.Z of the ninth logic element 190I.

Figure 44:
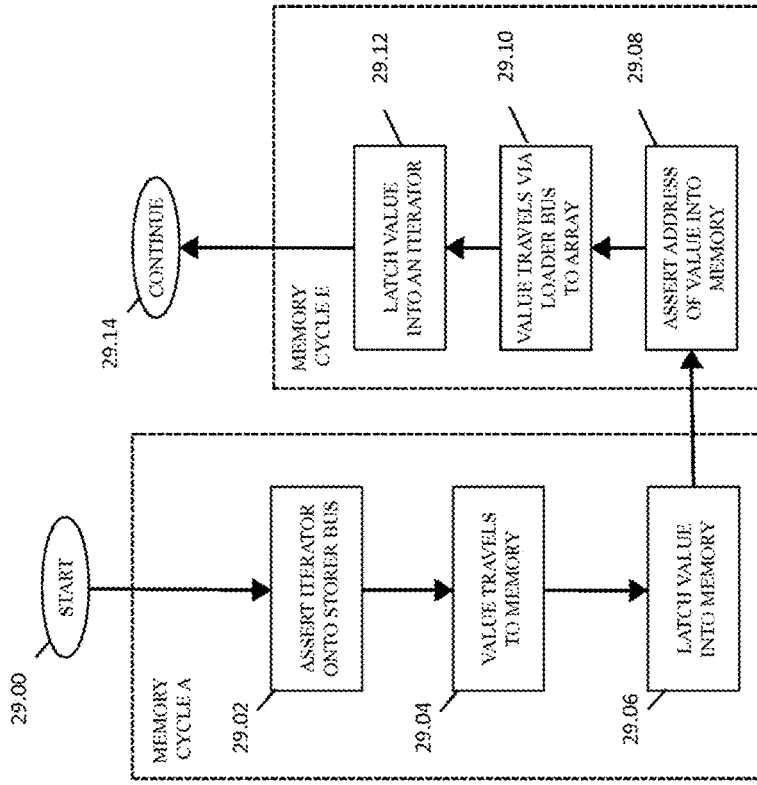
FIG. 44 is a flowchart of aspects of a spill/fill operation of the DRP.

Referring now generally to the Figures and particularly to FIG. 44, FIG. 44 is a flowchart of aspects of a spill/fill operation of the DRP 100. Selecting aspects of the first exemplary instruction 206A, the steps of 29.02 through 29.06 are performed by the DRP 100 in a memory cycle A as directed by the first instruction 206A. The steps 29.08 through 29.12 are performed by the DRP 100 as directed by a later occurring memory cycle E in the execution of a fifth exemplary instruction 206E. It is understood that the stipulations of the first instruction 206A and the fifth instruction 206E are offered primarily for the sake of clarity of explanation and not limitation, and that the DRP 100 may be directed to perform a spill/fill operation by a plurality of pairs of sequentially executed instructions. It is understood that in alternate preferred embodiments of the invented method, the memory cycle E of steps 29.08 through 29.12 may occur immediately after the completion of the steps 29.02 through 29.06 of the first occurring memory cycle A, or that a plurality of multiplicity of memory cycles may be executed between the completion of step 29.06 and the initiation of step 29.08.

In step 29.02 memory cycle A begins and the first X iterator 190.A.X asserts the exemplary first value 402A onto the first storer bus 125A. The first value 402A travels along the storer bus 125A in step 29.04 and the first value 402A is latched into the memory 150 at a memory address of the memory 150 provided to the first storer circuit 122A by the register file 130. The first value 402A is then latched into the memory 150 in step 29.06. The completion of step 29.06 is preferably coincident with the completion of a memory cycle A.

In step 29.08 of a next executed memory cycle E, or of a later memory cycle, the memory address where the first value 402A was stored in step 29.06 is provided by the register file to the fourth loader circuit 121D and this memory address is asserted onto the exemplary fourth loader bus 124D. It is understood that in the first alternate preferred embodiment that both the third loader bus 124C and the fourth loader bus 124D are unidirectionally communicatively coupled with the second plurality of logic elements 190I-190P and that both the third loader bus 124C and the fourth loader bus 124D may selectively write values 402A-402N from memory 150 into each, any or all of the iterators 190.I.X-190.P.Z of the second plurality of logic elements 190I-190P.

In step 29.10 the first value 402A travels along the exemplary fourth loader bus 124D, passing through the exemplary fourth loader circuit 121D and into an exemplary sixteenth logic element 190P of the RLU 110. The first value 402A is then latched into an exemplary sixteenth Z iterator 190.P.Z of the sixteenth iterator 190.P in step 29.12. The completion of step 29.12 is preferably coincident with the completion of the instant exemplary memory cycle E, or later performed memory cycle. The DRP 100 proceeds from step 29.12 to step 29.14 and to perform alternate or additional computational operations.

Figure 45:
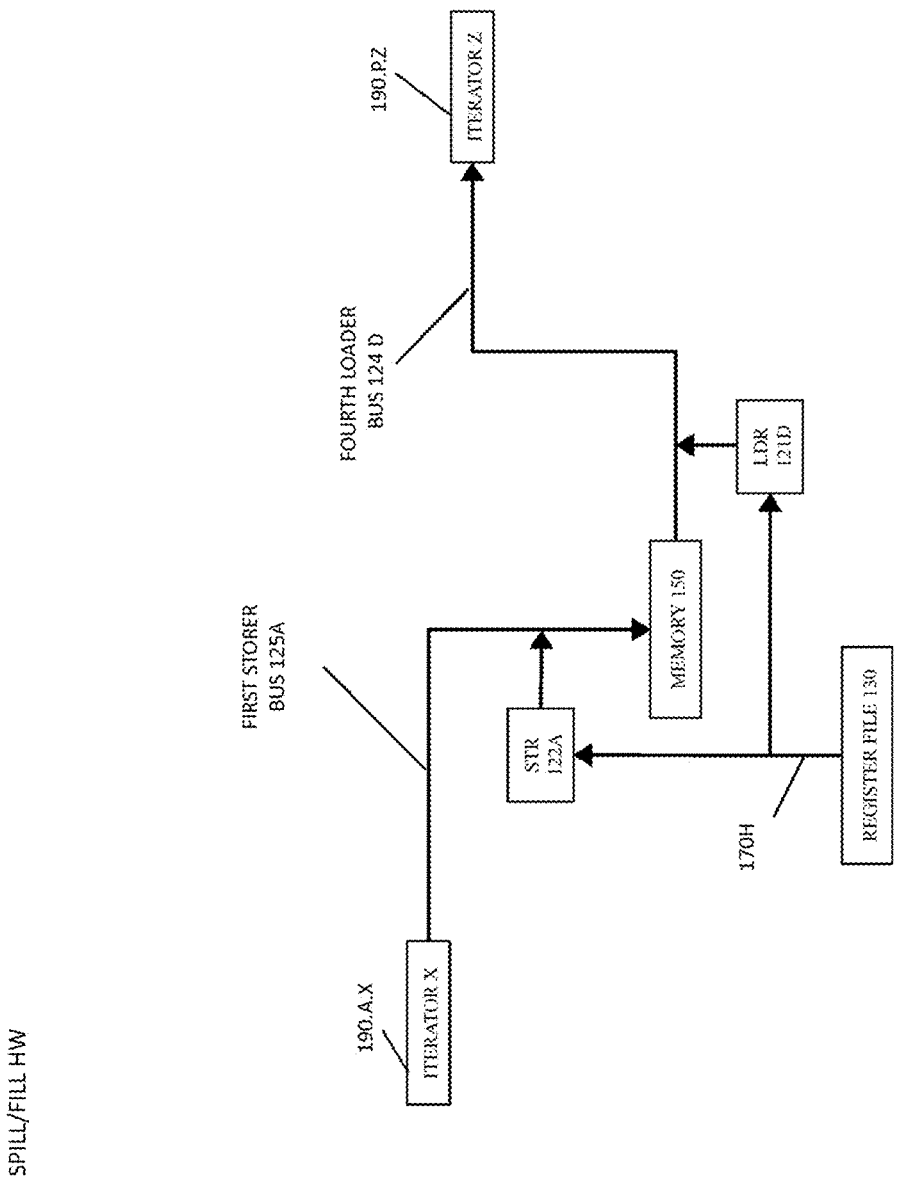
FIG. 45 is a hardware diagram of the DRP assets required to perform the exemplary spill/fill operation of the illustrative example of FIG. 44.

Referring now generally to the Figures and particularly to FIG. 45, FIG. 45 is a hardware diagram of the DRP assets required to perform the exemplary spill/fill operation of the illustrative example of FIG. 44.

The forgoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. In a compiler, in order to determine a plurality of successive reconfigurations of a dynamically reconfigurable processor comprising a plurality of computational resources including a plurality of logic circuits, each logic circuit comprising at least one value storage circuit, a method comprising:

modeling a storing of a first value in a first value storage circuit of a first logic circuit during a first instruction cycle, wherein an instruction is defined as encoded data that contains configuration information applied by a dynamically reconfigurable processor to configure or reconfigure itself to accordingly process data that may be currently existent in the dynamically reconfigurable processor or included also as part of the encoded data and an instruction cycle is defined as a runtime period wherein the dynamically configurable processor executes a single instruction;

modeling an accessing of the first value in a succeeding instruction cycle;

determining a data pathway conflict in accessing the first value in a modeling of the succeeding instruction cycle; and generating a new instruction to reconfigure the dynamically reconfigurable processor to enable a transfer of the first value within the plurality of computational resources of the dynamically reconfigurable processor, the new instruction adapted for execution after a first instruction cycle and before execution of the succeeding instruction cycle, wherein a first instruction comprising a plurality of paths is instantiated in the first instruction cycle and when a conflict exists between a first potential path within the first instruction cycle and at least one path of the plurality of paths within the first instruction, the compiler authoring the new instruction to move the first value onto a stack resource of the plurality of computational resources of the dynamically reconfigurable processor and load the first value back from the stack resource when needed in the succeeding instruction cycle.

2. The method of claim 1, wherein when a conflict exists between the first potential path within the first instruction and at least one path of the plurality of paths within the first instruction, preferentially, where sufficient resources of the plurality of computational resources are available to do so, the compiler authoring the new instruction to move the first value into a first register of the dynamically reconfigurable processor and load the first value back from the first register of the dynamically reconfigurable processor.

3. The method of claim 1, wherein when a conflict exists between the first potential path within the first instruction and at least one path of the plurality of paths within the first instruction, the compiler authoring the new instruction to move the first value from a first iterator of the dynamically reconfigurable processor into an available iterator of the dynamically reconfigurable processor accessible in the succeeding instruction cycle.

4. The method of claim 3, wherein when a conflict exists between first potential path and at least one path of the plurality of paths within the first instruction, the compiler authoring the new instruction to assign both a source resource and a destination resource of the plurality of computational resources of the dynamically reconfigurable processor to different resources of the plurality of computational resources of the dynamically reconfigurable processor in the new instruction.

5. The method of claim 4, wherein when a conflict exists between the first potential path and at least one path of the plurality of paths within the first instruction, the compiler authoring the new instruction to assign the destination resource of the plurality of computational resources of the dynamically reconfigurable processor to a different resource of the plurality of computational resources of the dynamically reconfigurable processor in the new instruction.

6. The method of claim 5, wherein when a conflict exists between the first potential path, the complier authoring the new instruction to move the source resource storing the first value to a different resource of the plurality of computational resources of the dynamically reconfigurable processor.

\* \* \* \* \*